United States Patent [19]

Hammack

[11] 3,866,229

[45] Feb. 11, 1975

[54] METHOD AND APPARATUS FOR AUTOMATICALLY DETERMINING POSITION-MOTION STATE OF A MOVING OBJECT

[76] Inventor: Calvin Miles Hammack, P. O. 304, Saratoga, Calif. 95070

[22] Filed: Sept. 12, 1972

[21] Appl. No.: 288,429

Related U.S. Application Data

[60] Continuation-in-part of Ser. No. 817,765, April 21, 1969, Pat. No. 3,691,560, which is a division of Ser. Nos. 420,623, Dec. 23, 1964, Pat. No. 3,445,847, and Ser. No. 86,770, Feb. 2, 1961, Pat. No. 3,706,096, and Ser. No. 74,180, Sept. 21, 1970, Pat. No. 3,795,911, which is a continuation-in-part of Ser. No. 278,191, May 6, 1963, abandoned.

[52] U.S. Cl... 343/112 R, 235/150.27, 235/150.271, 343/16 R, 343/112 C, 356/141
[51] Int. Cl............................................ G01s 5/04
[58] Field of Search............... 235/150.27, 150.271; 343/112 R, 15, 112 C, 9, 16 R; 356/141

[56] References Cited
UNITED STATES PATENTS
2,968,034  1/1961  Cafarelli, Jr. .................. 343/112 R
3,090,957  5/1963  Albanese et al. ............... 343/112 R
3,296,423  1/1967  Ewertz......................... 235/150.271
3,378,842  4/1968  Phillips......................... 235/150.27
3,571,567  3/1971  Eckermann................... 235/150.271

Primary Examiner—Maynard R. Wilbur
Assistant Examiner—Richard E. Berger
Attorney, Agent, or Firm—Victor R. Beckman

[57] ABSTRACT

This invention relates to a method and means of determining at least one dimension of the position-motion state of one or more points relative to at least one reference point by performing a plurality of measurements comprising measurements of angular variations or angular differences, or of functions of such angular variations or angular differences. The apexes of such angular variations or differences are located at the reference points.

104 Claims, 30 Drawing Figures

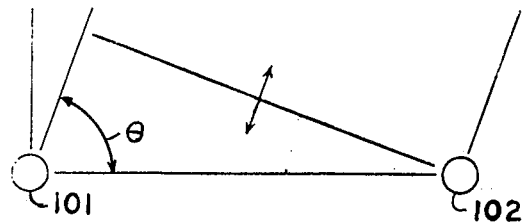
FIG_1
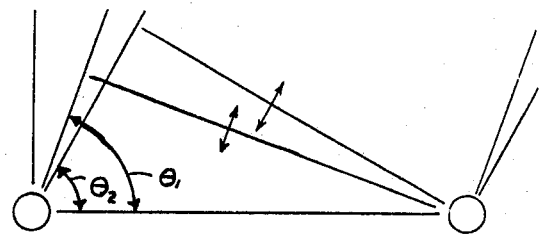
FIG_3
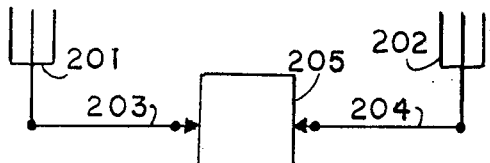
FIG_2  $M = \cos \theta$
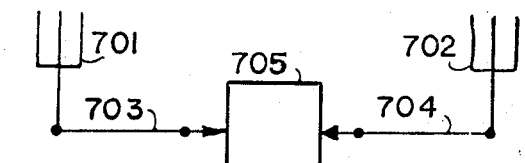
FIG_7  $M = \cos \theta_2 - \cos \theta_1$
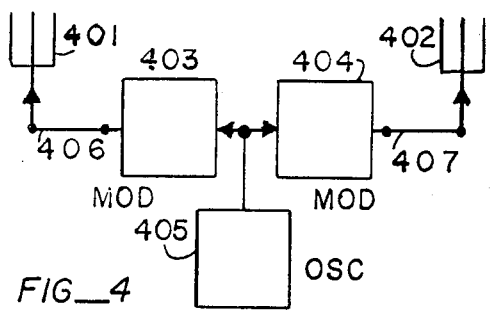
FIG_4
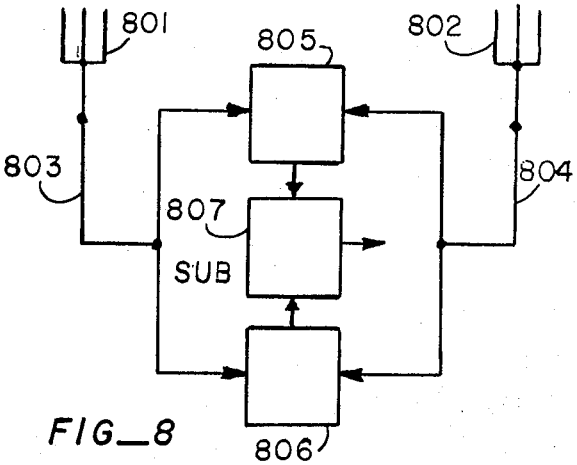
FIG_8
$M = (\cos \theta_2 - \cos \theta_1)$
M INDICATES MEASURED QUANTITY
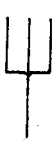 INDICATES APERTURE
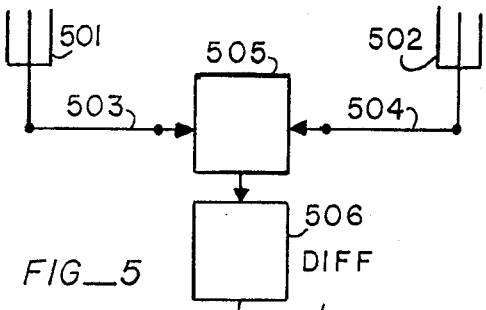
FIG_5  $M = \dfrac{d}{dt}(\cos \theta)$
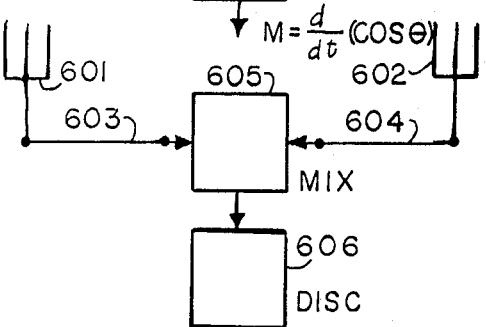
FIG_6  $M = \dfrac{d}{dt}(\cos \theta)$

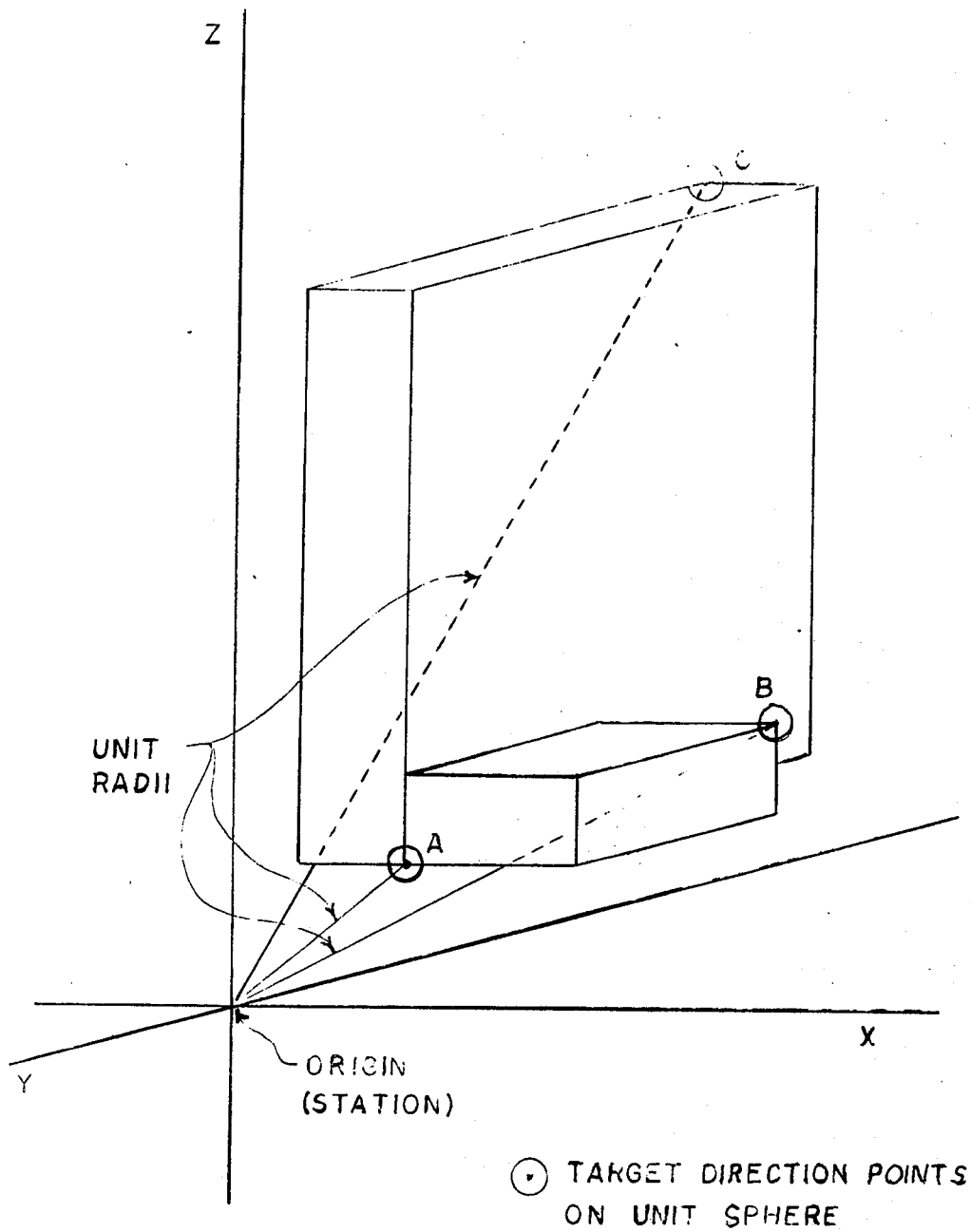
FIG__9

FIG_10A
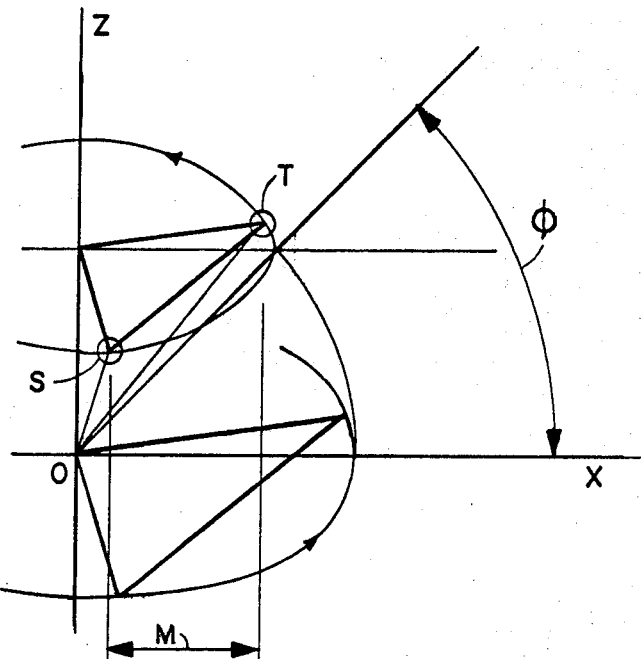
$$\phi = \cos^{-1}\sqrt{\frac{M^2+N^2}{2(1-\cos\psi)}}$$
$$M = \left[\cos\theta_2 - \cos(\theta_2 - \psi)\right]\cos\phi$$
$$N = \left[\sin\theta_2 - \sin(\theta_2 - \psi)\right]\cos\phi$$
$$\psi = \theta_2 - \theta_1$$
$$\theta_2 - \tfrac{1}{2}\psi = \tan^{-1}\left(-\frac{M}{N}\right)$$
M AND N ARE MEASURED
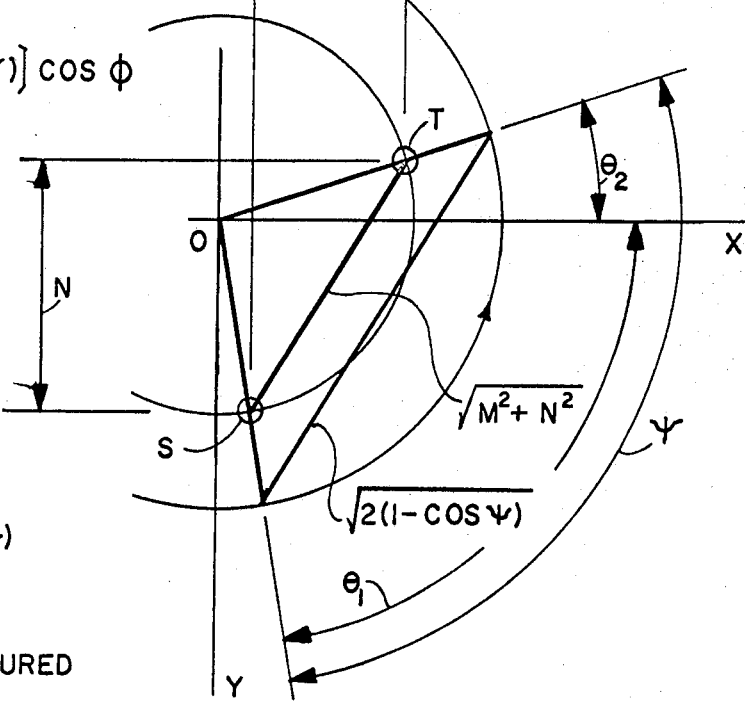
FIG_10

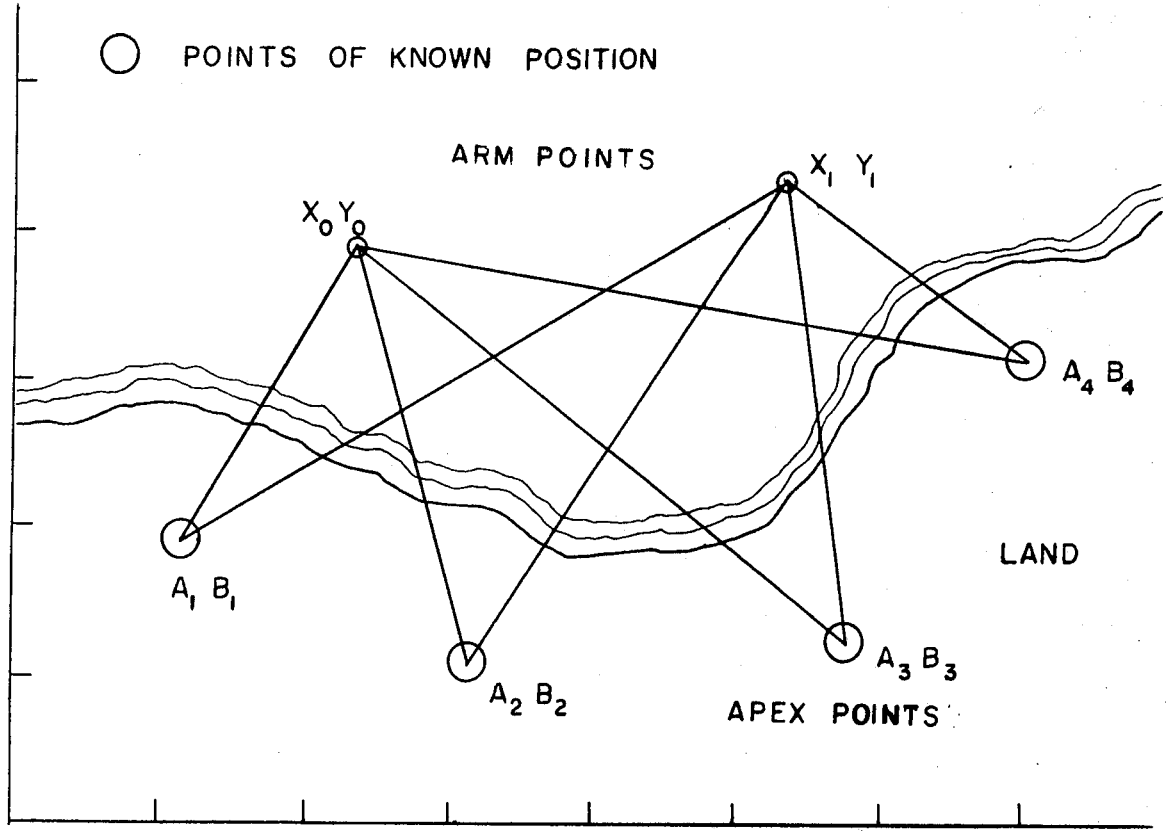
○ POINTS OF UNKNOWN POSITION
◯ POINTS OF KNOWN POSITION
X, Y      UNKNOWN COORDINATES
A, B      KNOWN COORDINATES
$$(X_1 - X_0)^2 + (Y_1 - Y_0)^2 = (X_1 - A_2)^2 + (Y_1 - B_2)^2 + (X_0 + A_2)^2 + (Y_0 - B_2)^2$$
$$- 2\sqrt{(X_1 - A_2)^2 + (Y_1 - B_2)^2} \sqrt{(X_0 - A_2)^2 + (Y_0 - B_2)^2} \cos \theta_2$$
FIG—11

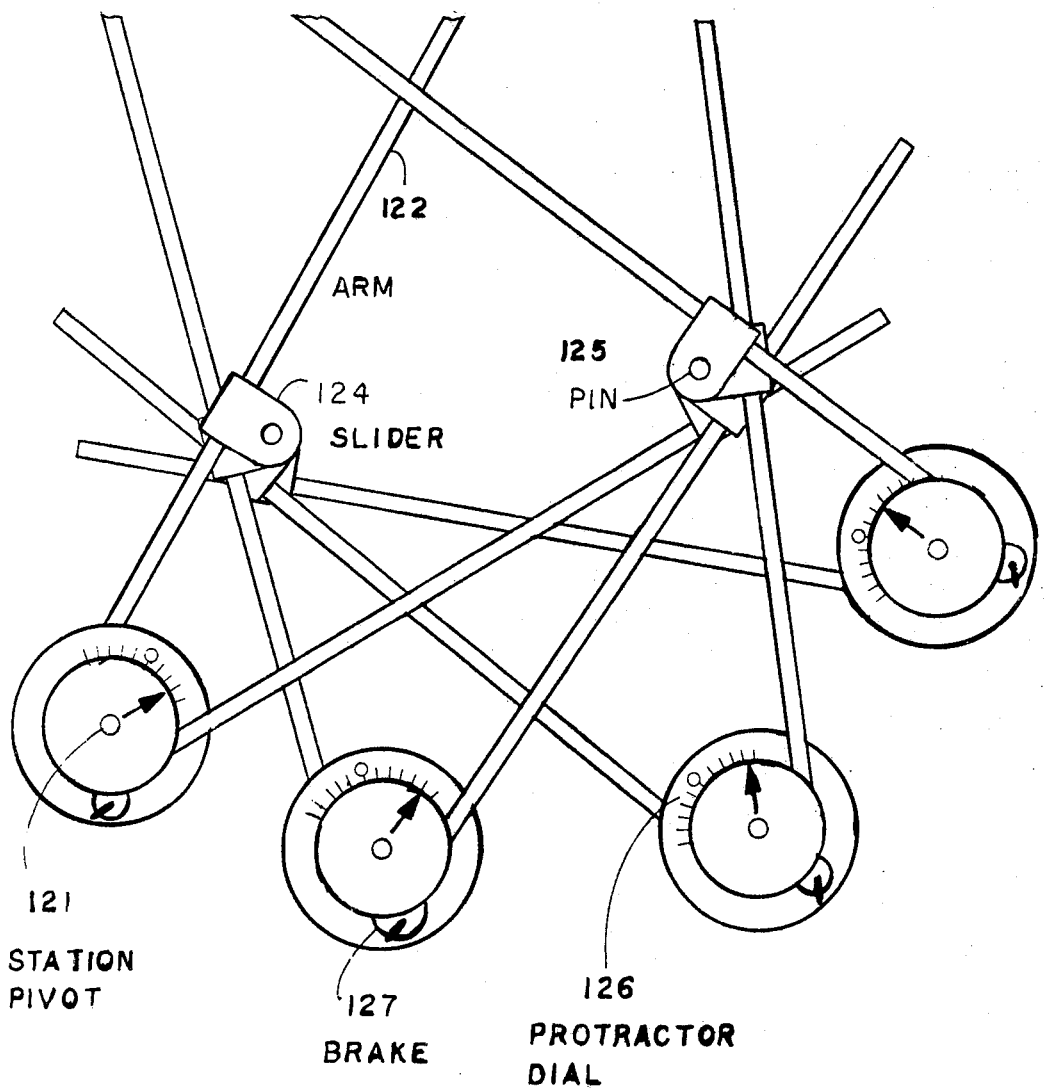
FIG—12

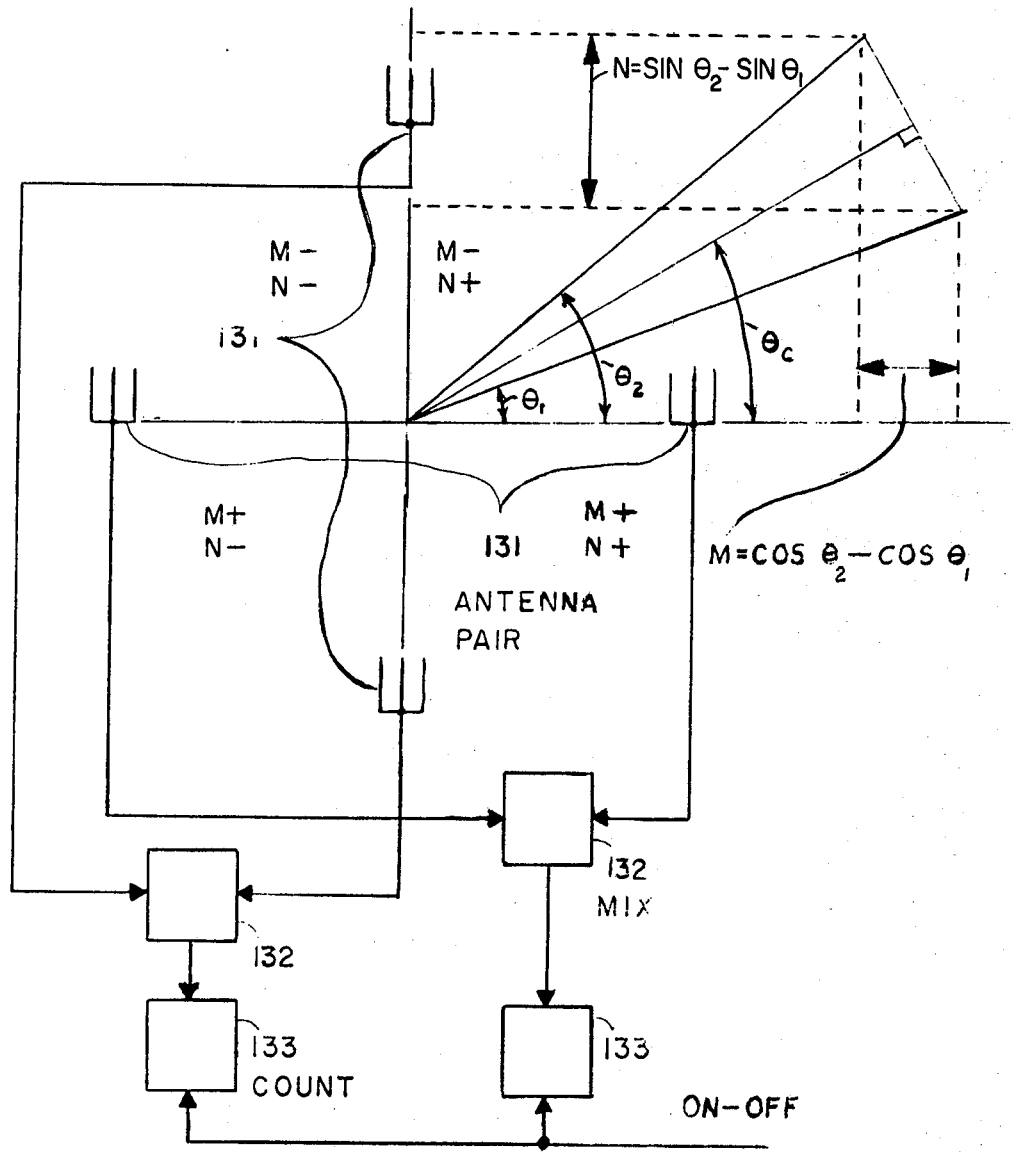
$\theta_c = \text{TAN}^{-1}(-\frac{M}{N})$   M AND N ARE MEASURED QUANTITIES
$\theta_c = \frac{\theta_1 + \theta_2}{2}$   SIGNS ARE FOR MOTION CCW
$\theta_2 - \theta_1 = \cos^{-1}\left[1 - \frac{M^2 + N^2}{2}\right]$
FIG__13

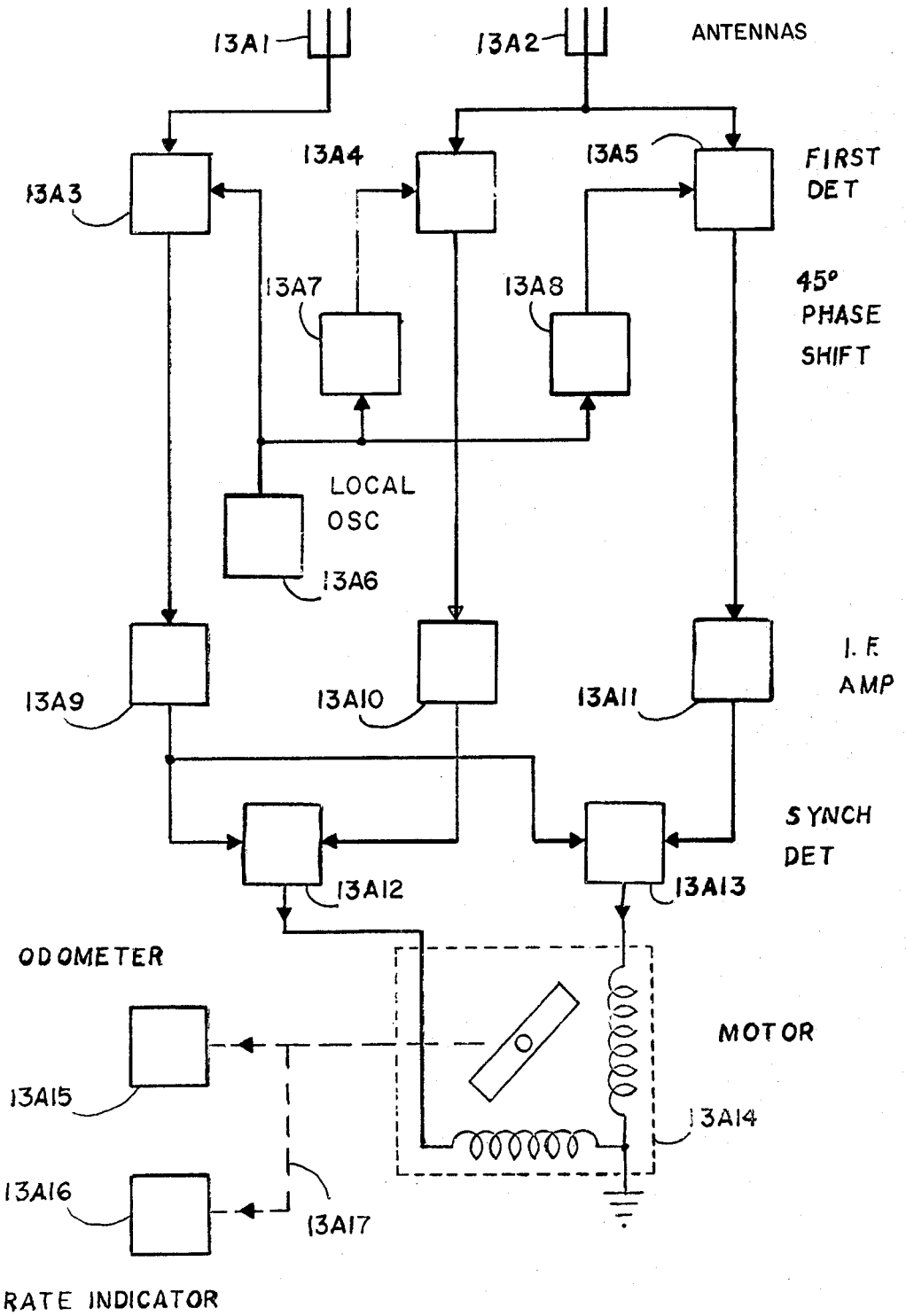
FIG_13A

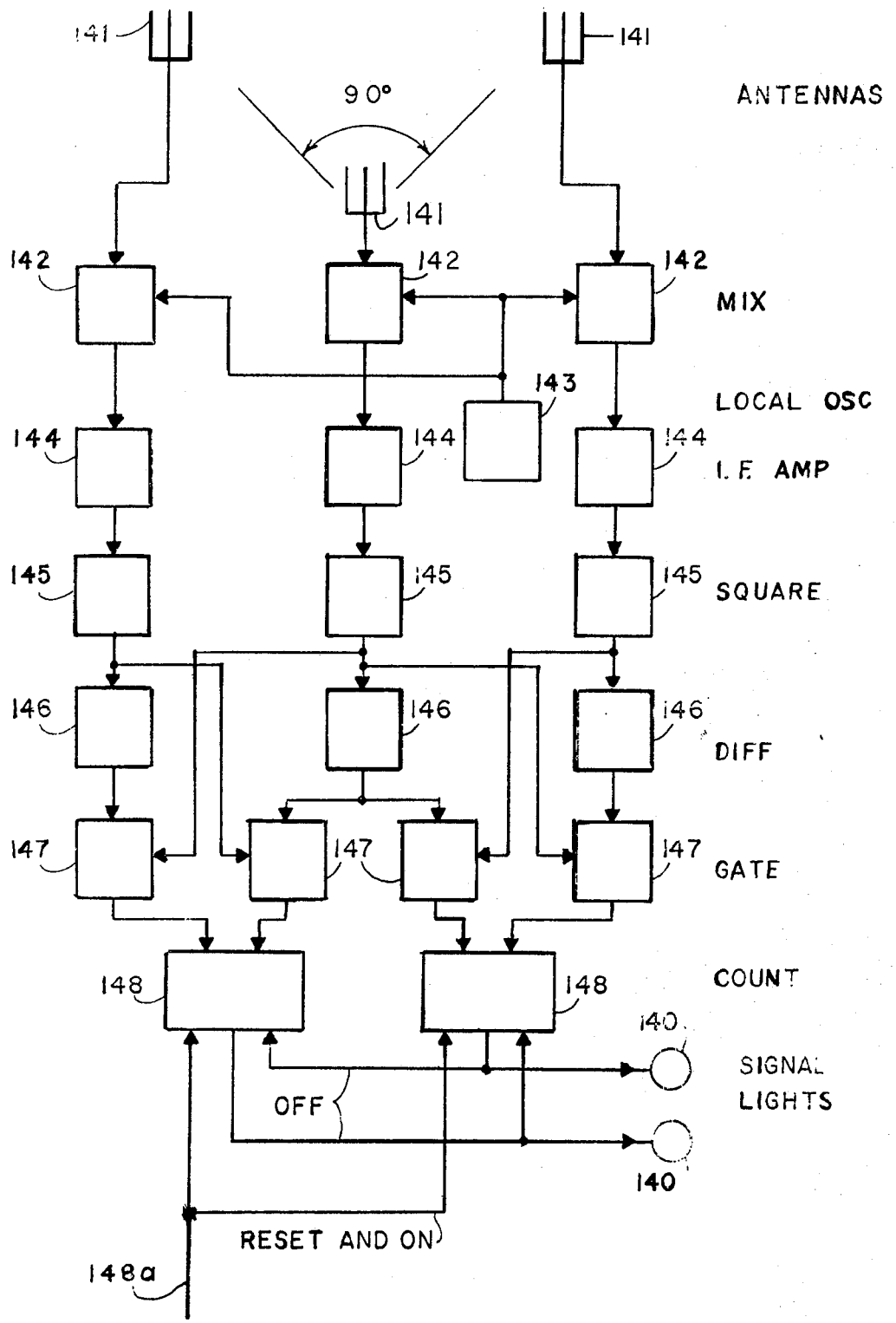
FIG—14

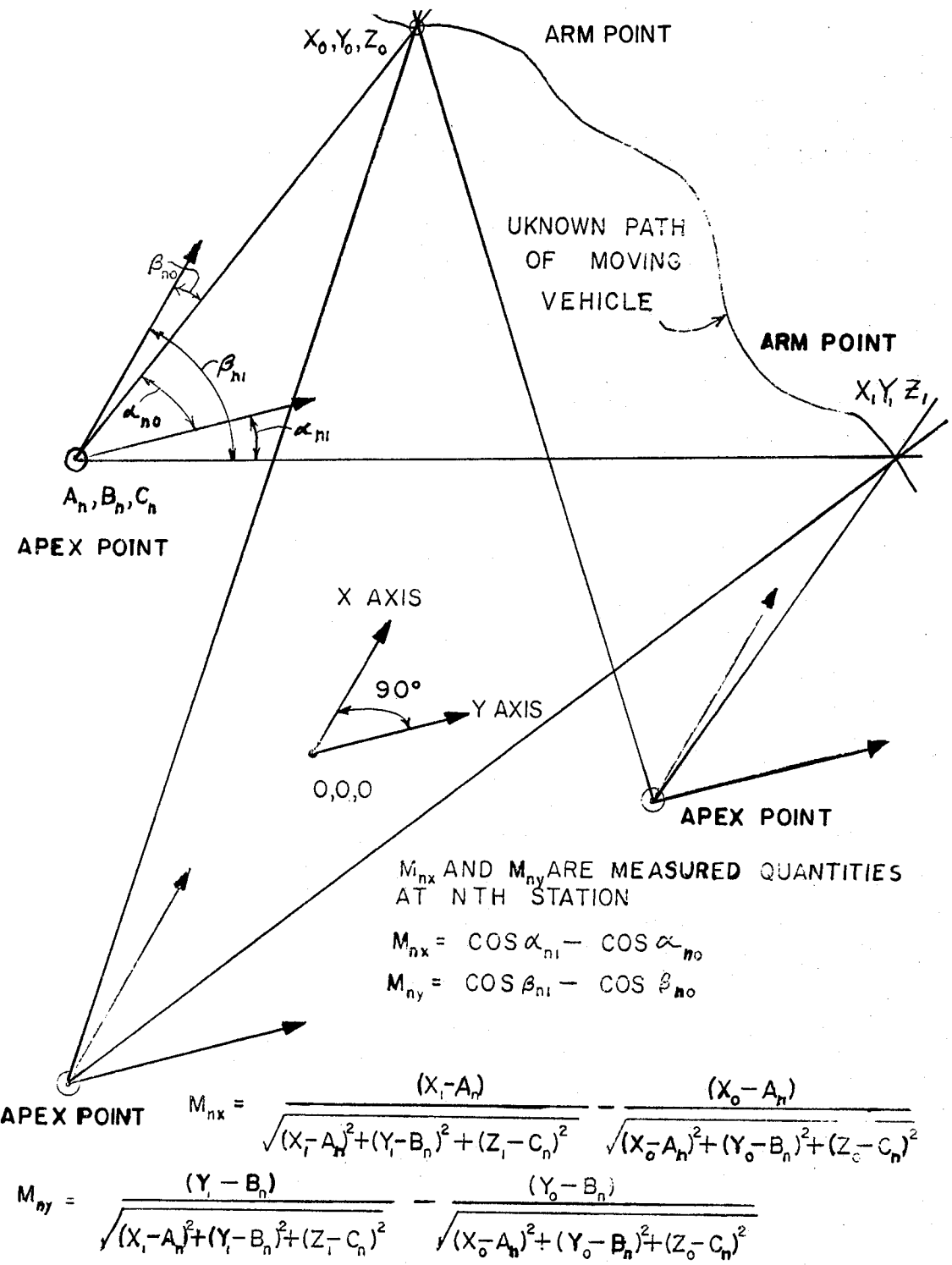
FIG—16

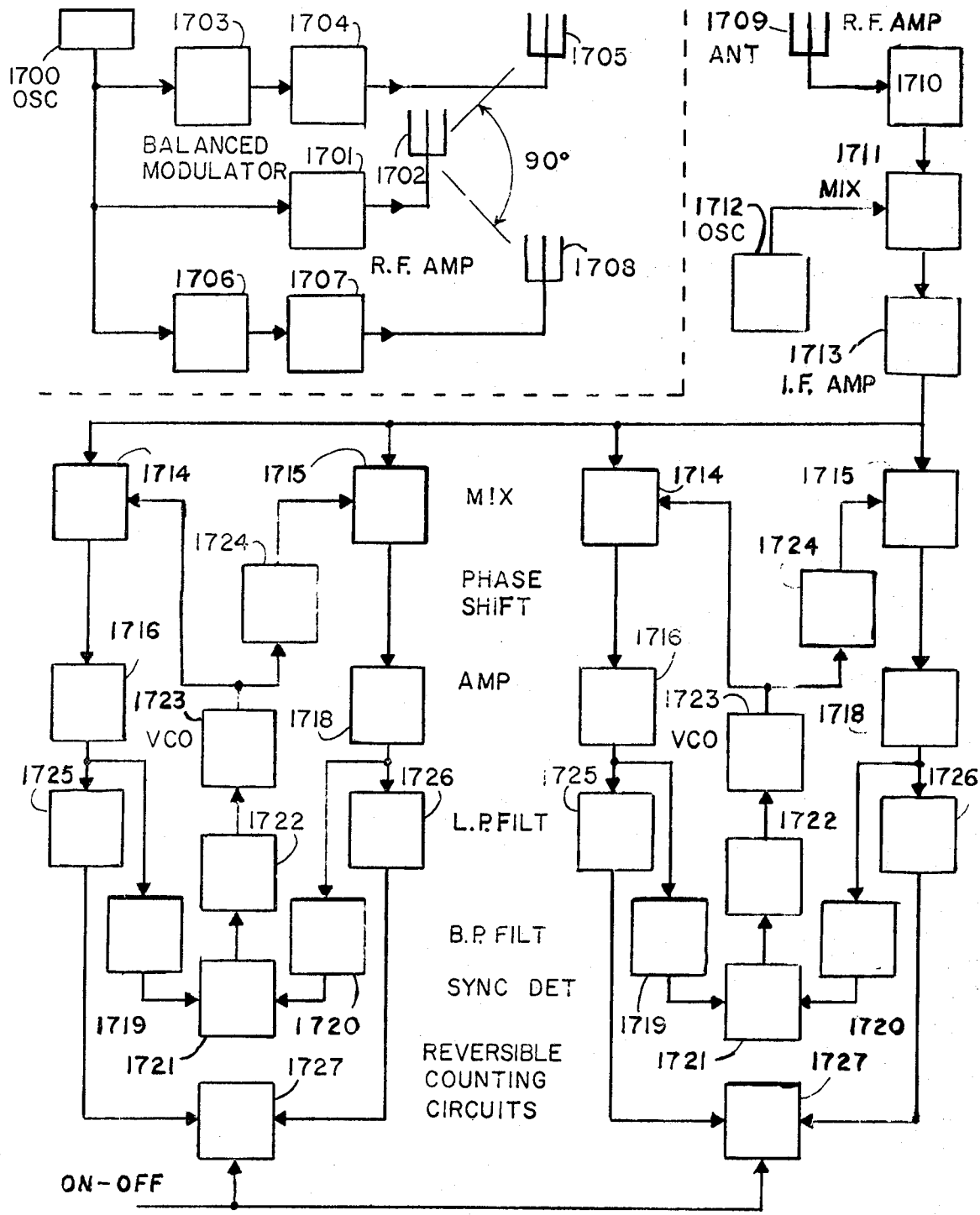
FIG._17

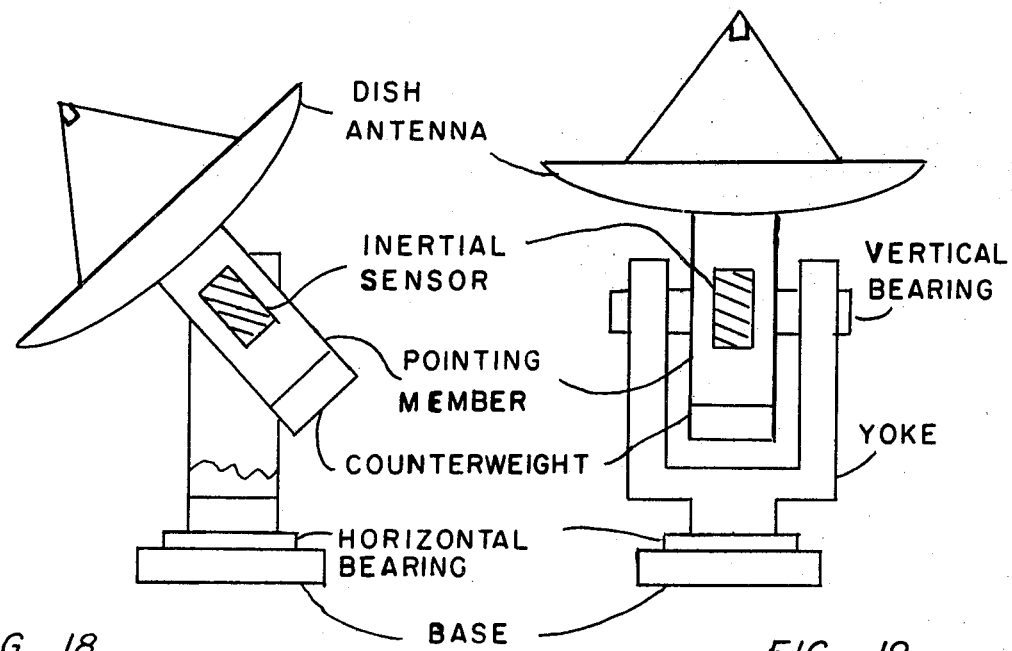
FIG_18    FIG_19
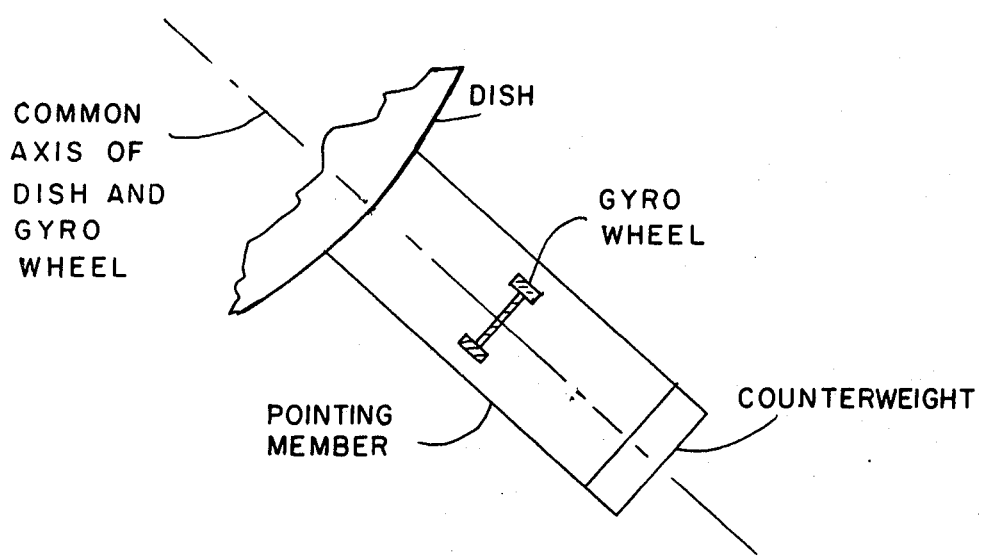
FIG_20

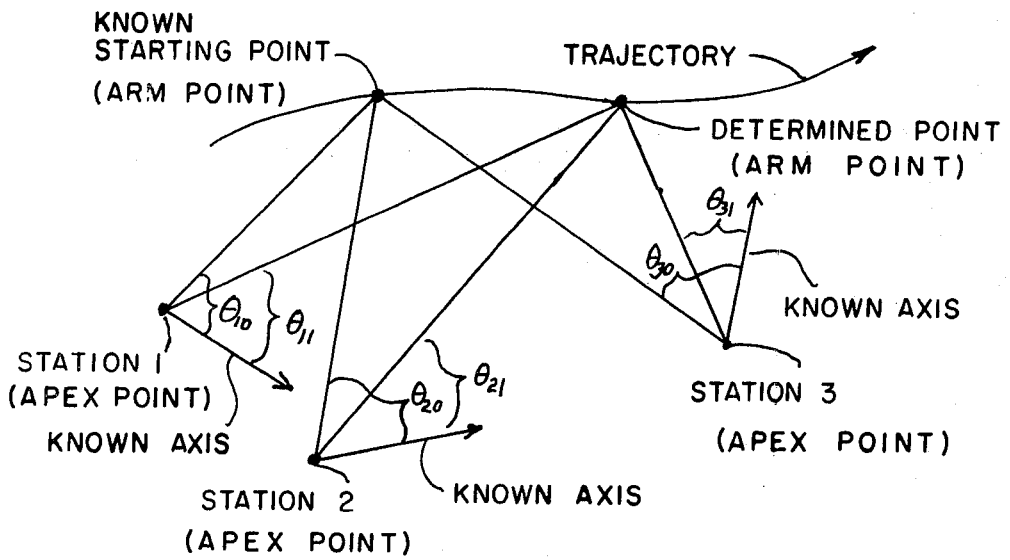
FIG_21
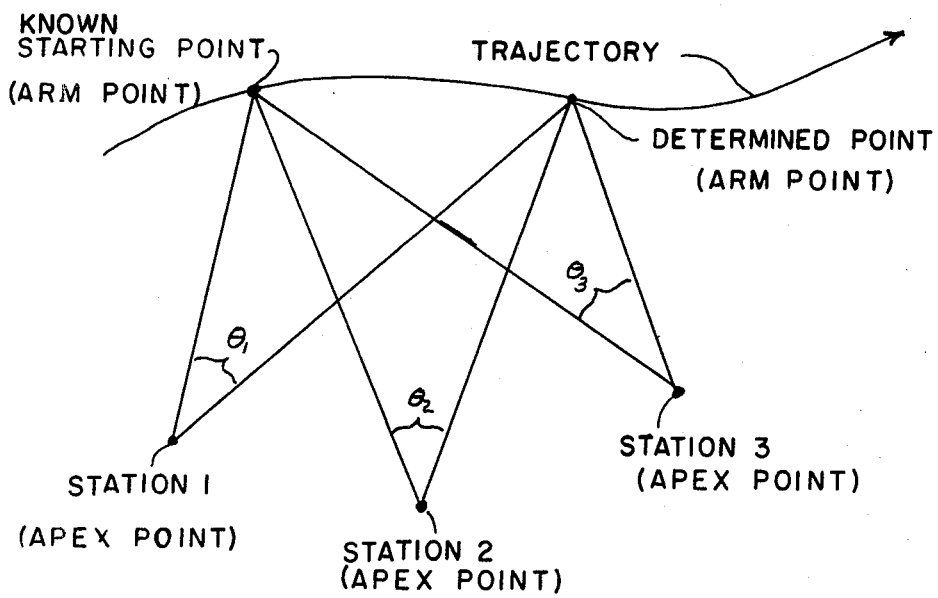
FIG_22

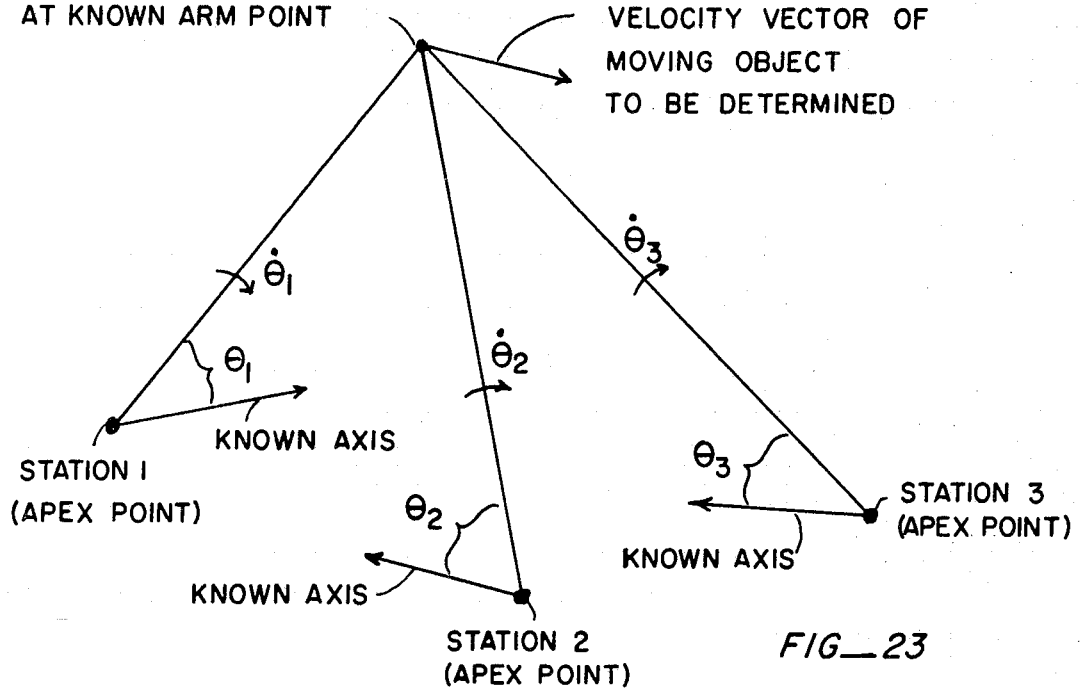
FIG__23
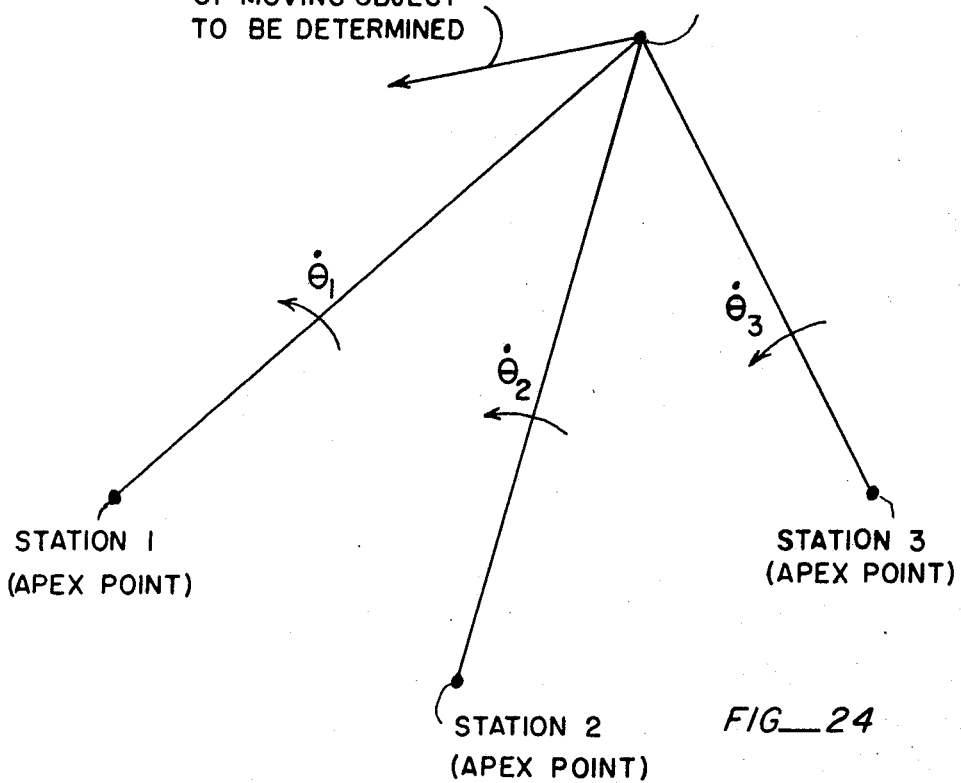
FIG__24

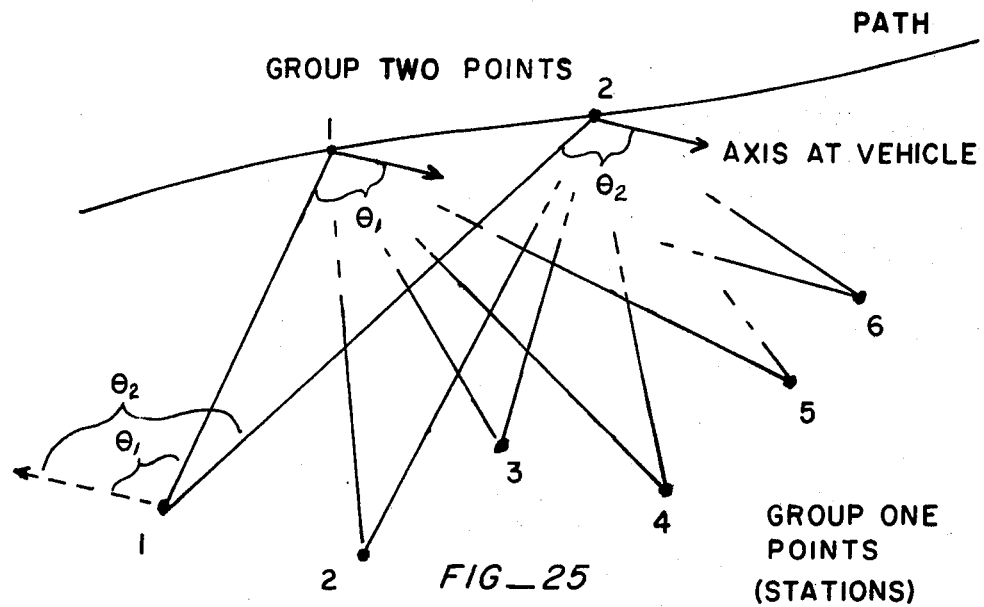
FIG_25
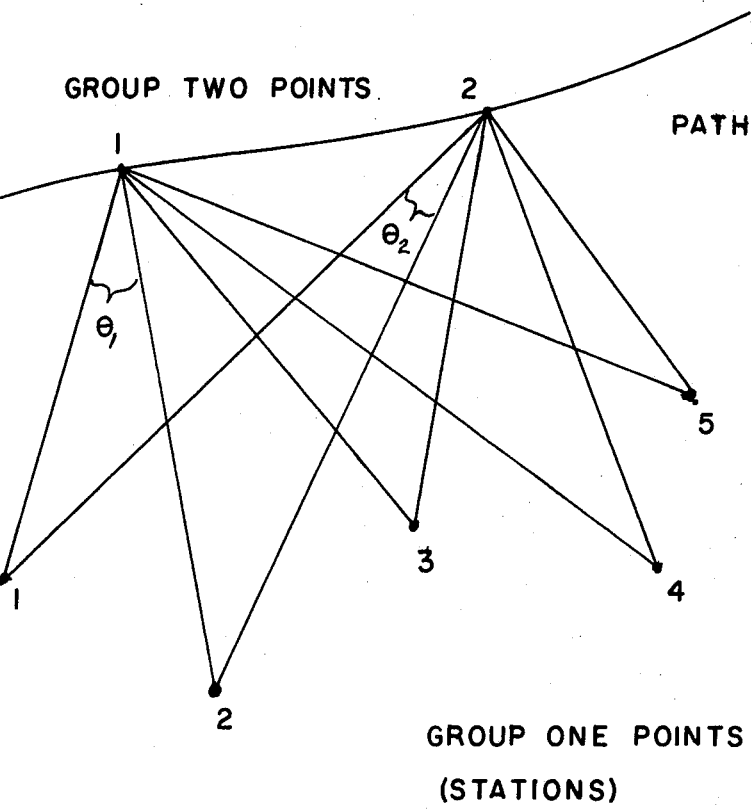
FIG_26

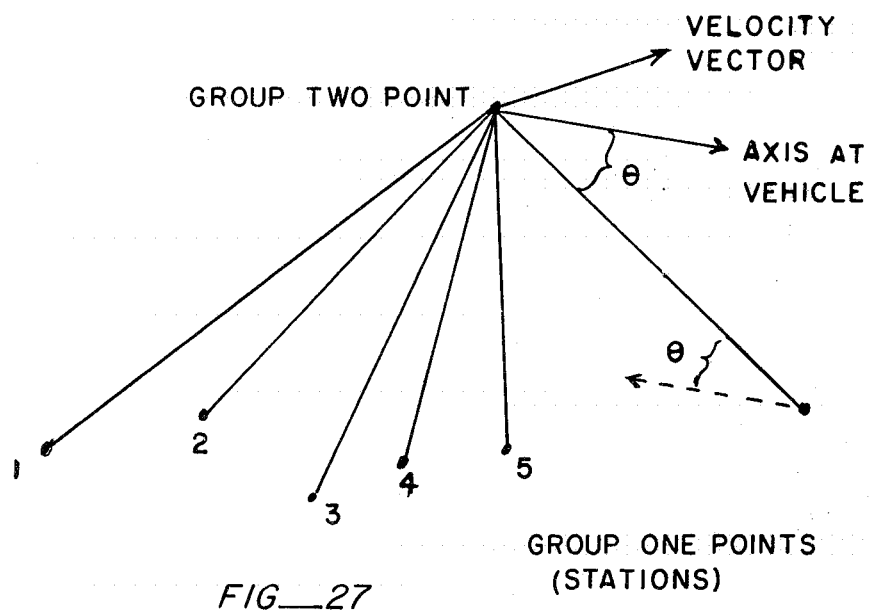
FIG__27
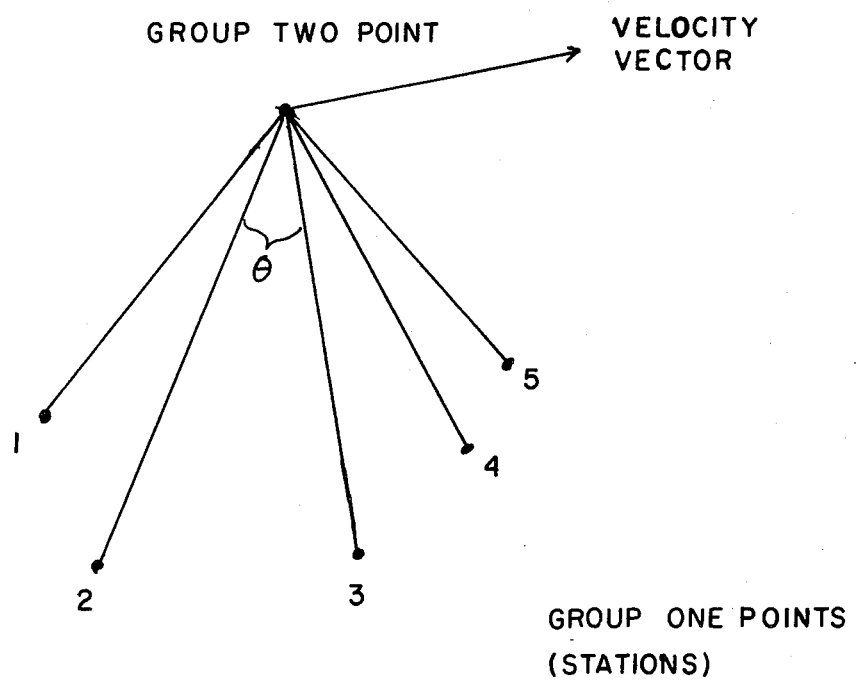
FIG__28

METHOD AND APPARATUS FOR AUTOMATICALLY DETERMINING POSITION-MOTION STATE OF A MOVING OBJECT

CROSS REFERENCES TO RELATED APPLICATIONS

This is a continuation-in-part of copending patent applications Ser. No. 817,765, filed Apr. 21, 1969, now U.S. Pat. No. 3,691,560, issued Sept. 12, 1972, which, in turn, is a divisional application of Ser. No. 420,623, now U.S. Pat. No. 3,445,847, issued May 20, 1969; Ser. No. 86,770, filed Feb. 2, 1961, now Pat. No. 3,706,096, issued Dec. 12, 1972; and Ser. No. 74,180, filed Sept. 21, 1970, now U.S. Pat. No. 3,795,911, which in turn is a continuation-in-part of patent application Ser. No. 278,191, filed May 6, 1963, now abandoned. Other related applications include Ser. No. 335,454, filed Dec. 5, 1963, now U.S. Pat. No. 3,242,487; Ser. No. 289,609, filed June 21, 1963, now U.S. Pat. No. 3,286,263; and Ser. No. 312,598, now U.S. Pat. No. 3,270,340, issued Aug. 3, 1966.

SUMMARY OF THE INVENTION

My invention utilizes a plurality of measurements, sensings, or determinations of angular or trigonometric variations in combination with ancillary measurement, sensing or determination of other quantities to determine at least one dimension of the position-motion state of a moving vehicle or other object. As an example my invention has a position-finding mode in which it is employed to determine the position of a moving wave transmitter by detecting angular or trigonometric variations occurring at each of a plurality of detecting stations. Similarly my invention has a navigation mode in which a receiving equipment is carried aboard a navigating vehicle for detecting angular or trigonometric variations relative to each of a plurality of beacon stations to which the receiving system aboard the vehicle is responsive. My invention also comprises reflective methods and systems. To perform the ancillary determination, sensing, or measuring a number of well known means and methods are available as are optional ancillary elements of the instant invention. My invention comprises means and methods of combining separable methods of determining dimension of the position-motion state which provide improved accuracy and dependability over the more simple methods employing measurement, sensing or other determination of angular or trigonometric variations.

BRIEF DESCRIPTION OF THE DRAWINGS

FIG. 1 is a diagram showing two-aperture geometry;

FIG. 2 is a diagram showing two-aperture circuit using phase measuring device;

FIG. 3 is a diagram showing two-aperture geometry for difference measurement;

FIG. 4 is a diagram showing two-aperture circuit for transmitting, using wave modulation for identification of apertures;

FIG. 5 is a diagram showing two-aperture receiving circuit for measuring rate of change of direction cosine using differentiator;

FIG. 6 is a diagram showing two-aperture circuit for measuring rate of change of direction cosine using frequency discriminator;

FIG. 7 is a diagram showing two-aperture circuit for measuring change of direction cosine using counter;

FIG. 8 is a diagram showing two-aperture circuit for measuring the difference of the direction cosines of two different simultaneous wave fronts;

FIG. 9 is a diagram showing the geometry of direction finding in three-space in accordance with this invention;

FIGS. 10 and 10A are diagrams showing a rotating direction finder;

FIG. 11 is a diagram showing the geometry of four-station position determination;

FIG. 12 is a diagram illustrating the apparatus for four-station position determination;

FIG. 13 is a diagram illustrating a circuit for finding direction using four apertures;

FIG. 13A is a diagram illustrating a circuit for finding increments and rates of change of direction cosines;

FIG. 14 is a diagram illustrating a circuit for finding direction of moving receiver from beacon transmitter;

FIG. 16 is a diagram showing the geometry of a method for finding position in three dimensions using three stations;

FIG. 17 is a diagram showing a circuit using three transmitting apertures for finding direction of receiver relative to transmitter axes;

FIG. 18 is an elevational view of a radio tracking mount equipped with inertial pointing sensor apparatus;

FIG. 19 is another elevational view of the same tracking mount as shown in FIG. 18 but pointing in a different direction;

FIG. 20 is an enlarged view of the pointing member of a radio tracking mount employing a particular form of inertial apparatus and showing the position of a gyro wheel in the pointing member;

FIG. 21 is a diagram of the geometry of a three-station system using a known starting point and separate reference axes;

FIG. 22 is a diagram of the geometry of a three-station system using a known starting point and reference axes through that starting point;

FIG. 23 is a diagram of the geometry of a three-station system for determining velocity with separate reference axes;

FIG. 24 is a diagram of the geometry of a three-station system for determining velocity without separate reference axes;

FIG. 25 illustrates the geometrical properties of a system employing measurement of incremental type variations of beacon bearings at a moving vehicle;

FIG. 26 illustrates the geometrical properties of a system employing measurement of incremental type variations of angles between beacon direction at a moving vehicle;

FIG. 27 illustrates the geometrical properties of a system employing measurement of rate type variations of beacon bearings at a moving vehicle; and FIG. 28 illustrates the geometrical properties of a system employing measurement of rate type variations of angles between beacon directions at a moving vehicle.

APPLICANT'S INVENTION WITH REFERENCE TO THE DRAWINGS

Figure 15:
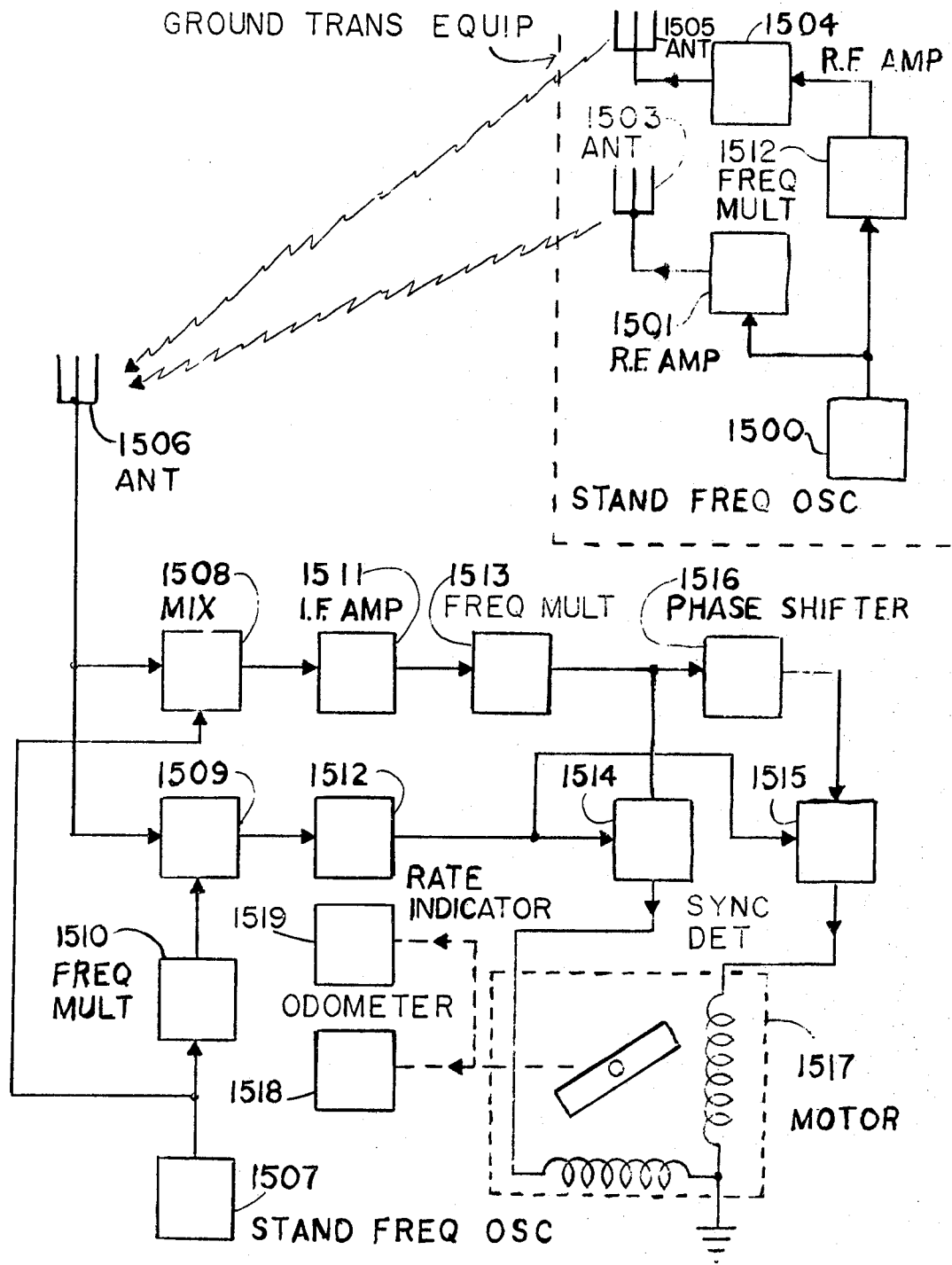
FIG. 15 is a diagram illustrating a circuit for finding direction of a moving receiver from beacon transmitter.

In FIG. 1 is a schematic drawing showing the geometrical relationships between two wave apertures 101 and 102, parts of an equipment for performing a measurement, and an incident planar wave. Theta designates the geometrical angle between the direction of wave propagation and the line joining the two apertures. This geometry is representative of a variety of types of measurement and a variety of devices for performing these measurements. A conventional arrangement for finding the cosine of theta is shown in FIG. 2. The two apertures 201 and 202 are connected by transmission lines 203 and 204 to a phase measuring device 205 which measures the phase between the two arriving signals. This measured phase designated by phi is in direct proportion to the cosine of the angle theta. Assuming that the phase measuring device 205 is accurate, the accuracy and stability of the total instrumentation is dependent upon the accuracy and stability of the apertures 201 and 202 and the transmission lines 203 and 204. The art contains a number of methods for calibrating such equipments and for monitoring and enhancing their stability and accuracy. See for example F. N. Dingley, Jr., U.S. Pat. No. 2,454,783 dated Nov. 30, 1948, for a device to establish the zero of a two aperture system. Also see for example F. J. Lundburg, U.S. Pat. No. 2,465,382 issued Mar. 29, 1949.

In the practical embodiments of my invention using this type of measurement, the phase accuracy or phase balance of the transmission lines 203 and 204 and the apertures 201 and 202 are of no consequence, and there need be no zero setting or known zero point of reference. The relative phase change through the two transmission systems need not be known or calibrated. When the arrangement of apparatus represented in FIG. 2 is employed in practical embodiments of my invention, it is always employed to perform a plurality of successive measurements. Each measurement includes an unknown that is common to each of the other measurements. It is true that such a measurement is a complete measurement in that its resultant or reading can be expressed numerically.

In an alternative method the zero of the scale of the phase measuring device 205 is set at the value indicated as the result of the first measurement in the preceeding paragraph. Successive measurements are then performed directly with reference to this zero setting, and each constitutes a primary measurement. This primary measurement is that of the difference of two direction cosines. Although the measurements cannot be simultaneous, the measured phenomenon may be simultaneous since the waves upon which the measurements are performed may be from different simultaneous sources with different frequencies or identifiable modulation, etc. On the other hand, the measurements may be performed relative to successive positions of the same wave source. The typical geometrical relationships involved in this type of primary measurement is indicated in FIG. 3. As in FIG. 1, the thetas represent the geometrical angles between the direction of propagation of the waves incident upon the apparatus and the line joining the phase centers of the two apertures.

The same principles apply to transmitting apparatus arranged so as to provide a directional beacon. Such an apparatus is shown schematically in FIG. 4. In this instance the angles whose cosines are to be measured are at the site of the transmitter rather than at the receiver. The receiver, which may be aboard a moving vehicle, has only a single aperture. The transmitter has two apertures 401 and 402. It is necessary for the receiver to be able to identify the waves coming from each of the two transmitting apertures so in this example the identification is provided by a pair of modulators 403 and 404, each of which modulates the signal from the oscillator 405 in such a manner as to identify the signal fed to the corresponding transmitting aperture. As with the equipment represented in FIG. 2, the phase delay through the modulators 403 and 404, the transmission lines 406 and 407, and the apertures 401 and 402 must be stable and accurate if the apparatus is to provide an accurate measurement of the cosine of the angle between the line to the distant receiver and the line between the apertures. However, as in the receiving apparatus, the problem of accurate phasing in this equipment does not exist since the primary measurement consists of the measurement of the difference of two cosines. These two cosines result from the same receiver being first at one place for a first reading or zero set and then at another place for the termination of the measurement. In some instances two separated receivers perform the reading function at separated points and the resultant data communicated to a common point the one element of data being there subtracted from the other to provide a synthesized element of primary data. In the manner described, the knowledge of or balancing of the relative phase shift through the two arms of the equipment is not required. The principles of my invention are the same whether applied to beacons or to direction finders or other systems.

Another embodiment of my invention employs measurements of the time differential of the cosine of the wave incident upon an apparatus represented by FIG. 5 containing two wave apertures 501 and 502, transmission lines 503 and 504 and a phase measuring device 505 identical to that shown in FIG. 2. However, in this embodiment the output of the phase-sensitive device 505 is differentiated with respect to time in differentiator 506. As the direction of the source of waves changes, the cosine of the angle theta also changes as a function of time, and the measured value of this quantity is the primary measurement of the system. Since this is a differential measurement, any constant unbalance of the phase shift through the two arms of the apparatus does not influence the value of the measurement.

Another embodiment of my invention, shown in FIG. 6, employs the same type of fundamental measurement as that performed with the apparatus shown in FIG. 5, but differs in the process of performing the measurement. As before, the phase delay in the two arms consisting of apertures 601 and 602 and the transmission lines 603 and 604, respectively, are not necessarily balanced or known. The transmission lines 603 and 604 feed a mixer 605. The frequency of the signal at the output of the mixer 605 is that of the difference between the frequencies of the signals at the two apertures 601 and 602 and is the result of variation of the angle theta as described. Another viewpoint is to say that the rate of change of range between the source and one of the apertures is not equal to the rate of change of range between the source and the other aperture with a consequent unbalance doppler effect. The signal from the mixer 605 is fed into frequency discriminator 606 where a voltage proportional to the frequency is developed for indicating purposes.

FIG. 7 shows an apparatus similar to that shown in FIG. 6. The apertures 701 and 702, the transmission lines 703 and 704, and the mixer 705 may be indentical with those shown in FIG. 6. However, there is a substantial difference in the fundamental nature of the primary measurement performed by the apparatus shown in FIG. 7. The discriminator 606 is replaced by a counter 706. Thus the primary measurement is that of the net difference in phase shift occurring in a time interval governed by the on-off signal controlling the operation of the counter. This net change in phase between the two signals fed to the mixer 705 is owing to a finite increment in the angle between the line joining the apparatus and the distant source of waves and the line joining the two apertures. From the doppler viewpoint, one may say that the measurement is the result of unequal changes in the ranges from the apertures to the source of waves. The quantity measured is the difference in the two direction cosines corresponding to the epochs of the "on" and "off" signals to the counter.

FIG. 8 shows an apparatus for the simultaneous measurement of the difference in the cosines of the two angles $\theta_1$ and $\theta_2$ indicated in FIG. 3. The measurement essentially is that of taking the difference of two simultaneous measurements of the cosines of an angle as described relative to FIG. 2. The means of separation of the two separate simultaneous signals is not included in the diagram. The phase shifts in the apertures 801 and 802 and the transmission lines 803 and 804 must be equal for the signals corresponding to the two incident waves. Furthermore, the response of the two phase measuring devices 805 and 806 should be alike. The difference between the outputs of the phase measuring devices 805 and 806 is formed in subtractor 807, the output of which is the primary measurement. Inequality in the phase shifts through the two arms formed by apertures 801 and 802 and transmission lines 803 and 804 do not affect the measurement.

FIGS. 2 through 8 are simplifications of the actual apparatus and are only represented to indicate the underlying principles of the various measurements which are operative in some of the embodiments of my invention. It is to be noted that under certain conditions ambiguity can arise in measurements of instantaneous phase difference as described for FIGS. 2 and 8. This ambiguity can result from the separation of the apertures by distances greater than one wavelength. Methods of resolving this ambiguity by the use of additional apertures with smaller separation in the additional pairs of apertures are common. Such an arrangement is employed in the "Azusa" system. In measurements of the time derivative of the phase difference, there is no problem of ambiguity regardless of the separation of the two apertures. Similarly, the type of measurement in which a continuous recording of the net change in the difference of phase between the apertures is performed, as indicated in FIG. 7, there is no problem of ambiguity regardless of the separation of the apertures relative to the wavelength.

The variety of techniques and apparatus for measuring functions of the cosine described are employed in both simple and more complicated embodiments of my invention. In some embodiments there are a plurality of pairs of apertures all fixed in position relative to each other. In some embodiments the plurality of pairs of apertures are located at the same site. In other embodiments the different pairs of apertures are located at separate sites, and in still other embodiments there is a plurality of pairs of apertures at each of several sites. In some embodiments the pairs of apertures are in motion, in translation or in revolution. Thus the change in cosine or the rate of change of cosine measured may be the result of motion of the measuring apparatus instead of or in addition to motion of the other end of the wave communication means.

There are other methods of measuring the various functions of cosines in addition to the use of paired apertures. Such methods include the well known phased array. In at least one equipment of this type there are many apertures arranged in a straight line. These apertures may be connected by elements possessing a controllable phase shift. By measuring the phase shift required to receive or transmit waves in a given direction, one is able to measure the cosine of the angle associated with that direction. Another method of measuring the direction cosines and the functions thereof is the use of an aperture that provides a signal proportional to the amount of energy or power intercepted by it. The intercepted energy is the product of the wave or field times the cosine of the angle between the direction of propagation and the perpendicular to the aperture face, in the manner shown in FIG. 1. The field strength must be known or otherwise eliminated as an unknown in the system. The field need not necessarily be a field of radio waves. Radiant heat would be suitable for such an application. Light waves can be used, either coherent or noncoherent. The list of such devices known to the art is great and this application cannot list them all. The apertures shown in FIGS. 2 and 8 inclusive may be directional or nondirectional. Use of light waves as with lasers provides apertures affording a very high ratio of width of aperture or separation of apertures to wavelength.

Included in the measurement techniques employed in the various embodiments of my invention are techniques for measuring cosine functions relative to one or more clusters of sources of waves or other field sources. These clusters of sources may of themselves be stationary or moving, the embodiments of my invention measuring position dimensions of units of the cluster relative to each other.

In instances where the cluster is composed of sources of the same source frequency, or is composed of reflecting targets, the doppler phenomenon provides a means of separating the signals of the various sources when they are in motion relative to the detecting equipment.

In those embodiments of my invention dependent upon the measurement of variation of cosine of the angle of coincidence of a plane wave wherein the signals from two apertures are mixed to obtain the measured signal, there is a relationship between the distance of separation of the apertures, the length of the wave, and the signal-to-noise ratio and the accuracy with which the measurement may be performed. For a given signal-to-noise ratio and a given wavelength, the accuracy of the measurement is increased as the distance between the apertures is made larger. This condition obtains until the distance between the apertures is made so large that the wave front may no longer be considered to be a plane. This is the condition in which the distance between the apertures becomes appreciable in comparison with the distance from the stations to the source of the waves. In a multiple station system we may add that the distance between the apertures can no longer be regarded as negligible compared to the distance between the stations. The measurement of the variation of the cosine of the incident wave front and the line between the apertures is effectively frustrated when the distance between the two apertures becomes appreciable in comparison to the other distances involved in the geometry of the system. With a given signal-to-noise ratio and a given wavelength it is of advantage to make the distance between the apertures used for a given measurement as large as one can without introducing the above described geometrical consideration. The cosine type measurement is admittedly an approximation based on the assumption of a distant source of waves. However, this condition is very closely approximated in my invention. Depending on the particular geometry of a given system configuration, the allowable separation of the apertures can be determined by calculations. One may then select the wavelength and the source power so as to achieve the necessary measurement accuracy. The necessary measurement accuracy is also dependent upon the geometrical considerations of the system, but in a different manner from the considerations that determine the aperture separation. If sufficient signal-to-noise ratio is available, or if the wavelength is sufficiently short, there is no practical geometrical limitation of the system on the minimum separation of the apertures. In fact, the smaller the aperture separation, the smaller is the geometrical error in the cosine measurement. One may improve the accuracy of the system then by increasing the frequency and the signal-to-noise ratio and reducing the aperture separation. Within the limits of the cosine approximation (the assumption of a planar wave across the entire diameter of the station) the aperture sepration in no way affects the accuracy or the performance of the system as far as geometrical considerations are concerned. The only item affected by the aperture separation, once the cosine approximation (flat wave front) is achieved, is the effect of noise on the actual measurement itself, and there are no geometrical error considerations of the system associated with this separation distance.

Geometry and Calculations

My invention may be employed to determine the direction of waves transmitted or received by a station, and to determine relative position of sources, receivers and reflectors of waves. Each determination of desired data employing my invention involves the application of a geometric principle and an apparatus or technique for measuring or otherwise knowing one or more differences, changes, or rates of change of one or more geometrical quantities. Some of the advantages of my method stem directly from the cancellation or balancing of error effects generally inherent in measurements of change, rate of change, and difference. Similarly, my invention in some instances makes possible the use of measurements of quantities containing an unknown component which is cancelled in taking the difference of two such measurements.

In using my invention to determine the desired geometrical quantity from measurements of change, difference, or rate of change, it is often necessary to perform some mathematical calculation based on some geometrical principle or principles. There is a calculable ratio of the errors in the final determination of the magnitudes of the computed quantities and the errors in the measurements which determine, describe, specify or bound the position of a point. This fact is true even though the computations themselves are performed with perfect accuracy. This phenomenon may be expressed as an error ratio. It is one of the advantages of my methods that this ratio may be kept within reasonable bounds and in some embodiments this ratio may be reduced to extraordinarily low values. The word "ratio" is used here in an extended sense to include the mathematically descriptive matrix of partial derivatives which relates a multiplicity of minute measurement variations to a corresponding multiplicity of minute variations in the determined quantities.

In some embodiments of my invention the geometrical relationships that are applied to the solution for desired quantities are very simple, in other embodiments these relationships are somewhat subtle and sometimes even complicated. Similarly, the mathematical procedures necessary for determination of the unknown quantities based upon the applications of these geometrical principles vary greatly in complexity. In some instances a slide rule or a calibrated nonlinear scale is adequate; in other applications a high speed digital computer is employed to provide solutions in reasonable time. Furthermore, there are embodiments of my invention that incorporate a number of more simple embodiments of this same invention. A general description of these underlying geometrical principles and the mathematical procedures necessary for their exploitation is provided in this section of my application.

Although measurements relative to angles and cosines of angles are the types of measurements described most frequently in this application, it is quite possible to apply the principles of my invention to embodiments involving the measurement of other transcendental functions.

One of the simplest measurements to perform is that of the change of cosine of a changing angle. This measurement provides an equation:

$$M = \cos\theta_2 - \cos\theta_1$$

where $M$ is the reading of the measurement and theta sub one and theta sub two are the angles at the initiation and at the termination of the measurement, respectively. Since there are two unknowns and only one equation, another equation is needed in order to determine the two angles. Another equation can be obtained in a number of ways, two of which are remarkably simple. The first is to perform a similar measurement simultaneously but employing a different axis or orientation. To keep the mathematics simple, one may choose an axis at the same position and at right angles to the first measurement. In this manner the difference of the sines of the two angles is measured and the second equation is made available:

$$M_2 = \sin\theta_2 - \sin\theta_1$$

Solution of these two simultaneous equations for the unknown equation is obvious.

Another method of obtaining the second equation is to measure or establish the difference between the two angles. This relationship may be effected by measuring the difference in angles simultaneously with the measurement of the difference in cosines. The resulting equation is then $$M_2 = \theta_2 - \theta_1$$

Where $M_2$ is the reading of the measurement. The equation may also be derived by rotating the cosine measuring device through a known and fixed angle relative to the base leg or standard direction of the instrument. Making the angular difference $M_2$ equal to ninety degrees simplifies the mathematical procedures.

Similar statements hold for infinitesimal or differential variations, and one may write:

$$M_1 = \cos\theta d\theta \text{ and } M_2 = d\theta$$

The equations can be solved for $\theta$ and $d\theta$.

Using these same types of measurement, directions may be determined in three dimensional space. If the angular motion of the source or receiver relative to the station cannot be measured or controlled (as by rotation of the instrument at the station) the directions may be determined by measuring the changes of the direction cosines relative to three separate noncoplanar axes through the station. The axes need not be orthogonal, but, as before, the mathematics are simplified when the axes are made orthogonal to each other. Two consecutive or overlapping measurements are performed simultaneously relative to all three axes. The geometry associated with two overlapping measurements is shown in FIG. 9. There are shown two rectangular boxes. The lengths of the edges of each box represents the changes in direction cosines corresponding to each set of simultaneous measurements. These edges also have a polarity or sense as indicated by the measurement. The three points A, B and C are unit distance from the origin. A represents the direction of the target at the initiation of both the first and second measurements. B represents the direction of the target source or receiver at the termination of the first measurement, and C represents the direction at the termination of the second measurement. The use of overlapping measurements is a matter of convention, and sequential measurements would provide the identical results. The dimensions of the boxes and their position relative to each other is known by the measurements. The edges of the boxes are of course parallel with the axes of the system as determined by the axes of the three measuring devices. Thus the three points A, B and C are located relative to each other. The translational orientation of the boxes and the points is determined by the three unit radii from the origin to the points A, B and C.

A simple method of solution of the problem is to express the geometrical relationships in terms of cartesian coordinates, solve for the cartesian coordinates of the points A, B and C on the unit sphere, and then convert the data thus acquired into whatever angular dimensions are desired, or employ the direction cosines thus determined directly.

If the direction cosines relative to the points A, B and C of FIG. 9 are respectively
$X_0, Y_0, Z_0$;
$X_1, Y_1, Z_1$; and
$X_2, Y_2, Z_2$
the following equations may be written: where M, N and P are measured values:
from geometry
$X_0^2 + Y_0^2 + Z_0^2 = 1$
$X_1^2 + Y_1^2 + Z_1^2 = 1$
$X_2^2 + Y_2^2 + Z_2^2 = 1$
from measurement
$X_1 - X_0 = M_1$
$Y_1 - Y_0 = N_1$
$Z_1 - Z_0 = P_1$
$X_2 - X_0 = M_2$
$Y_2 - Y_0 = N_2$
$Z_2 - Z_0 = P_2$
from which are obtained the equations:
$2M_1X_0 + 2N_1Y_0 + 2P_1Z_0 + (M_1^2 + N_1^2 + P_1^2) = 0$
$2M_2X_0 + 2N_2Y_0 + 2P_2Z_0 + (M_2^2 + N_2^2 + P_2^2) = 0$
These latter two linear equations can be solved for $X_0$ and $Y_0$ in terms of $Z_0$. Substitution of these results in the first equation provides the value of $Z_0$ with a sign ambiguity that must be resolved from the mechanics of the particular system involved.

It is of interest to note that the direction determination by this method cannot be accomplished in three dimensions without two contiguous sets of measurements. This point is graphically illustrated, as shown in FIG. 9, by the requirement for three known distances from three separate points to locate a fourth point relative to the three points. Furthermore, no matter how many measurements are performed, measurements relative to three noncoplanar axes are necessary.

Rotation of an aperture array may be substituted for motion of target for the determination of bearings of the target relative to axes of the array. The array can be distributed in one, two, or three space dimensions; and the rotation can be about a single axis or may be of a more complicated nature involving two or three axes of rotation. Examples of the more simple versions of these rotating arrays are described herein to illustrate the principle, and it is not intended to limit my invention to these forms.

The rotation of an array comprising two apertures disposed at right angles to each other about an axis of rotation comprised by both planes provides a method of obtaining the direction of a target. Furthermore, it is possible employing my methods to determine the rotation of the array relative to the direction of the target. An aperture rotating about an axis of rotation can be employed to determine the direction of the target.

In FIGS. 10 and 10A is shown the unit sphere geometry of a rotating system comprising a pair of orthogonally spaced axes rotating in the horizontal plane about the vertical axis. The horizontal plane shown in FIG. 10 corresponds to the x-y plane of FIG. 9. The axis of rotation corresponds to the z axis in FIG. 9. The Greek letters represent the angles indicated and the letters M and N indicate the measured values of the changes of the direction cosines relative to the two orthogonal axes of apertures of the array.

FIGS. 10 and 10A are orthogonal projections. FIG. 10 is a full view of the plane in which the array is rotated. The array is considered for the purpose of this explanation to be confined to the plane of the rotation. FIG. 10A is a diagonal projection in which the y-z plane is projected as a vertical line. The points marked S in both figures correspond to the starting point, the point where the measurement of the changes of direction cosines is initiated. The points marked T in both figures correspond to the point where the measurement of the changes of direction cosines is terminated. The changes of direction cosines are measured relative to the x axis and the y axis and are designated M and N, respectively. The angles of the actual direction cosines are not shown in the figures in order to reduce confusion of the drawings. The angles marked theta are confined to the x-y plane. The angle theta sub one corresponds to the initiation of the measurements of changes of direction cosines. The angle theta sub two corresponds to the termination of the measurements of direction cosines. The angle phi is the elevation angle, and this angle remains essentially constant during the measurement. The angle phi is the angle between the radius from the array to the target and the x-y plane. The angle psi is the difference between the angles theta sub two and theta sub one and is similarly confined to the x-y plane. In the FIGS. 10 and 10A the initiation of the measurements is indicated to occur in the fourth quadrant of the x-y plane and direction is counterclockwise. Thus, the angle theta sub one has a negative value numerically. In this explanation the x-y plane, the plane of rotation of the array, is assumed to be horizontal as shown in the FIGS. 10 and 10A. It is seen that when the angle psi through which the array is rotated is known, there are enough equations to determine the horizontal angles corresponding to the initiation and termination of the simultaneous measurements of the change of direction cosine M and the change of direction cosine N. It is also seen that the elevation angle which is constant during the simultaneous measurements is also determined and can be computed from the measurements.

If the angle through which the array is rotated is not known, it is still possible to derive useful information relative to the horizontal angles. This information is simply the average of the two horizontal angles. Under these conditions it is not possible to derive the vertical angle phi or either of the horizontal angles corresponding to the initiation or termination of the simultaneous measurements, but it is possible to determine the value of the horizontal bearing lying half way between the bearing corresponding to the initiation of the simultaneous measurements and the termination of the simultaneous measurements. This midway horizontal bearing is of particular usefulness when the measurement corresponds to a very small angle of rotation. There are two benefits derived from the shortness of the measurement in this case. The angle between the known center horizontal bearing and the horizontal bearing corresponding to the termination of the measurement is not so large. The target elevation and azimuth angles have less opportunity to change significantly.

If the target lies in the plane of the array and in the plane of rotation the angle phi is equal to zero, and it is not necessary to measure or otherwise know the angle psi through which the array is rotated. Rather, the angles of measurement initiation and termination may both be determined from the measured values of the changes of direction cosines by solution of the equations shown in FIG. 13.

Employing a single aperture and knowing, by measurement or control, the angles of rotation corresponding to the series of measurements, the same measurements may be performed as may be performed using an array of more apertures, and the same results are obtained. It is to be emphasized that the angles of rotation must be known relative to the target direction. Such operation is identical geometrically to the method wherein two orthogonal apertures are employed and the two measurements are performed simultaneously through a known angle of rotation. A particularly simple method employs overlapping measurement, each corresponding to a rotation of the aperture of 180°. The two measurements are performed over rotation intervals ninety degrees apart. The full values of the direction cosines of the target bearings relative to the axes corresponding to the initiations and terminations of the measurements are determined simply by dividing the measured values by two.

In practical applications it is sometimes desired to determine the angle of rotation of target about the axis of rotation of the array, or equivalently to determine the rotation of the array about its own axis of rotation relative to the target employing only the measured values of the changes of direction cosine for this purpose. It may also be desired to determine the elevation angle phi simultaneously. These objectives may be achieved, provided the bearing of the target relative to the axis of rotation remains substantially unchanged, by performing a series of measurements during the rotation of the array comprising two axes of apertures. With reference to FIG. 9, if the array lies entirely in the x-y plane and rotation of the array is about the axis, the points A, B and C will all have the same z coordinate and lie in a circle in a horizontal plane. This condition is the result of the rotation of the array about the z axis.

With reference to FIG. 9, if the array lies entirely in the x-y plane and the z axis is the axis of rotation of the array, the points A, B and C lie on a circle concentric with the z axis and in a plane parallel with the x-y axis. The determination of the sides of the rectangles defined by the coordinate axes, and the measurements of the changes in the direction cosines as the rotation occurs, establishes the size of the circle and hence the position of the three points on it. Thus, the elevation angle is determined, or equivalently, the constant value of the z axis direction cosine is determined.

If the three points A, B and C in FIG. 9 have the direction cosines, as indicated previously, the direction cosines may be determined through the measurement of the changes in their values as follows:

from geometry
$X_0^2 + Y_0^2 + Z_0^2 = 1$
$X_1^2 + Y_1^2 + Z_1^2 = 1$
$X_2^2 + Y_2^2 + Z_2^2 = 1$ from measurement
$X_1 - X_0 = M_1$
$X_2 - X_0 = M_2$
$Y_1 - Y_0 = N_1$
$Y_1 - Y_0 = N_2$ from rotation
$Z_2 = Z_1 = Z_0$ we drive the two linear equations
$2M_1X_0 + 2N_1Y_0 + M_1^2\ N_1^2 = 0$
$2M_2X_0 + 2N_2Y_0 + M_2^2 + N_2^2 = 0$ The direction cosines of the point A relative to the x and y axes are at once determined by the simultaneous solution of these two equations and the remaining direction cosines are determined from the equations above. The fortunate advent of the two linear equations without the necessity of introducing an additional measure point is to be noted.

Each of these configurations of cosine change measuring devices applied to angle determination may also be employed using measurements of rate of change of cosine and higher derivatives. In this case measurement is made of the derivative of the cosine or other function with respect to time or with respect to rotation.

In a non-rotating arrangement employing cosine measurements relative to a pair of orthogonal axes, the tangent of the angle between the target and one of the axes is the ratio of the two derivatives. In extending this configuration to three axis operation with the addition of a third axis, it is necessary to measure the second derivatives of the direction cosines as well as the first derivatives just as it was necessary to measure two contiguous increments of the cosine in order to define a direction employing incremental measurements.

The appropriate differential equations relative to this mode of operation are $X^2 + Y^2 + Z^2 = 1$
$XdX + YdY + ZdZ = 0$
$Xd^2X + Yd^2Y + Zd^2Z = 0$ Where X, Y and Z are the direction cosines that it is desired to determine and the differential quantities are all known as a result of the measurement. There are thus three equations in three unknowns. The equations are not homogenous and are independent and can be solved simultaneously. The second derivatives may be obtained by including a differentiator at the output of the apparatus. The second derivative may also be approximated by use of either of these equipments to perform two measurements of rate of change over a very small interval, taking the difference of the two measurements and dividing by the interval. The first and second derivatives may also be approximated in a very practical sense. A first and a contiguous second measurement are taken over equally very small intervals. Either of these readings may be employed to represent the first derivative. The difference between the two may be employed for the second derivative.

The first and second readings may also be employed in separate equations. This is a simpler approach. The resulting set of simultaneous equations is then:

$X^2 + Y^2 + Z^2 = 1$
$X \Delta X_1 + Y \Delta Y_1 + Z \Delta Z_1 = 0$
$X \Delta X_2 + Y \Delta Y_2 + Z \Delta Z_2 = 0$ Where $\Delta X_1$, $\Delta Y_1$, $\Delta Z_1$, $\Delta X_2$, $\Delta Y_2$, $\Delta Z_2$ are the measured small increments in the values of the direction cosines.

A further insight into the differential operation of the three axis system may be obtained by referring to FIG. 9. If the two measurements are taken over ever smaller intervals, the incremental values of cosine similarly become ever smaller. The edges of the boxes also become ever smaller. The three points A, B and C remain on the surface of the sphere and define a plane. As the increments become smaller, the three points converge on a single point and the radials from the origin become nearly parallel. At this condition the perpendicular to the plane of the three points is the desired direction. Equations derived from this approach are the same as those shown immediately above.

In rotating systems the derivatives are taken with respect to the angular rotation. The extension of apparatus and mathematics to cover this mode of operation is ordinary.

Having the capability of determining the direction of an object one can locate the position on a reference frame of the object by determining its direction from two points on the same reference frame. If only one directional dimension, an angle or a direction cosine, is available at each station, the position of the object can be determined relative to three stations. If two dimensions of direction are available at one station and only one dimension of direction are determined at another station, the position of the object is determined. The systems discussed so far in this section may be combined into larger systems for determining position, and the synthesis of such larger systems is a matter of routine.

In addition to these obvious system arrangements there are other embodiments of my invention in which the data derivable relative to any individual station has little or no usable characteristic or dimension in itself. However, in combination with the data derived relative to other stations such data can be used to derive position coordinates. These embodiments of my invention do not require the use of rotating instrumentation.

The general method is simple. Enough measurements of the right kind are performed relative to the motion or position of the object or objects that no other position or motion of the object could result in the same set of measurements; and the desired data is computed using the resultant readings of these measurements. The art lies in the selection of a usable and convenient set of measurements and in the synthesis of usable and convenient methods of processing the data. These two functions of measurement and computation are interrelated in the manner in which their characteristics affect the character and efficacy of the overall system to which they are applied.

In synthesizing a nonredundant system, the number of measurements that are performed equals the number of unknowns that it is desired to determine. In general, there is one equation derived from each measurement; and there results an equal number of equations and unknowns. This simple rule appears obvious. However, the questions of the independence of the measurements and the equations and even the unknowns provides considerable of interest to the mathematician. The rules for independence in formal mathematics are sufficiently complicated that no general method is offered. Rather, it appears necessary to examine each new application of my invention by whatever techniques are available, algebraic, graphic, computational, mechanical. Some of these techniques are of a trial and error nature. One can obtain solutions using given data repeatedly and if only one solution is obtained for given data, then one has a workable system.

In some embodiments of my invention the relationships between measured data and the desired unknown data are not even intuitively obvious. Even more obscure sometimes are the mathematical relationships and the methods of solution. In some instances mechanical analogues can provide solutions, whereas, the achievable algebraic solutions are wierd and possessed of extraneous roots. The introduction of the high speed digital computer with trial and correction techniques has been the most powerful of the tools brought to bear in these applications. With it one can determine not only sufficiency of a given set of measurements but also the accuracy of the system. Furthermore, such digital methods can be used directly in the computational process of operation of the system, and even for simultaing a test operation of the system.

In many of the embodiments of my invention presented in this application, the primary measurements are either measurement of angular difference or angular rate or measurements of the difference or change of cosines. In event that angular type measurements are performed, the Cosine Law is readily applicable in forming a set of simultaneous equations. The law may be wirtten in terms of the cartesian coordinates of the system. This equation is nonlinear and often must be solved by trial and correction methods. The equation appropriate for use when measurements of cosine differences and changes is simply the expression of the difference of the two cosines expressed in cartesian coordinates of the system. Again the equations are nonlinear and the trail and correction procedure is recommended.

These various station arrangements may be employed using measurements of the rates of change of angles or functions of angles. The rates of change may be measured with respect to time or with respect to some other quantity. The measurement of very small increments of differences of angle or functions of angle may be employed. The mathematics of this mode of operation is somewhat more complicated than the mathematics associated with the measurement of displacements or differences of appreciable magnitude. The reason for this additional complexity is that the differential of a variable has qualities or characteristics that distinguish it from the variable itself. The equations written for finite increments or differences will contain variables of a certain sort. The equations written for measurements of differential quantities or infinitesimal quantities not only involve these quantities but also the types of variables employed in the equations written for finite increments and differences. More types of variables tend to appear in the differential equations than with equations expressing finite differences. This additional complexity of the differential equations relative to equations of finite differences is compounded when the trial and correction procedures are used for solution of the set of differential equations. In these processes the differentials or derivatives then become ordinary variables in the equation set. The partial derivatives of these variables are obtained in the same manner as they would be for systems employing measurement of finite differences. While these mathematical exercises are not included in this application, the prospective user of my invention is encouraged toward their performance as the results are definitive and practical.

Samples of the types of differential measurements performed are: The use of a camera at each of several stations to simultaneously photograph a closely spaced group of objects or points from a plurality of widely spaced positions. If the group were composed of three objects each station photographing the group can measure the three angles subtended by pairs of the group at the camera station. Three such stations provide a total of nine measurements, and nine differential equations result. Simultaneous solution of these equations provides the coordinates of the group and the spacing of the objects within the group. Of course, the photographic method is also usable for measuring the distances between more widely spaced objects in conjunction with the equations of finite differences. The apparatuses indicated in FIGS. 5 and 6 are suitable for this differential type of operation in a distributed system. In general, it may be said that any of the systems that operates with a single simultaneous system measurement for a position determination is capable of being adapted to the use of differential or infinitesimal measurements. This relationship does not extend conveniently to the systems of multiple contiguous, consecutive or overlapping measurement of finite distances relative to each station. In systems employing a single system measurement of finite differences the limit approached by the system as the measured differences become ever smaller is the differential type of system. However, in the multiple system reading mode of operation, higher order derivatives are approximated as the measurements become ever smaller. Care must be exercised in setting functions of these small measurements equal to the various higher order derivatives. The higher order derivatives do provide additional equations, however, that are valid in position determination; and practical systems for position determination result when the measurements may be performed with sufficient accuracy.

The simultaneous photography of three points on an airplane by each of three separate stations provides the necessary data not only for the position of the aircraft, but also the position of the three points relative to each other. The pointing data of the cameras is not required. All that is required is the picture, the focal length of the lens, and the coordinates of the station. Using my method nine elements of data are collected from the three films. Nine equations are written and solved simultaneously for the required data. If the configuration of the observed points on the aircraft is known in shape, or in both size and shape, additional information is available that may be introduced redundantly for improvement of accuracy.

A separate mode of differential operation exists in which the coordinates of a moving group of targets are continuously known and it is desired to determine the relative position of each of the members of the group relative to each of the other members of the group. The position of the group may be known as the result of embodiments of my invention described in this application, or it may be known through other means of methods. It is, of course, obvious that if the angles between two members of the group are measured simultaneously and instantaneously at each of two separately located stations whose positions are known, then the relative position of the two targets is defined. There are other geometrical conditions that are not so obvious which similarly define the relative positions of the members of the group by a plurality of measurements of the changes of the small angles between the individual targets or changes in the differences of the cosines of the angles between each of the members of the moving group and a reference direction. This embodiment of my invention would be particularly useful under circumstances in which it is not possible to measure directly the small angles subtended at the measuring station by pairs of members of the moving group of targets. Measurements of changes of functions of angles other than the cosines and differences thereof may be employed as well.

In one embodiment of my invention the distances between the number of objects composing a group of moving objects is determined by observing the motion of the objects relative to each other. In this embodiment the objects remain in a small cluster, and the cluster of objects is removed from the observing stations by distances that are many times the largest dimension of the cluster. The distance from the cluster to each of the observing stations is sufficiently great that all of the objects of the cluster may be assumed to be at the same range from the station for the purposes of certain of the computations. At the cluster the lines joining the several objects to each of the observing stations may be assumed to be parallel; and, for the purpose of computing the distances between these lines at the cluster, the distances between the several objects and the observing station may be assumed to be equal. After an initial determination of position by the complete system the solution may be refined by using the initial values of relative position to determine separate values of the individual distances from each of the several targets to each of the observing stations.

In this embodiment of my invention the cluster or group of objects need not be in motion, but it is necessary for there to be relative motion between the individual objects comprising the cluster. The fundamental measurement may consist of measurements of the changes of the angles subtended by the several objects as viewed by the observing station. The fundamental measurement may also consist of measurement of changes of the differences of the cosines or other functions of the angles between the lines joining the objects to the observing stations and a reference direction. Furthermore, the reference direction need not necessarily be constant. The reference direction may be turned or adjusted in some modification to follow the movement of the target cluster. For the purposes of the following explanation, the measurement taken for example is that of the change of the subtended angle between each pair of targets of the target cluster as viewed at the measuring station.

Though there are several procedures for determining the relative positions of the objects of the cluster only one of these will be cited as an example. In this example the change in the distances at the cluster between the lines joining the several objects to the measuring station is computed for each station by multiplying the known distance from the station to the cluster by each of the measured changes of angle subtended by each target pair using all combinations of targets in forming the pairs. The next step of the computation is to determine the distances at the cluster between these radials, or equivalently the angles between them at the observing station. For the purposes of this step of the calculations all of the target objects may be assumed to lie in a plane perpendicular to the line joining the target cluster to the observing station. This line may or may not possess the same direction during the primary measurement but its direction is of course known. Furthermore, the length of this line may or may not remain constant during the primary measurement but it is known. The changes of angles may be measured once or two or more times in succession. The relative positions of the objects on the plane described correspond to the epoch of the initiation of the change measurement sequence and to the epochs of each of the readings thereafter. Thus the distances at the cluster of the lines joining the objects to the observing station are determined for two or more epochs simultaneously by a single procedure of measurement and calculation.

Having determined the distances at the cluster between the essentially parallel lines from the objects of the cluster to the observing station at each epoch relative to two observing stations simultaneously the solution from the derived data for the relative positions of the objects within the cluster can be computed separately for each of the epochs for which the data has been derived relative to the two stations and is simple.

The determination of the distances between the parallel lines, or equivalently the positions of the targets on the planes perpendicular to the observing stations, is not so obvious and is therefore described below in some detail.

For the purposes of this explanation it may be assumed that there are a multiplicity of points moving about in a plane. This is the plane described above as being perpendicular to the line between the cluster and the observing station. However, for this part of the explanation one need not concern oneself about the station or lines outside the plane. Through the processes of measurement and calculation the changes of the distances between the several points has been determined for two or more epochs. The number of unknowns corresponding to each epoch is twice the number of points less three. The reduction in the number of unknowns by three results from the fact that one of the points may be regarded as being the origin and one of the points may be regarded as determining one of the coordinate axes. Cartesian coordinates may be used conveniently, in which case one of the coordinates of the second reference point may be assumed to be zero. The number of equations available for the determination of these unknowns is determined by the number of changes of distances between points made known by the previous procedures. There is a variety of possible combinations of numbers of points and numbers of measurements that may be employed. In general, the number of points required for a solution is reduced as the number of consecutive system measurements is increased. In the event that a given number of system readings produces more equations than are required for defining the positions of the several points at each of the several epochs one or more of the measurements and the associated equations may be dropped from the solution.

A separate equation is derived for each determination of change of distance between a pair of points. This equation is simply the difference between the distance between the two points before and after the change set equal to the magnitude of the change as previously determined.

The general equation is as follows $$(X_{ik}-Y_{jk})^2 + (Y_{ik}-Y_{jk})^2 - (X_{io}-X_{jo})^2 + (Y_{io}-Y_{jo})^2 = M_{ijk}$$

Where:

$M_{ijk}$ is the value of the change in distance as determined by the measurements and calculation, $X_{io}, Y_{io}, X_{jo}, Y_{jo}$ are the coordinates of the ith and the jth objects at the epoch at which the measurement procedure was initiated.

$X_{ik}, Y_{ik}, X_{jk}, Y_{jk}$ are the coordinates of the ith and jth objects at the epoch at which the kth measurement was terminated.

It is noted that an overlapping measurement procedure is indicated. That is, all measurements are initiated at the same time. This is strictly a matter of convention and contiguous measurements could as easily be employed.

The angular orientation of the cartesian coordinate system on the plane is not defined in this part of the procedure. Only the positions of the various objects relative to each other is defined. It remains for that part of the procedure involving the second station to determine the angular orientation of the coordinate system of the plane relative to each of the stations. At the conclusion of this first part of the procedure the information having been derived is the approximation described by a beam of parallel rays or lines from each station passing through the target cluster. Each ray passes through one of the objects of the target cluster. Two lines, one from each station, pass through each object. The rotational orientation of each beam about its own axis has not yet been determined. This rotational orientation of each of the intersecting beams about its own axis is physically defined by the geometrical requirement of the intersection of the separate pairs of rays described. Once the rotational orientation of the two beams about their respective axes is determined, the resolution of the spacing of the objects in three dimensions within the target cluster is simple.

The rotational orientation of the two beams of lines intersecting in the target cluster is accomplished by a correlation procedure. This is a mathematical procedure in which one of the beams is held in successive fixed positions and the other beam is rotated about its axis until there is a coincidence between each line from the first beam and a separate line of the second beam. In order to achieve coincidence, it is generally necessary to displace one of the beams in translation along both axes in the process of the correlation scanning. This scanning process is not as difficult as it may first appear and only a number of positions need be examined. For the purposes of the correlation operation a true set of coordinates may be established by considering the two beams to be enclosed within a geometrical prism whose parallel ends are parallel to the axes of both of the beams. One of the cartesian axes, say the y axis, is chosen to be perpendicular to the two parallel ends of the prism. When proper orientation of the two beams is achieved, the top and bottom parallel ends of the prism will each contain one of the points of the target cluster and each will also contain a pair of lines, one corresponding to each station intersecting in the point of the cluster contained by the beam. The prism has a varying length along the y axis between the parallel ends as the two beams are rotated on their respective axes. One might be inclined to call the distance between the parallel surfaces the "thickness" of the prism; however, "length" appears to be the correct designation for this dimension. The centroid of each beam of rays would generally not lie on the center line between the two surfaces and would rise and fall as the beam is rotated if one of the surfaces were to remain fixed. The centroid of the beam here is defined as that point in the plane perpendicular to the beam that is so located that the sum of the distances to the intersections of the various rays of the beam with the plane is a minimum. When the beams are properly oriented, the rays of the centroid of the two beams must intersect and the upper and lower planes of their bounding prisms must coincide. To avoid the necessity of scanning in translation the beams may be rotated about their respective centroids. To avoid scanning in two dimensions, the 2° of freedom provided by the rotation of two beams, one of the beams may be rotated independently while the other is made to rotate in such a manner that either the upper or the lower pairs of prism planes are coincident. Rotation of the independent beam then continues until the opposite pair of prism planes are coincident. At this point generally the coincidence of the rays of the two beams is complete. Should by unusual chance the coincidence not be complete the rotation can be continued to find the true point of complete coincidence.

Alternatively, one of the beams may be rotated independently about any parallel axis within it and the other beam so rotated that both its upper and its lower prism planes coincide with those of the independently rotated beam. Rotation may be continued until coincidence is achieved.

When the targets of the group may be separately identified by both stations, each station being separately able to identify any target selected by the other station, orientation of the beams is greatly simplified.

When changes in the differences of the direction cosines are measured relative to a group or cluster of targets the problems of rotational orientation do not appear as the orientation is established in the process of the primary measurements. In one embodiment of my invention, the cluster of targets is tracked by a device which maintains four separate apertures in a plane perpendicular to the line between the tracking station and the cluster of targets. The apertures are disposed at the corners of a square in the plane whose center is on the line to the targets. The apertures in diagonally opposite corners operate in conjunction with each other so that there are two sets of measuring circuits each associated with a pair of apertures. In this system the orientation of the apertures in the system coordinate frame must be known. It is convenient for one pair of the apertures to lie in the plane of the vertical axis of the mount. The other pair of axes will then always be horizontal. This type of arrangement is conventional for holding and directing the apertures of tracking systems. In the arrangement described here the signals from the apertures need not be employed to direct or point the mount as their main purpose is separate and distinct from that function.

As in the angle change measuring system just described, two stations are employed; there must be relative motion of the targets as viewed from each of the stations, the target cluster may or may not be in motion, and the largest dimension of the target cluster is negligible compared to the distance from the cluster to either of the stations. Also as before, the orientations and positions of the stations are known. It is not necessary to assume that the mounts holding the apertures always point exactly at one point of the target cluster. Motion of the pointing of the mounts about the target cluster does not appreciably affect the operation of the system.

When several points are located on the same frame and the change of angle of a point moving relative to the frame is measured simultaneously relative to each of the points on the frame, the resultant data has considerable significance in locating the moving object relative to the frame. Such data may be employed not only to determine the angular disposition of the moving object relative to the points of the frame, but may be employed also to determine the angular disposition of the points on the frame relative to each other. Similarly, it can be shown that if the angles between a number of points can be measured simultaneously at each of a number of points, whose positions are otherwise unknown, it is possible to determine the relative angular disposition of all of the points. Geometrically, the two situations are identical. In the first instance, the changes of angle are measured sequentially and relative to the frame of the points at which the measurements are made. In the second instance, at least three points are involved in each measurement, the point at which the measurement is made and the points between which the angle is measured.

When the positions of the observation stations are known, the mathematical processes for the determination of the coordinates of unknown points observed by the stations is somewhat simpler than the mathematical processes that must be employed when positions of the observation stations are unknown. This situation is a direct consequence of the fact that a greater number of unknowns appears in the set of simultaneous equations that must be solved when the positions of any of the stations is unknown. The unknown coordinates of the stations form only a part of the total increase in the number of unknowns, as it is generally necessary to increase the number of stations taking measurements or to increase the number of measurements taken by each station. In either case, there is usually an increase in the number of equations that must be solved simultaneously. The increase in the number of equations does not require a change of the general technique but does require more work. In order to maintain the mathematical process as simple as possible during critical operational periods, the positions of the stations may be determined in advance with the more extensive set of measurements and the larger set of simultaneous equations. Subsequently, in determining only the positions of the unknown points, the shorter procedure may be employed using the station coordinates already determined in the previous procedure. In some instances, only a portion of the total number of coordinates of the system may be unknown. In each case, the number of equations employed in the procedure would depend upon the number of unknowns and the number of measurements performed.

Hybrid Systems

It is possible to reduce the number of stations used in the method of my invention by combining measurements of distanc distance variation, or difference of distance with measurement of angle or functions of angle or variations thereof. The word "distance" here is used to include the case of linear combinations of ranges. If each station not only measures an angular change or difference in addition to measuring, say, the doppler effect, one has both the equations resultant from the angular measurement and the equations resultant from the doppler measurement to obtain cartesian coordinates. It should be pointed out that the workable system is designed so that the total number of angle type and distance type measurements defines the position of each of the several A points. "A points" designate objects of unknown position or points of unknown position along the path of a moving object, or along the path of each of several moving objects. The distance type measurement can be performed in a variety of ways and doppler methods are only one way such measurements may be made; radar ranging is another.

In my copending patent application, Ser. No. 74,180, it was shown how by employing some knowledge of the physical or mechanical constraints necessarily imposed on a moving body it is possible to reduce the number of stations of a polystation doppler system or other such system. This same concept extends to my invention herein described. One may employ motion equations relating significant points along the path of a moving vehicle together with the angle type measurements to bound or determine the coordinates of one or more of these points. Similarly, motion equations expressed as time derivatives of the coordinate displacement may be employed. These extra equations make it possible to reduce the number of equations that must be obtained from angle type measurements. Reference to my application, Ser. No. 74,180 will provide a discussion of the motion relationships and the equations that may be derived therefrom. Use of these relationships may also be made in hybrid systems.

Coastal Observation of Ships

Under certain conditions it is not always possible for a coastal station observing the movement of ships at sea to orient itself with sufficient accuracy relative to other stations of the system. The stations of the system may have an accurate knowledge of their positions on the map but may not know their accurate compass orientation. Such a situation is the more likely when the stations are set up under battle conditions in which a landing party must set up a system for accurately determining the positions of ships off shore. My invention makes it possible to determine the positions of ships from angular readings taken from four shore stations without the necessity of the stations being in sight of each other or otherwise knowing their compass orientations relative to each other. There are two methods. The first method is that in which the change of the bearing of a moving ship is observed relative to each of the four stations. The second method is that in which the angle between two ships is measured at each of the four stations. A typical geographical situation is shown in FIG. 11 indicating the geometrical relationship between the four stations on the shore and the two points at sea whose positions are otherwise completely unknown. The two points at sea may be the two positions of the same ship, or it may be two separate ships. A simple angle measuring device, for instance a surveyor's transit, is employed for either type of measurement. The transit is set up and leveled in the usual manner at a known place on the map. The required measurement at each station may be taken by locking the scale in place, taking two readings, one for each of the points at sea, and subtracting the difference. Alternatively, a single reading method is achieved by setting the scale of the transit at zero, slewing the transit to bear on one point, locking the scale at that point, slewing the transit to the other point and then reading the scale. Either method of making the measurement may be employed for performing the measurement on either the case of one ship, whose motion must be observed, or on two ships, either or both of which may be stationary.

The mathematical process is that of solving simultaneously the four equations derived from the cosine law applied to each of the measured angles. A typical equation is shown in FIG. 11 for one of the stations. An analog device which simulates mechanically the geographical geometry of the system is used to determine the unknown positions from the measured data. Such an analog device is shown in FIG. 12. The stations are represented by station pivots 121 which are located on a map at the points corresponding to the geographical locations of the stations. The measured angle at each station is represented by the angle between two arms 122 and 123 that pivot at the station point. The angle between the arms is adjustable to correspond with the angle measured at each station. Other than when being adjusted, the angle between the arms is normally fixed. The two arms pivot together about the station point. Each arm is slidable in a slide 124 which represents one of the points at sea. There are two sliders 124, one for each of the sea points. Each slider 124 is equipped with a pin 125 which represents the exact target position. The pin 125 is held perpendicular to the plane of the map and runs through one slider 124 of one arm of each station. The other pin 125 runs through the slider 124 of the other arms. In operation it is merely necessary to adjust the angle of each pair of arms to the value of the measurement at the corresponding station and observe the positions of the two points corresponding to the pins 125. In general, there is only one pair of positions of the points for each set of measurements. As one adjusts one or more of the arms, the points move by sliding along the arms. The readings of the angles between the points are taken from the protractor dials 126 located one at each station. These angles between the arms always correspond to the positions of the points. Each protractor dial 126 is provided with a brake 127 which aids in setting the angle and locking the dial after adjustment.

Construction and use of the analog device is recommended to any who would like to achieve a comprehension of the principles of my invention by other than mathematical analysis or as an impirical augmentation of the mathematical analysis.

Angle Trackers

A modification of my invention employs measurements of change of angle in three dimensional space performed simultaneously at separate sites to determine the position of a moving target in three dimensional space. Another modification provides for measurement of the rate of change of angle at separate sites to determine the position of a moving target. This modification is designed for operation with a tracking telescope using light waves or a tracking radio antenna using radio waves, or a directional microphone empolying sonic waves. Actually, any sensing device that is capable of indicating when the tracking device is pointed at the object being tracked is suitable if it will indicate the sense and magnitude of small deviations of the device from the axis of the tracking device. Tracking error is employed to actuate a servo system which drives the mechanism holding the tracking device is such a manner as to adjust the direction of the axis of point to reduce the error. Such systems are common in the radar and missile tracking art. For the purposes of my invention an appropriate sensor, servo, and carriage or supporting structure may be selected from the wide variety of mechanisms on the market. Most of the marketed devices of this type also are provided with scale or readout mechanisms for indicating the angular attitude of the axis of the sensing element relative to the earth fixed base. These ordinary scales or readout devices continuously indicate the pointing direction relative to one or more axes. One or more of these axes may be variable. The common radar antenna employs a vertical fixed axis and a horizontal axis passing through the vertical axis confined to a horizontal plane in which it rotates about the vertical axis. Generally, these devices provide a readout of angle relative to the axes. Through computation this data may be employed to derive the change in angle or angular differences employed in the method of my invention.

In one modification of my invention gyroscopic means are mounted on the directional sensor. This means comprises a simple gyroscope whose axis is parallel to the direction of pointing of the directional self tracking sensor. As the sensor turns itself, the gyro exerts a force on its mount proportional to the rate of turning of the sensor. This force is easily measured by displacement or strain sensing elements. The amount of displacement of the axis of the gyro relative to the frame of the sensor is so small as to be negligible as far as influencing the gyroscopic forces. This condition is obtained by employing sufficiently high amplification of the detected angle rate signals. The detected angle rate signals can be transmitted to the stationary parts of the station through slip rings in the mount holding the self tracking sensor or they may be communicated by radio or other means. The advantage of using the gyroscope is that the mechanical relationship between the position rate measuring device and the sensor frame is more rigidly fixed and more easily adjusted.

In another modification of my invention, the indicated angular rate of the sensor is integrated and readout at each reading point or significant epoch of the system operation.

In another modification of my invention a gyroscopically stabilized "platform" is mounted on the frame of the self tracking wave sensor. The gyroscopes and associated servo mechanism hold the "platform" fixed relative to three orthogonal axes through the station point. The displacement of the sensor relative to these axes is detected and readout by means of disc encoders mounted so as to indicate the motion between the stabilized "platform" and the frame of the self tracking wave sensor.

In another embodiment of my invention employing a stabilized "platform" mounted on the frame of the self tracking sensor the "platform" provides only a single axis relative to which the change in the pointing direction of the self tracking sensor is detected. At the start of a given measurement of angular displacement the "platform" is set so that this reference axis lies along the direction of pointing of the self tracking sensor. As the point direction of the self tracking sensor changes from this direction, the axis of the platform is maintained in the direction set at the outset of the measurement. The angle sensing device mounted between the stabilized platform axis the sensor pointing axis continuously indicates the net angular change from the initial pointing direction of the sensor.

Angle trackers may be employed in systems for position determination in either two or three dimensions. FIG. 11 indicates the geometrical relationships of a two dimensional system. In this system there are four stations and the system operates in two dimensions. Only a single measurement is performed by each station, and all of the measurements are performed simultaneously. In this instance the positions of the stations are known. The angle tracker determines the angular change as a ship moves from a first position $X_o Y_o$ to a second position $X_1 Y_1$. The angular variation of the stations are designated $\theta_1$, $\theta_2$, $\theta_3$ and $\theta_4$ respectively. These four readings completely determine the position of both points, the point at the start of the measurement, and the point at the termination of the measurement. Should it be desired to transform to an orthogonal system of coordinates, one may write the cosine law relative to the three angles in terms of XY coordinates. Solving the resulting four equations simultaneously gives the positions in these coordinates.

The number of stations may be reduced to three by performing two measurements in succession so that there are three significant positions of the ship. These positions may be called A points. The measurements of the angles between these points at each of the stations are measured by the angle tracker as the ship moves from one significant point to the other. A significant point or epoch is that point or epoch where a measurement of angular or other displacement is either started or terminated. If two measurements are performed by each station, six corresponding equations may be derived therefrom through use of the cosine law. This equation set relates the nonorthogonal coordinates of the three positions to the orthogonal cartesian coordinates of the three points.

Another modification of my invention employs only two stations, and each station performs only a single measurement of angular variation. However, each station simultaneously performs a doppler measurement to determine the change in range as the vessel moves from the point marked A, to the point marked $A_2$. Thus four measurements completely determine the two significant positions of the vessel. If it is desired to obtain the positions of the two significant points in terms of cartesian coordinates, the transformation equations are the two expressions of the cosine law and two expressions of the change of range, all four of which are expressed in terms of the cartesian coordinates.

Three dimensional systems are other modifications of my invention and are the same in principle, both as purely angle systems and as hybrid systems combining use of both angle measurement and distance change measurement.

Determination of Station Position

In utilizing my method to determine the relative angular relationships of stations whose positions are unknown it is necessary to establish points in the sky visible from several of the stations simultaneously. The positions of these points need not be known to any unable accuracy. One method of establishing a point in the sky is to photograph the explosion of a shell projected to a sufficient height above the station complex. Several such shells launched within reasonable time of each other serve to establish the points in the sky. At each of the stations a camera is set up and left in a fixed position relative to a platform substantially set in the earth's surface. The camera has a lens geometry permitting the photography of several of the shell flashes without the necessity of reorienting the camera between each flash. The images of all of the photographed flashes are recorded on the same film. In my method the cameras need not be oriented precisely with respect to the platforms on which they are mounted, nor with respect to any other reference element of the earth frame of reference. The cameras need only be operated to open and close the shutters for each burst in the event that the bursts are separated by such long time intervals that stray light from other sources than the bursts might fog the film. No adjustment of the orientation of the camera is necessary.

By well known techniques and means, the photographic plate exposed at each station containing the images of a number of sky flashes may be examined to determine the angles between the bursts as seen by that station.

The mathematical procedure of determining the angular relationships between the stations is simply the simultaneous solution of a number of simultaneous equations. The procedure may be adjusted to yeild also the angular relationships between the points of the flashes and between the flashes and the ground stations. Implicitly the entire geometrical relationship, except for the size of the total configuration, including both station points and sky points is determined. The size of the total geometry may be made known by knowing or measuring the distance between any two of the points forming the geometrical configuration. Conveniently one may employ the Cosine Law written about the measured angle with the opposite side being a line between two flash points and the ranges from the camera to the two flash points being the arms of the angle.

In order to determine all of the angles of the configuration it is only necessary to solve simultaneously an appropriate set of independent equations. The only known quantities in these equations are the measured angles. All the other elements of the equation are unknowns. It is further noted that both the geometry and the equations indicate that it is not possible to determine the size of the configuration, but that the angles and the ratios of the linear distances may be determined. A convenient method of establishing the equation set is to divide all of the equations through by the square of the distance between two of the sky points. All of the distance elements will then be expressed as ratios relative to the one length, which length can be taken as unity. The equations may then be organized into a set of independent simultaneous equations of the ratios of the distances of the configuration with respect to the single selected distance. More equations than needed can often be written relative to a given configuration. It is necessary to employ only relationships and measurements that lead to a set of independent equations. However, if one wishes to improve the practical accuracy of the technique through "least squares" procedures, he may employ the redundant readings accordingly.

The well known techniques of Newton and Raphson are adequate for the solution of the equation set. It should also be remembered that the positions of the sky points relative to each other and the station complex are determined in this method. Explicit solution for these items is merely a matter of adjustment of the computation procedure. Thus the method may be employed for determining the track of a missile simply by causing a light to flash at intervals on board the moving missile in such a manner that it may be photographed simultaneously at the separate stations, the date from the photographic plates being employed to determine not only the positions of the stations relative to each other, but also the positions of the missile at the various flash points relative to the stations.

Any method capable of measuring the angle between the separate sky points may be employed in my method and it is inconsequential whether or not the measurements are made simultaneously or sequentially or even whether the several sky points exist simultaneously or sequentially. My method would find use in surveying, where it would make possible the determination of the relative angles between three points, at each of which it would be possible to set up an angle measuring device, by measuring at each station the angles between four points whose positions are unknown but which can be seen by each of the three instrument stations. As before, the angles between all seven points can be determined.

Pairs of Apertures used for Direction Finding and for Beaconing

FIG. 13 indicates a direction finding equipment embracing four antennas disposed in a plane and located on the vertices of a square. This system is designed to operate with emitters that lie in the plane of the array of antennas. The antennas may be arranged in other planar configurations as well, and the axes of the pairs of antennas need not be perpendicular to each other. The arrangement shown is convenient mechanically, and when the sides of the square are parallel with the axes of the coordinate system the explanation of the system is simplified. The antennas of antenna pair 131 are separated by many wavelengths of the propagated signal being received by the system. The signals from the antennas of each antenna pair 131 are combined in mixer 132. The output of the mixer 132 is fed into counter 133 associated with that particular antenna pair 131.

As the target emitter moves from one angular position to another, the phase between the antennas of a single antenna pair 131 changes. The output of the mixer 132 connected to each antenna pair 131 is the beat or phase difference signal between the signals received by the two antennas. The number of beats or periods of the output of the mixer occurring in a given interval of time indicates the number of cycles by which the phase angle between the signals from the two antennas has shifted during that interval. The duration of the time interval is determined by turning the counters 133 on and then off. The magnitude of the measurement made by the counter 133 corresponding to an antenna pair 131 lying along one of the coordinate axes is divided by the number of wavelengths by which the antennas are separated to obtain the amount of change of the cosine of the angle between the direction of propagation of the received wave and said axis. In similar manner the other counter 133 indicates the change in the sine of the same angle. If the distance of separation between the two antennas of each antenna pair 131 is the same as the distance between the antennas of the other antenna pair 131 it is unnecessary to divide the two counter readings by this distance in order to find direction as will be shown.

The apparatus whose block diagram is shown in FIG. 13 does not comprise a method of indicating the sense of the change of the sine and the sense of the change of the cosine. The necessary circuits for indicating such direction of change is shown in FIG. 14 using reversible counters.

Another variation of my method is obtained by employing superheterodyne amplification of the signal from each antenna before the signals are combined at the output of the intermediate frequency amplifiers in a synchronous detector whose output is fed to the counter. For this purpose the first detectors are fed mixing signals from a common source so as to assure identical mixing frequencies being fed to the mixers associated with each antenna of the antenna pair 131. This method would not provide sense information in the determination of the sine and cosine.

Another variation of my invention is obtained by arranging the antennas of the antenna pair 131 so that they are separated by a distance of the order of magnitude of the wavelength of the received waves. The actual separation may be greater or less than actual wavelength but need not be very much greater or very much less. Furthermore, this embodiment of my invention is capable of operating with antenna spacings that equal or are very much greater or very much less than the received wavelength. This embodiment of my invention indicates the sense of the measurement. It is also capable of indicating incremental change or the time rate of change of the cosine of the angle between the incident wave front and the axis of the antenna pair.

A block diagram of this embodiment of my invention is shown in FIG. 13A. It is seen that there are two amplification channels associated with one of the antennas. The use of the two channels provides a means of attaining a quadrature relationship between the signals for the purpose of preserving sense in the indicated measurement output. The antennas 13A1 and 13A2 form an antenna pair such as antenna pair 131 in FIG. 13. The antenna 13A1 feeds a signal to first detector 13A3, and antenna 13A2 feeds a signal to both first detectors 13A4 and 13A5. A mixing signal is fed from local oscillator 13A6 directly into first detector 13A3. The same mixing signal is fed into phase shifters 13A7 and 13A8. Phase shifter 13A7 shifts the phase of the mixing signal forty-five degrees ahead, and phase shifter 13A8 shifts the phase of the mixing signal 45° behind the mixing signal fed to first detector 13A3. The output signal from phase shifter 13A7 is fed to first detector 13A4 and the output of phase shifter 13A8 is fed to first detector 13A5. The outputs of the first detectors 13A3, 13A4, and 13A5 are amplified in intermediate frequency amplifiers 13A9, 13A10, and 13A11, respectively. The outputs of the amplifiers 13A9 and 13A10 are fed to synchronous detector 13A12. The outputs of amplifiers 13A9 and 13A11 are fed to synchronous detector 13A13. Since phase is preserved in the mixing process the output signals of the two synchronous detectors 13A12 and 13A13 are ninety degrees out of phase. The sense of the lead or lag of the phase between the output signals of the synchronous detectors 13A12 and 13A13 is determined by the phase difference between the signals from the two antennas 13A1 and 13A2. The output signals of the synchronous detectors 13A12 and 13A13 are fed respectively to the quadrature stator coils of a two-phase synchronous motor 13A14 whose magnet rotor drives the odometer 13A15 and the shaft rotation rate indicator 13A17 through mechanical coupling 13A17. Thus the incremental change in the cosine is indicated on the odometer 13A15 and the rate of this change is indicated on the rate indicator 13A17. The values of the shaft rotation or rate of rotation must, of course, be multiplied by a factor determined by the separation of the antennas 13A1 and 13A2 in order to indicate true change or rate of change of the cosine. The difference between two readings of the odometer indicates the increment of the cosine occurring in the interval of time between the readings.

The method indicated in FIG. 13A may be employed in any embodiment of my invention where such measurement is required.

If the direction of rotation of the vector from the station to the emitter is counter-clockwise the indicated signs of the measurements are shown in FIG. 13. If the direction of this rotation is clockwise all of the signs are reversed. This reversal of the signs with reversal of direction of rotation of the vector from station to emitter causes the ambiguity between diagonally opposite quadrants. If the ambiguity is resolved by directional characteristics of the antennas the direction of rotation is directly indicated by the sign of the either cosine or sine variation measurement.

Directional antennas may be employed for quadrant determination without sense indication of the sine and cosine measurements.

FIG. 13 indicates the geometrical relationships and shows how two independent equations in the two unknown angles are obtained. Solution of this simple equation set for the two unknowns may be accomplished algebraically or graphically or by interative digital methods. The center angle, the average of the two angles is shown to be a simple function of the ratio of the two counter readings. The characteristic is particularly valuable when short measurements are taken and the difference between the two outer angles is not great.

If sense of each measuremem is determined as by the apparatus shown in FIG. 13A then the pair of opposing quadrants containing the emitter is indicated by the signs of the measurement. There remains an ambiguity relative to which of the two diagonally opposite quadrants contain the emitter. This is the familiar sense ambiguity present in many direction finders.

A method of determining the angles that involves only the solution of a linear set of equations in solving for the trigonometric functions of the angles is to make two simultaneous measurements of the changes of these functions. The second measurement set may start at the termination of the first measurement set or it may start at the same time as the first measurement set starts, but continue for a longer interval of time. Since the sum of the squares of the sine and cosine of any angle is equal to unity, it is possible to write two independent linear equations in terms of the unknown sine and cosine of that angle that is common to the two measurements, as follows:

$$\sin^2\theta_o + \cos^2\theta_o = 1$$
$$\sin^2\theta_1 + \cos^2\theta_1 = 1$$
$$\sin^2\theta_2 + \cos^2\theta_2 = 1$$
$$\sin\theta_1 - \sin\theta_o = N_1$$
$$\sin\theta_2 - \sin\theta_o = N_2$$
$$\cos\theta_1 - \cos\theta_o = M_1$$
$$\cos\theta_2 - \cos\theta_o = M_2$$
$$(N_1 + \sin\theta_o)^2 + (M_1 + \cos\theta_o)^2 = 1$$
$$(N_2 + \sin\theta_o)^2 + (M_2 + \cos\theta_o)^2 = 1$$
$$2N_1\sin\theta_o + 2M_1\cos\theta_o = -N_1^2 - M_1^2$$
$$2N_2\sin\theta_o + 2M_2\cos\theta_o = -N_2^2 - M_2^2$$

Having determined the sine or cosine of one of the angles, the solution for other quantities of interest follows directly.

These principles apply equally well to operation in three dimensions. A third antenna pair 131 may be arranged along an axis perpendicular to the plane of the first two antenna pairs 131. In this method two sets of measurements are required for a nonlinear solution for the trigonometric functions and three measurement sets are required for a linear solution for the trigonometric functions, remembering that the sum of the squares of the direction cosines is equal to unity.

In both the planar and the three dimensional systems each pair of antennas may share one of its antennas with any or all of the other antenna pairs 131. Thus a system capable of finding direction in two dimensions can be obtained using three antennas. A system capable of finding direction in three dimensions can be obtained using four antennas all of which must not lie in the same plane.

The principle of my invention is not altered if the equipment is so designed that signals are radiated from the antennas at the station rather than being received at the station. In this case, the station becomes a beacon rather than a direction finder. The same cosines of the same angles are measured but a part of the equipment for making the measurement is carried along with the moving receiver of the transmitted waves, the position of which receiver it is desired to determine. The direction of the moving receiving equipment from the transmitter may actually be derived and indicated at the position of the receiving equipment. Several moving receiving equipments may be operated simultaneously employing the same beacon station. Each of the antennas (apertures) of the ground station emits a separately identifiable signal. The signal may be continuous wave, in which case its frequency assignment serves to identify it. The signal may be modulated or time shared to attain identification. The signals from all of the antennas are received simultaneously on a single antenna mounted on the vehicle conveying the receiving equipment. The receiving equipment then measures the beat or the accumulated phase shift in the carrier signals from the several antennas and so obtains a measure of the change in the the cosines of the angles between a line from the station to the vehicle and each of the two or three station axes. If the carrier or center frequency is not the same for each antenna, it may be necessary to correct for this constant displacement in the receiving equipment which is a simple procedure.

Although the use of pairs of apertures for direction finding has been illustrated here using incremental measurements of interference or beat phenomenon, my invention is equally applicable to rate or differential measurements. A frequency discriminator may be employed in place of the counter 133 for such a purpose. The readings M and N are then measurements of time derivatives or infinitesimals. The ratio of M to N then provides the tangent of the angle as indicated in FIG. 13.

Direction Finding by Measuring the Ratio of Changes of Direction Cosines Relative to Two Axes The operation of the direction finding system, such as shown in FIG. 14, is simplified by reducing the number of simultaneous readings that must be taken for a complete measurement set. The duration of a preset count on one counter may be employed to determine the interval of counting on the other counter, thus obtaining a reading on a single counter proportional to the tangent of the center angle. A constant of proportionality will be introduced that is dependent upon the value of the preset count on the timing counter. In order to retain the counts to reasonable values, both counters are employed as timers, the first counter to reach a predetermined value shuts off both counters. Indicator lights 140 indicate which counter acted as the timing counter and thereby indicates whether it is the tangent or the cotangent of the center angle that was measured.

The system is capable of operating on the signals of small amplitude as obtained on antennas receiving signals from a distant transmitter. The signal from each antenna 141 is fed into its own mixer 142. The injection signal, large in amplitude compared to the antenna signals, is the same for all of the mixers 142 and is obtained from the same local oscillator 143. The outputs of the mixers 142 are amplified in IF amplifiers 144.

A dual conversion system using two consecutive IF amplifiers in each channel may be employed if necessary for higher gain and improved image rejection. The simple system is shown here illustration and is perfectly practical. If double conversion is employed, the injection signal of the second mixer in each channel should be obtained from a source common to the other two channels.

The output of the IF amplifier 144 is squared in squarers 145. The signals from the squarers 145 are differentiated in differentiators 146. At this point the center channel is doubled as shown in FIG. 14 of the drawing, so that its signal may be employed independently in cooperation with the other two channels, thereby effecting two independent pairs of channels. Each channel pair corresponds to one pair of antennas, one antenna of each pair of antennas being effectively shared with the other pair of antennas in performing the measurement. The signal from the differentiator 146 is fed into the gate 147 which is controlled by a signal derived from the squarer of the opposite channel of the same channel pair. The output of the gates 147 from either channel pair is then composed of pulses. The pulses of one channel indicate a positive change while the pulses from the other channel indicate a negative change. These pulses are fed into reversible counters 148.

To initiate a measurement, a signal is supplied over line 148a to the two counters simultaneously which resets the counters and intiates their simultaneous counting.

This method is readily adapted to three dimensional operation by the addition of another channel and another antenna not located in the plane of the first three. The system is particularly useful for measurements over small changes of angle. The method of measuring the change of phase in terms of whole cycles shown is only presented as an example. Any method of measuring the change of phase between the antennas is applicable and there is of course no restriction limiting the system to the counting of integral cycles of phase change.

Rotating Cosine Arrays

The system shown in FIG. 13 may be employed to determine direction of incident waves in three dimensional space by rotating the entire antenna system. In this method the planar antenna system 131 is rotated about an axis perpendicular to the plane of the antennas. The rotation is continuous in one direction and is sufficiently fast that the position of the emitter of the waves has not changed appreciably relative to the direction finding system during one rotation of the antenna array. The counters are turned on for a portion of one cycle of revolution of the antenna supporting structure. A measurement rotation angle of 90° is convenient, although the apparatus will operate employing other angular variations as well. The apparatus responds as if the antenna array were standing still and the wave emitter were traveling in a circle whose plane is parallel to that of the rotation of the antenna assembly. Thus, the angle between the radius from the apparatus to the emitter and the plane of the revolving antenna array is constant. It is of course assumed in the use of the apparatus that the source of the waves whose direction of propagation is to be determined by the apparatus is sufficiently removed from the apparatus that the wave front is essentially planar across the entire apparatus. Conversely, the apparatus is so constructed that the distance between the antenna apertures is sufficiently small that the wave front may be regarded as planar between the two apertures for practical purposes.

The geometrical relationships and the mathematics pertinent to the operation of the apparatus is shown in FIGS. 10 and 10A. This geometry and mathematics show the method of determining the pertinent angles relative to the aperture axes. Included in FIG. 10A is the equation for determining the elevation angle from the measured values of changes of the direction cosines. There is no ambiguity of direction in the plane of rotation in the operation of this apparatus since the direction of rotation of the aperture assembly is known and provided that the signs of the measured values are indicated. The circuitry shown in FIG. 13 is abbreviated in order to clearly indicate geometrical properties. The bidirectional capability of the mixer-counter combination is not shown. Also, for clarity the diagram shows four apertures. The apparatus of course may be constructed employing one aperture common to both pairs of apertures and in a variety of configurations. The circuit shown in FIG. 13A is capable of providing both rate and displacement types of variation of the direction cosine and such a circuit can be used between the outputs of apertures of each of the pairs of apertures in the apparatus under discussion. FIG. 14 indicates a circuit for use with three apertures deployed along two axes and employing bidirectional counters and associated apparatus necessary for indicating the signs of the measurements of variations of the direction cosines.

An alternative method of operation of this apparatus is to perform two sets of measurements, either successive or overlapping, to remove the requirement for measuring, or otherwise knowing as by controlling, the angle through which the array is rotated relative to the direction of the target from the array.

A two dimensional direction finder (one capable of finding a single angle as azimuth) employing a single rotating pair of apertures is a simple embodiment of my invention. The apparatus consists of two apertures sensitive to the incident plane wave whose direction it is desired to determine, mounted on a rotating assembly so that the axis of the rotation is perpendicular to a plane including the wave source and the two apertures. In typical use the equipment would be oriented so that the axis of rotation is vertical with respect to the surface of the earth. The axis between the apertures remains horizontal. The source of the waves is similarly in the horizontal plane and at such a great distance from the apparatus that the wave front incident upon the entire apparatus is planar. The two apertures are conveniently located at equal distances on opposite sides of the vertical axis of rotation.

In this embodiment of my invention the variation of phase difference between the output signals of the two apertures is measured as the rotation occurs. Simultaneously the variation of the angular orientation about the axis of rotation is measured. The variation of angle and phase may be either incremental or differential.

A suitable equipment for the measurement of the variation of phase difference between the output of the two apertures is shown in FIG. 13A and described elsewhere in this application. The two wave sensitive apertures may be radio antennas. Other apertures would be employed for other types of waves.

The variation of the difference in phase between the signals from the apertures is immediately interpretable in terms of the variation of the cosine of the angle between the propagation direction and the axis of the apertures knowing the distance between the apertures and the free space length of the wave whose direction is being determined. The method of computing the bearing of the wave propagation direction relative to the axis of the apertures is indicated in an earlier section of this application.

In this device, as with the device described using two apertures axes in space quadrature in a rotating assembly, direction of propagation of the wave is determined relative to the axis of the aperture pair. Whereas, in the embodiment employing two aperture axes, it is not necessary to know the variation in bearing of the aperture axes relative to the direction of wave propagation. It is necessary to know this variation in the use of an array comprising only a single axis of apertures. If the source of the waves and the apparatus are both laocated on the same reference frame, say the earth's surface, there is no particular problem in measuring the angular variation of the aperture axis corresponding to the variation of the direction cosine of the bearing of the source relative to aperture axis. The measurement of the two variations is simply performed simultaneously. Switches mounted on the pedestal of the apparatus can perform this synchronizing function. However, if the apparatus is mounted on a craft which is itself rotating on its own axis at an unknown rate, it is impossible to determine exactly this variation of the bearing of the aperture axis relative to the direction of propagation of the wave. For such an application the apparatus employing two aperture axes mounted in space quadrature would be preferred. If the speed of rotation of the aperture axis is made sufficiently great that other angular variations may be neglected, the two-aperture apparatus is adequate.

In either the one-aperture axis or the two-aperture axis types of apparatus, separate and distinct from the requirement for measuring the variation of the angular orientation about the axis of rotation relative to the direction of propagation of the wave is the requirement for monitoring, measuring or controlling the angular relationship between the rotating aperture assembly and the craft, or other reference frame relative to which the direction of propagation of the wave is ultimately desired. The art of measuring and controlling shaft position is too well known to warrant further discussion here except to state that such means must be provided so that the angular position of the aperture axis is known relative to the particular reference frame relative to which it is desired to know the direction of propagation of the wave. It is a simple matter then knowing the wave propagation direction relative to the aperture axis to find the wave propagation direction relative to the base reference frame.

Whereas, only embodiments of my invention in which an array of receiving apertures have been discussed, it is obvious that the principles of my invention extend to embodiments in which the wave apertures are transmitting apertures and the receiver is remote from the transmitter and has a simple aperture. Similarly, the principles of my invention are included in embodiments in which waves are both transmitted and received by the same array of rotating apertures, said waves being reflected to the transmitting-receiving apparatus from a distant object. One familiar with the art would have no difficulty in arriving at practical apparatus employing the principles of my invention in these various applications.

It is further obvious that the principles of my invention may be incorporated without change in systems that involve an airborne rotating array and a ground cooperative equipment. Alternatively, both ends of the system may be mounted on moving vehicles. Also, transmission may be in either or both directions to or from the rotating array. Thus, my invention may be employed as a beacon system or as a direction finding system, either apparatus operating through separately spaced cooperative equipments or employing reflection of waves.

In FIG. 15 is shown a diagram of an apparatus for performing the measurement of a trigonometric function of a propagating group of waves relative to an axis at the receiver, which axis traverses the pair of transmitting apertures shown in the figure. The receiving equipment includes all of the actual phase measuring equipment. It is a simple matter to incorporate as many such equipments as are desired to operate with a plurality of aperture axes.

The rotating aperture array may be mounted in an aircraft or missile to indicate to the ground station the attitude of the vehicle with respect to the line between the ground receiver and vehicle. Using a plurality of such receivers, the attitude of the vehicle relative to the reference frame holding the receivers can be determined.

The three dimensions of angular orientation of a missile can be determined by arranging a four-aperture array containing two-aperture axes so that it can be rotated on an axis parallel to the length of the missile and so that the apertures remain in a plane perpendicular to the length of the missile. The rotation of array must be fast relative to the yaw or pitch of the missile. Such an array presenting such motion may be achieved by employing a synthetic array electronically controlled. If the missile rotates sufficiently fast about its longitudinal axis, rotation of the array about this same axis relative to the missile may not be required. By performing successive or overlapping sets of measurements variation of the direction cosines relative to the axis of apertures, the angles through which the array is rotated, is not required to be measured directly or controlled or otherwise known but may be determined from the measurements made relative to the separate aperture axes.

In another embodiment of my invention the array of apertures comprises three or more axes of apertures mounted on missile or other vehicle. As the vehicle tumbles, its attitude is continuously determined by measurements of the variations of the direction cosines relative to the three axes relative to one or more ground stations. The axes are mounted in such a manner that there is a component of at least one axis along each of three orthogonally disposed axes.

The reference between the missile body and the aperture array can be indicated to the receiving station by simply switching on the radiation from the transmitter at a known point of the rotation of the aperture array relative to the body of the missile. The duration of the measurement can be similarly controlled by turning the radiation on at one point of rotational orientation of the aperture array relative to one part of the body of the missile and turning the radiation off at another point of rotational orientation.

As with other embodiments of my invention, the embodiment employing the rotating array of apertures may be employed using measurement of incremental variations or measurements of differential variations and it is not intended to restrict my invention to either or these two types of variations.

Also, as with other embodiments of my invention, it is not necessary to employ continuous waves in performing the necessary measurements of time delay or phase difference. Pulses or modulated waves may do as well and one skilled in the art will have no difficulty in adopting the principles of my invention to such modulation forms. When the difference of the phases of the signals at certain terminals is discussed, such difference in phase actually is a measure of the time delay between the two signals. Thus, the geometrical measurements are the same regardless of the nature of the signals employed to perform the measurement.

Once the principle of establishing direction relative to the rotating array of apertures is employed, there are any number of methods by which such information may be referred to other reference frames. Some of such frames may include the support of the array mount. Other reference frames do not include the pedestal of the array. In some embodiments of my invention gyroscopic means may be employed to establish the orientation of a rotating assembly to some selected frame of reference which may or may not include the other terminal of the system or a wave reflector.

Two-Station Position Finding System Measuring Changes of Direction Cosines

In this system there are two stations, each of which is capable of measuring the change in the cosine of the angle between each of three orthogonal axes and a moving source of electromagnetic waves whose position it is desired to determine. Each station contains three antenna pairs whose three axes are in space quadrature with each other. Each pair of antennas shares one of its antennas with the other two antenna pairs. The shared antenna will be called the control antenna. Each of the other antennas is located an equal distance from the origin along one of the three orthogonal axes of a cartesian coordinate system with the central antenna located at the origin. Each pair of antennas is connected to equipment described earlier for measuring the beat or the phase difference accumulated between the signals received on each of the two antennas of the pair of antennas as the emitter moves from a first unknown point to a second unknown point.

Two modes of operation are available with this system. In the first mode of operation a single system reading is taken. That is, all of the counters are activated simultaneously at which time of occurence the moving emitter is located at the first point of unknown position. All of the counters measure the accumulated phase change until the measurement is terminated by turning off all of the counters simultaneously and reading them. There are then six separate measurements accomplished in one system measurement. There are six elements of unknown and desired information, the three cartesian coordinates of each of the two significant positions of the moving emitter. The moving emitter may take any path in moving from the first position to the second position. Six independent simultaneous equations may be written, one for each of the counter readings. These equations are simply the equating of the value of the reading to the difference of the two cosines relative to each counter measurement expressed in terms of the counter measurement. The simultaneous solution of these equations provides the desired cartesian coordinates of the unknown positions of the emitter. Since the equations are nonlinear, it is convenient to employ iterative techniques in the solution of the equation set.

In the second mode of operation, two system measurements are taken successively. The counters are turned on and then read after a first interval without stopping them. After a second interval the counters are read again. The direction of the emitter from each station is calculated for that station independently of the magnitudes of the readings of the other station. The directions of the three significant positions of the moving emitter are thus found. This data combined with similar data for simultaneous readings by the other station relative to the same three positions of the emitter are sufficient to define the three positions of the emitter in all three cartesian axes.

Two-Station System Measuring Change of Direction Cosines and Change of Range The simultaneous measurement at each of two stations of the change of direction cosines relative to two orthogonal axes combined with the simultaneous measurement at each of the two stations of the change in range from the emitter to that station provides an improved method of determining the position of a moving emitter. This system has an advantage in not requiring the antennas of the stations to be disposed along three noncoplanar axes. All of the antennas at each station may be located in the same plane which is a convenience for large installations. There are a total of six measurements for every system reading. All measurements are made simultaneously. The emitter may move along any path from a first unknown position to a second unknown position. The first position is occupied by the emitter at the instant the counting equipments are turned on, the second position is occupied by the emitter when all of the counters are simultaneously read.

There are six independent equations in six unknowns resultant from the six measurements. The six unknowns are the three cartesian coordinates of each significant position of the moving emitter. There are three equations developed for each station. Four of the equations are the equating of the measured values of the changes in direction cosines to the expression in cartesian coordinates of the differences between the direction cosines corresponding to the two significant positions of the moving emitter. The other equation is the equating of the measured magnitude of the change in range to the difference in the expression in terms of cartesian coordinates of the ranges from the station to the two significant positions of the moving emitter.

The measurement of the change of range performed at each station is accomplished by simple doppler equipment that is described in my patent application, Ser. No. 86,770, filed Feb. 2, 1961. There is, however, an option in the choice of the doppler equipment to be employed with this system. In the first equipment two very stable oscillators are employed, one to regulate the frequency of the moving emitter and moving with the emitter, the other oscillator is employed to establish a comparison between the frequency of the signal received at the station and the frequency of the transmission from the moving emitter. The nominal frequencies of the two oscillators are made the same for convenience.

In the second equipment there is only one standard of frequency and that is located at the station. A signal whose frequency is controlled by the standard is transmitted by the station to the vehicle carrying the emitter. This vehicle also carries a receiver which receives the signal from the station and employs it to govern the frequency of the emitted signal. Either equipment is satisfactory and each has its advantages in particular applications of my invention.

The principle of my invention may be employed as a method of determining the position of an aircraft by detecting aboard the aircraft signals transmitted from two fixed ground stations. The antenna arrangement of the ground station is the same as for the system in which the cosine change measuring equipment is located at the station. The cosines measured and the doppler measurements performed are exactly the same as those made in the case where the counters are located at the ground stations. In this method of nagivation there is no change in the geometry, but there is a change in the placement of the various items of equipment and some change in the equipment itself.

In this method of navigation each of the antennas of the ground station emits a separately identifiable signal. The signal may be continuous wave, in which case its frequency assignment serves to identify it. The signal may be modulated or time shared to attain identification. The receiving equipment in the aircraft then measures the beat or the accumulated phase shift in the signals from the several antennas and so obtains a measure of the change in the cosines of the angles between the range line to the aircraft and each of the two station axes. The doppler equipment is the same as before. It may operate with two standard frequency oscillators, one in the aircraft and one on the ground, in which case there is transmission only to the aircraft and the aircraft need contain no transmitter.

Another modification of use of my invention results when directional tracking antennas are employed at the ground stations to measure the changes in the angles described rather than employing the space separated antenna pairs to measure the cosines of these angles.

Determining Position by Distributed Pairs of Antennas

The following is the description of a system of navigation wherein a radio receiving device is carried aboard the navigating craft and several transmitting equipments are located at separate points on a stationary reference frame. The system is designed to be operative in three dimensions and it could, of course, be simplified to be operative in two dimensions. The antennas and circuitry of the equipments on board the navigating vehicle and at each of the several stations is such as to permit the measurement of the change in the direction cosine of a line joining the station with the navigating vehicle relative to a fixed axis at the station.

The direction of the axis at each station is that of a line joining two simple apertures or antennas. In this modification of my invention the antennas are simple vertical dipoles, and the distance between them is equal to many wavelengths. In the operation of this system the navigating vehicle is at great distance from each station. Specifically, the distance from the station to the moving vehicle is a great many times the distance between the two antennas of the station. The stations may be scattered in a three dimensional volume or they may be in a plane. The direction of the axes of the antennas at the various stations must be known but need not have any particular orientation. A preferred embodiment of my invention has the stations more or less uniformly distributed as the terrain permits, and the axis of each station oriented along one of the major common coordinate axes of the system.

In this preferred embodiment there are six stations, and a single measurement is made relative to each station simultaneously with similar measurements performed relative to the other five stations. There are six unknowns to be determined; three cartesian coordinates of the navigating (moving) vehicle at the time the measurements are commenced, and three cartesian coordinates of the vehicle at the instant when the measurements are terminated. There are thus obtained six independent equations for determining the six unknowns. The equations are simply the measurement values equated to the difference in the appropriate direction cosines, the direction cosines being expressed as functions of the unknowns. The set of simultaneous equations thus developed are solved by machine computation to determine the desired positional data.

In another preferred embodiment of my invention, only four stations are required. In this embodiment three sets of simultaneous measurements are performed. The simultaneous sets of measurements may be performed consecutively or they may be overlapping. A convenient method is to have the three measurements start simultaneously and terminating them successively at a constant interval. In this method there are 12 unknown cartesian coordinates and twelve measurements. A soluble set of independent equations results as before. Similarly, five stations may be employed with two measurements performed relative to each station. In this instance there is an extra equation that may be dropped from the set or employed for improving accuracy through statistical methods. There are other combinations suitable for a wide variety of special purposes.

FIG. 15 shows the fundamental block diagram of one of the stations suitable for operation in my invention and a similar diagram of one channel of the receiving equipment carried aboard the moving vehicle. One such channel of receiving equipment must be carried in the vehicle for each of the stations of the system. It is possible to combine the functions of certain elements of the various channels of the receiving equipment to make the equipment more economical and compact. However, the use of separate channels is thoroughly practical and permits of greater clarity in the explanation. Each station is assigned a separate pair of frequencies that are closely spaced in the spectrum. One of the antennas of the station transmits a continuous wave on one of the antennas of the station, and the other antenna transmits a continuous wave on the other frequency. The frequency and location of each antenna are of course known.

In the upper right corner of FIG. 15 is the block diagram of one of the transmitter stations. The station is provided with a standard frequency oscillator 1500 which drives RF amplifier 1501 directly and also drives frequency multiplier 1502. The RF amplifier 1501 drives one of the antennas 1503 so that the frequency of the radiations from that particular antenna is that of the standard frequency oscillator 1500. The frequency multiplier 1502 multiples the frequency of the standard frequency oscillator by a rational fraction that is close to unity but of course not equal to unity. The exact value of the multiplication is determined by frequency assignments. The output of the frequency multiplier 1502 is employed to drive the RF amplifier 1504, which in turn drives antenna 1505.

The block diagram of the receiving equipment for operation in conjunction with each transmitting station is shown in the bottom part of FIG. 15. This equipment contains two channels, one each for detecting the signals from each of the two antennas of the transmitter, which are received over the single antenna 1506. There is provided a standard frequency oscillator 1507 which drives mixer 1508 directly and mixer 1509 through frequency multiplier 1510. The multiplication of frequency multiplier 1510 is the same as that of frequency multiplier 1502 provided at the transmitter. The frequency of standard frequency oscillator 1507 is removed from the frequency of standard frequency oscillator 1500 by an amount equal to the intermediate frequency to which the IF amplifiers 1511 and 1512 are tuned.

The output of the IF amplifier 1511 in the upper channel is fed to frequency multiplier 1513. The multiplication accomplished in multiplier 1513 is the same as the accomplished in frequency multiplier 1502. This channel is the one receiving its injection frequency directly from the standard frequency oscillation 1507, rather than through a frequency multiplier. It is the channel that is responsive to signals from antenna 1503 whose frequency of emission is that of the standard frequency oscillator 1500. The multiplication factor of the frequency multipliers must be sufficiently different from unit and the passbands of the IF amplifiers must be sufficiently narrow that separation of the signals from the two transmitting antennas is assured in the two channels of the receiving equipment. The nominal frequency at the output of the frequency multiplier 1513 is the same as the nominal frequency at the output of the IF amplifier 1512. A synchronous detector 1514 is driven by the outputs of the two channels. Synchronous detector 1515 is driven through a phase shifter 1516 by the upper channel and directly by the lower channel. The outputs of the two synchronous detectors 1514 and 1515 are then fed to the two windings of a two phase synchronous motor which in turn drives an odometer 1518. A reversible step motor may be employed instead of the motor and odometer combination. Also, a direction sensitive device employing a reversible binary counter such as described by H. W. Kohler, U.S. Pat. No. 2,911,641 may be substituted for the synchronous motor and odometer.

Provision for turning the device on and off in order to initiate and terminate the measurement must also be included but is not shown.

The principle of my invention is not affected by placing the transmitter in the aircraft and employing receiving equipment at the ground stations. In this instance, the measured quantities remain the same. The number and placement of the antennas remains the same. Equipment for measuring the change in the direction cosine at each of the stations is described as a part of other equipment in this application. It is only necessary to add to the system a communication means for collecting the data derived at each of the receiving stations to a central point where the solution of the set of simultaneous equations resultant from the measurements may be performed.

Navigation System Employing Beacons with Two Axes

A system employing stations which each possess two separate and intersecting axes can make a complete determination in three dimensions of the positions of a moving vehicle with a single measurement made simultaneously relative to each of two axes of each of three stations. The number of stations can be reduced to two for a complete determination of the position of the moving vehicle if there are three contiguous sets of simultaneous measurements performed by three stations.

In a preferred embodiment of my invention, the intersecting axes at each station are othogonal, and correspoding axes of the separate stations are parallel. A typical arrangement of stations and their orientation is shown in FIG. 16. The measurements that are performed at each of the stations and the two equations that are derived therefrom are also indicated.

The purpose of this preferred embodiment of my invention is to provide a method of determining the position of a moving vehicle by placing aboard that vehicle equipment which receives signals from three transmitting stations. Each transmitting station includes three simple apertures or dipole antennas. The distance between the antennas or apertures is many times the wavelength of the transmitted radiation. One of the antennas is fed a pure continuous wave signal of a specified frequency. This antenna forms a base and the signals from it received by the receiving equipment on the moving vehicle operate in conjunction separately with each of the signals received from the other two antennas of the fixed transmitting station. Each of the other antennas is positioned a known distance from the base antenna along one of the axes of the station. Unmodulated continuous waves are transmitted by the base antenna while each of the other two antennas are excited by modulated signals of the same center frequency as the base antenna. The frequency of the modulation of each antenna is different from that of the other providing an instrumental means of identifying the two axes of the station. The base antenna and one of the modulated antennas determines one of the axes and the base antenna and the other modulated antenna defines the other axis.

FIG. 17 shows a block diagram of one of the transmitting stations in the upper left corner. A standard frequency oscillator 1700 determines the station frequency. The signal from this oscillator is amplified by RF amplifier 1701 and fed directly to transmitting antenna 1702, which is the base antenna. The signal from the standard frequency oscillator 1700 is also fed to balanced modulators 1703 and 1706 where balanced amplitude modulation is performed and the center frequency greatly attenuated. The modulation signal in each case is a simple sine wave of a specified frequency. The apparatus for determining and controlling the two modulating frequencies is not shown and is quite conventional. The outputs of the modulators are amplified in RF amplifiers 1704 and 1707 and the resultant signals excite the transmitting antennas 1705 and 1708.

The remainder of FIG. 17 shows the block diagram of the cooperative receiving equipment carried aboard the navigating vehicle. Receiving antenna 1709, RF amplifier 1710, mixer 1711, local oscillator 1712, and IF amplifier 1713 constitute a conventional superheterodyne circuit. In the place of the customary second detector circuit at the output of the IF amplifier 1713, there are shown two separate channels of equipment, each responsive to the signals from one of the pairs of antennas of the transmitter defining an axis of the transmitting station. A pair of such channels is required for each of the ground transmitting stations with which the vehicle is to operate simultaneously. Separation of the simultaneous signals from the several stations may be accomplished in several ways. In the preferred embodiment the selection of station is accomplished by the local oscillator 1712. Each pair of counting channels has its own local oscillator 1712, mixer 1711, and IF amplifier 1713. These equipments are all identical as are the pairs of counting channels. The receiving antenna 1709 and the RF amplifier 1710 are common to all of the several equipments operating with the signals from the various transmitters. Thus the two modulating frequencies employed in the transmitters are the same and designate the same axes in the several transmitters. Only the frequency of the standard frequency oscillator 1700 differentiates the individual transmitting station.

Since the counting channels are identical except for the tuning of two of the filters, only one of the channels is numbered and described here. The signal from the IF amplifier 1713 is fed to the two mixers 1714 and 1715 and the outputs of the mixers are amplified in amplifiers 1716 and 1718. At the outputs of these amplifiers, the signals are introduced to two separate circuits. It is the purpose of one of these circuits to track the center frequency of the modulation sidebands of one of the modulated antennas. It is the purpose of the other circuit to measure the change in the phase between this tracked center frequency and the signal received from the base transmitting antenna. These two signals are of exactly the same frequency if the station and the vehicle are stationary. There is then no change in phase during any interval in which there is no relative motion between vehicle and station. For reference, we define frequency as the first time derivative of phase. When relative motion occurs between the vehicle and the station axis relative to which the channel is operating, there occurs a change in the phase of the center frequency of the modulated signal and the signal from the base transmitting antenna 1702. During the interval in which the change of position occurs, and while it is occuring, it may be said that there is a difference between the center frequency of the modulated signal and the base signal. There is no reason to conclude that this frequency difference is constant; in fact, it would be constant only under very special conditions of motion which are not assumed. However, the net change of phase between the two signals that occurs during the interval in which the motion occurs is a conveniently measured and defined quantity.

The tracking signal derived from the two sideband frequencies from the antennas transmitting the modulated signals is separated out through filters 1719 and 1720. These filters are narrow band pass filters whose pass band is centered on the modulation frequency of the balanced modulator 1703. The signals from the two filters 1719 and 1720 are fed to synchronous detector 1721. The output of the synchronous detector passes through low pass filter 1722 to control the frequency of voltage controlled oscillator 1723. The signal from the voltage controlled oscillator is the injection signal for mixer 1714 and, after being shifted ninety degrees in phase by phase shifter 1724, is the injection signal of mixer 1715. This operation of tracking the absent center frequency of a pair of sideband signals is described by Costas in the Proceedings of the IRE, November, 1957 issue. The use of narrow band filtering in this circuit for identification of the transmitter and for improvement of the signal to noise ratio is described in my copending application for U.S. letters patent, Ser. No. 86,770.

The circuit for measuring the change in phase between the center frequency of the modulation side bands and the base frequency is provided with low pass filters 1725 and 1726. Though the rate of change of phase is not in general constant and the frequency of the signal output of the filters is not generally constant, it may simplify explanation of the fundamental operation of the circuit to assume that for a brief moment the rate of change of phase between the center frequency and the base frequency is constant. In other words, it is assumed that the target is moving about the station in such a manner that there is a constant rate of change of the direction cosine relative to the antenna axis of the station corresponding to the particular channel under analysis. For the purpose of analysis, let it also be assumed that some of the base frequency signal is allowed to pass through the balanced modulator 1703. Since the modulation equipment in the transmitter and the sideband tracking equipment in the receiver are only for the purpose of enabling one to separate and identify the signal from the transmitting antenna 1705, and the operation of this portion of the equipment is amply described elsewhere, attention is directed to the center frequency of the signal transmitted from transmitting antenna 1705 and the modulation is ignored for the moment. Whether or not a signal of the center frequency is actually transmitted is of no consequence as the voltage controlled oscillator 1723 provides a signal of the same frequency and of much larger amplitude to the mixers 1714 and 1715. Furthermore, the phase of the injection signal is effectively caused to track the phase of this center frequency signal so that its presence is of no consequence in the operation of the circuit.

It has been assumed that the rate of change of the phase of the signal from transmitting antenna 1705 and the transmitting antenna 1702 is constant. It may then be said that the two signals coming from the two antennas are of different frequency. Since the injection frequency signal of the mixers 1714 and 1715 is tracking the signal from transmitting antenna 1705, the signal from transmitting antenna 1702 causes a beat frequency signal at the output of both of the mixers 1714 and 1715. The modulation frequency of the balanced modulator 1703 is chosen to be substantially higher than the highest operational value of the frequency of this beat signal so that the low pass filters 1725 and 1726 and the band pass filters 1719 and 1720 can easily separate the two signals into separate circuits. Since the injection signals into the two mixers 1714 and 1715 are in phase quadrature, the two signals of the beat frequency at the outputs of those mixers are similarly in phase quadrature. The low pass filters 1725 and 1726 pass the beat frequency signal from d.c. to the highest operational beat frequency but rejects the modulation frequency. The two beat frequencies, 90° out of phase with each other, are transmitted directly from the low pass filters 1725 and 1726 to reversible counting circuit 1727. The operation of this type of circuit is described by H. W. Kohler in U.S. Pat. No. 2,911,641. A control signal circuit is shown at the bottom of the FIG. 17 for initiating and terminating the measurement of both channels simultaneously. The counting circuit is thus sensitive to the sense of the change in phase between the signals received from the two transmitting antenna. There is nothing in the operation of the circuit requiring that the operational rate of change of phase should be constant and, in fact, it would not be expected that it would be constant.

There are several modifications of this system that are at once obvious. The antennas may be replaced by loudspeakers or underwater transducers so that sonic waves may be generated and transmitted instead of electromagnetic waves. In this case, a microphone or hydrophone would replace the receiving antenna. Thus a submarine could navigate under water using my invention as a method of determining its position continuously.

It is further obvious that the principles of my invention are not changed if the signals reaching receiving antenna 1709 are not processed aboard the moving vehicle but are simply amplified and retransmitted perhaps on a different frequency spectrum by a transponder on board the vehicle to some other point, either on another moving vehicle or on the ground. The processing of the signals would be accomplished at this remote point. Similarly, the signals might merely be reflected from the moving object to the aforementioned remote point on the ground or on another moving vehicle where they would be received and detected by suitable radio or hydrophonic equipment and processed in the manner described. In reflecting or transponding systems whether employing electromagnetic or sonic or other waves, the analysis and principles of my invention remain the same and are equally applicable. The linear transference of the process of reception and detection from the primary reflecting or transponding moving vehicle to some other moving or stationary point does not alter the essential geometrical relationships of my invention.

The system shown in FIG. 17 is sensitive to the direction or sense of the change of phase between the base and the modulated signals and is capable of following a reversal of the ratio of this change in phase. There are practical limits to the slowness with which the rate of phase can go through zero, however. At zero beat there is no difference between the unmodulated base frequency and the center frequency of the modulated signal. How close the zero beat condition of operation can be approached is dependent upon the stability and the noise of the circuit. A method that permits operation through the zero beat condition at any rate of change is obtained by modulating the signal from the base antenna as well as the signals from the two axis antennas. Modulation of the transmitting antenna 1702 is attained by introducing a balanced modulator similar to the balanced modulators 1703 and 1706 between the standard frequency oscillator and the antenna. The modulation frequency is assigned to be other than the modulation frequencies of the balanced modulators 1703 and 1706. In the counting channel of the receiving equipment the low pass filters 1725 and 1726 are replaced by narrow band pass filters. The outputs of the band pass filtors may then each be fed to one of the quadrature stator windings of a synchronous motor coupled to an odometer similar to the arrangement shown in FIG. 15. Such a motor may be of the kind commonly known under the name Selsyn. Since it is only the change of phase that is to be measured, it is not necessary to maintain any particular polarization of the rotor other than that induced by the stator. It is of course necessary that the rotor have a shape that permits a torque to be developed by the induced polarization and that it be suitably laminated to permit the easy conduction of magnetic flux at the modulation frequency of the base antenna. A conventional bar-shaped rotor would be satisfactory for a two-pole motor. Should closer control be desired the rotor may be of the wound variety excited by a signal obtained by adding the outputs of the two narrow band pass filter.

An electronic counting circuit may be employed instead of the motor and odometer equipment described in the last paragraph. In this electronic direction sensitive counting circuit there are employed two synchronous detectors, one at the output of each of the narrow pass band filters that replace the low pass filters 1725 and 1726. A common synchronizing signal for the two synchronous detectors is obtained by adding the two signals from the outputs of the narrow pass band filters. The signals from the outputs of the synchronous detectors may then be applied to a circuit such as that described by H. W. Kohler in U.S. Pat. No. 2,911,641.

A combination of measurement of change of cosines and change of range results in a system operable with a single system measurement and employing only two stations, each having two axes. The doppler change of range measurement is easily added to the equipment shown in FIG. 17. Stable frequency standards are required at the transmitting stations and at the receiving stations, and a mixing and beat counting means must be provided at the receiver to operate with each transmitting station. Six measurements are performed simultaneously, three relative to each station.

SINGLE STATION HYBRID

A modification of my invention employs a single receiving station at which measurements of angular variation are performed simultaneously with measurements of variation of wave propagation path length. In one form of this modification an angle tracker is employed at the station to track the waves from a moving transmitter whose range from the station it is desired to determine. Simultaneously, the doppler effect caused by the motion of the moving transmitter relative to the receiver is observed and measured. Employing the two types of measurements, angle variation and doppler, together with suitable assumptions relative to possible motion of the transmitter, the range from the station to the transmitter is computed.

The target being tracked may be a moving reflector of waves rather than a transmitter as described above. The illumination of the moving reflector may be accomplished at the receiving station where the angle tracking and doppler measurement are accomplished or the illuminating transmitter may be at some other point. Monochromatic continuous wave radiation may be employed in the systems described above. Pulsed or otherwise modulated waves may also be employed.

The system may also employ multiple aperture receivers at the station. In this case the variation of a trigonometric function of the angular coordinates of the moving target relative to the station are measured simultaneously with the doppler measurement.

When an angle tracker is employed to measure the angular variation, the data may be collected by means of an inertial device mounted directly on the direction sensing element, such as the parabolic reflector of a microwave angle tracker. In this method the errors of the gimbal angle indicators is not reflected into the measurement of angular variation. The gimbal angle indicators may be read if it is also desired to obtain the direction of target from the station, but it is not necessary to read the gimbal angle indicators for the determination of the range by the hybrid system involving angular variation and doppler measurements. The inertial device mounted directly on the antenna is similar to the devices employed for inertial navigation. Gyroscopic means can be employed to indicate the variation of the pointing angle of the angle sensing element, parabolic reflector in the case of a microwave angle tracker.

The measurements of the doppler phenomenon and the angular measurements may be either incremental or they may be the rate type of measurement capable of determining the various derivatives.

It is obvious that the methods described above are easily applied to multiple targets simultaneously. A station employing multiple apertures can discriminate between the targets by the separate doppler frequencies of each target.

Three-Station System Using Ballistic Cameras

In one modification of my invention three stations whose positions on the earth are known are employed to determine the positions of three points in the sky by photographic means at each station. The well-known ballistic camera is employed. All three cameras are pointed so that they cover a common volume of the surveillance sky space. The exact angular orientation of the cameras need not be known exactly since the determination of position is not dependent upon this knowledge. It is only necessary that the three sky points are visible to each camera.

The three sky points may be three simultaneous points such as three aircraft. In such operation the shutters of the cameras must be synchronized by appropriate timing means between the stations. The cameras may also be employed with a flashing light operating from a single aircraft.

The angles between the three sky points are determined by measurements of the photographic films. Thus, there are three measurements derived for each of the three stations, making a total of nine measurements. From these nine measurements the nine cartesian coordinates of the three sky points are determined using the methods of computation described elsewhere in this application.

By photographing more than three sky points redundant data may be obtained. Such data may be employed for statistical improvement of accuracy and may also be employed for flash identification when the flashing light method is employed using a single film plate. Changing film for each flash is an alternative method of flash identification.

Attitude Determination

To one skilled in the art it is readily apparent that several of the embodiments of my invention described in this application may be easily adapted to the purpose of determining the attitude of an aircraft or missile. To determine the attitude of a vehicle relative to some reference frame it is only necessary to establish on the reference frame a plurality of points relative to which bearings at the vehicle may be determined simultaneously. To determine these bearings the moving vehicle can be equipped with a plurality of wave apertures the variation of the direction of waves incident upon the vehicle can be employed as described herein to determine the bearings. Alternatively, the transmitter and the apertures may be in the vehicle. Emissions from the plural apertures of the vehicle must be instrumentally identifiable by the ground station. A system for providing this identification and performing the desired measurement is shown in FIG. 15. It is only necessary to consider the equipment of the type shown as "ground transmitting equipment" to be mounted in the vehicle and the equipment shown as "receiving equipment in moving vehicle" to be mounted on the ground reference frame at each reference point.

Doppler Range Determination

Range may be determined from doppler incremental measurements as described in my copending patent application, Ser. No. 278,191, when reasonable assumptions can be made relative to the path of a moving object.

When range increments are measured between a moving point and a fixed point, or between two moving points and when it is possible to assume that the path is well behaved (continuous, no reversals), one may write the equation $$\sum_{j=0}^{j=n} \alpha_j r_j^2 = 0$$

where the terms are coefficients determined by the timing of the measurements. In particular, these terms are the binomial coefficients when the time intervals between the terminations of the measurements are equal. The convention of referring all measurement of a series of measurement to the same starting point being employed here. From this equation, one finds the range to the starting point to be $$r_0 = \frac{\sum_{j=1}^{j=n} \alpha_j M_j^2}{-2 \sum_{j=1}^{j=n} \alpha_j M_j}$$

where:
$j$ is the number of the measurement
$M_j$ is the value of the $j$th measurement of change of range
$n$ is the number of measurments in the range sequence.

Alternatively, one may write $$r = -\frac{1}{2} \frac{\sum_{j=0}^{j=n} \alpha_j M_j^2}{\sum_{j=0}^{j=n} \alpha_j M_j}$$

Where $r$ is any range to which all the measurements of range change are referred but which reference range is not included in the series of range squares indicated above.

This method of range determination may be employed in any of the hybrid systems described in this application as an aid in position determination. However, doppler and other similar measurements may be used in other ways in such hybrid systems as an aid in position determination. Furthermore, range difference measurements may be performed using range tones, pulses and other methods.

Inertial Mount

FIG. 18 and FIG. 19 show the inertial sensing apparatus, required in the indicated modifications of my invention, located within the structure of the pointing member of a typical tracking mount. Two elevational views are shown. In the particular example of my invention to which FIG. 18 and FIG. 19 are pertinent the tracking mount is that of a microwave radio tracker employing a parabolic antenna (dish). The inertial sensing apparatus is fixed with respect to the parabolic receiving antenna (dish), and the axes of the inertial apparatus rotate with the axis of the parabola. The variation of the pointing angle or angles is sensed by the inertial apparatus which may or may not employ gyro mechanisms. There is a broad spectrum of inertial apparatuses available on the market to suit the requirements of any particular modification of my invention, and the art of applying such mechanisms is too well developed to warrant further description here. Many of these apparatuses are of such a nature that they may be mounted at any point on the rigid structure holding the dish. In some instances it may be desirable that the inertial apparatus be mounted upon the axis or axes of rotation of the pointing member supporting the dish as shown in FIG. 18 and FIG. 19.

In some modifications of my invention the inertial apparatus may comprise a single gyro whose axis is that of the parabola. The forces required to rotate the gyro so that it remains in a fixed angular position relative to the dish are measured or sensed, and signals dependent upon the magnitudes of these forces are employed to represent the angular variation of the axis of the dish. FIG. 20 shows the gyro wheel mounted within the pointing member of the tracking pedestal. The gimbals and other necessary apparatus associated with gyromechanisms is not shown for clarity.

In some modifications of my invention it is necessary to account for the rotation of the earth or other platform supporting the system since inertial apparatus is functional with respect to inertial space.

There are different modes of operation of the inertial sensor as it may be applied to an angle tracking mount for the purpose of practicing my invention. The inertial device may or may not comprise two separate axes, and these axes may or may not be mutually orthogonal. Inertial measurement or sensing means may also be employed for either rate type or incremental types of sensing or measurement. As there is substantial discussion relative to the subject of angles and their axes relative to gimbal type sensing apparatus the discussion here is abbreviated with reference thereto. In providing a specific reference to the inertial device as shown in FIG. 20 the modification chosen is one employing the angular rate as shown in FIG. 24 described below. In this specific application the axis of the gyro wheel remains substantially on the axis of the pointing member of the mount. In that mode of this same modification employing incremental angular measurements as shown in FIG. 22 (described below) the axis of the gyro wheel remains in the same direction during the process of the measurement of the angular variation as it had at the start of the measurement. The angle between the axis of the pointing member and the axis of the gyro wheel is measured or sensed and is the angular variation employed in performing the remainder of the process of determining a dimension of the position-motion state comprising automatic computation means for determining this dimension using the sensed or measured angular variation data.

Known Starting Point

In some modifications of my invention at least one dimension of the position-motion state of the moving object is known a priori. This knowledge may be obtained from any of a wide variety of sources, but for the purpose of this section of this application the nature of the source of this information is not important. In a typical application a "starting point" is known. As the object moves from this starting point, which starting point is not necessarily the beginning of the trajectory of the object, the object is tracked by a plurality of apparatuses each of which measures or senses the variation of some geometrical parameter that is dependent upon the variation of the direction of the object from the direction corresponding to the starting point. From the measured variational information and the coordinates of the starting point position of the moving object and other dimensions of the position-motion state are derived automatically by computing means, in this instance employing the Cosine Law of trigonometry. The geometry of one modification of my invention of this type for operation in three-space is shown in FIG. 21. There are three stations, and at each of these stations the variation of the cosine of the angle $\theta$ between a known axis through the station and the instantaneous target direction from the station is measured. Such an axis is defined by a pair of apertures which is a part of the measuring apparatus as shown in FIG. 3. The known axis through the station need not be fixed nor need it be of the same direction as the axis of any of the other stations. In the particular modification illustrated these axes are fixed. The measured quantity at each station is:

$\cos\theta_1 - \cos\theta_0$ where $\theta$ is the angle between the arm point and the known axis.

The geometry of a somewhat similar modification of my invention of this type for operation in three-space is shown in FIG. 22. In this modification of my invention the reference axis employed at each station is the direction of the starting point from the station. The measured quantity at each station is the angle $\theta$, the angle between the known arm point and the arm point whose position is to be determined. In a preferred modification of my invention inertial means are employed on a radio tracking mount at each of three stations. The moving object carries a radio transmitter to whose signals the tracking mount is responsive. These modifications of my invention bear a superficial resemblance to the DOVAP system in the use of a known "starting point." However in all other aspects my invention is entirely different.

It is obvious that the modification of my invention employing a known point along the trajectory is in fact independent of which direction along the trajectory from the known point it is applied. It can of course be applied in both directions. It is further obvious in this modification of my invention that the dimension of the position-motion state of the moving object to be found can be either a dimension of position or a dimension of motion such as velocity. Furthermore there is no need to provide a largely repetitious discussion here of the applications of this mode of my invention to multiple targets, mapping, etc.

The known starting point was presented as one example of my invention employing a priori data relative to at least one dimension of the position-motion state of an arm point. Another dimension of this position-motion state that may be made known a priori is any dimension of motion such as velocity, and specific modifications of my invention exist relative thereto as described above in this section relative to known starting point.

Measurement or sensing apparatus performing a determination of the incremental variation of a function of the angle of wave incidence are shown in FIG. 7, and is described elsewhere in this document. Angular increments are determined by radio tracking means employing suitable encoders on the gimbals. Alternatively inertial means on the angle tracker as described elsewhere in this document are used in some modification of my invention.

Use of a Prior: Data

A priori data available in the performance of my invention may be in itself entirely adequate to define, for some purposes, any desired dimension of the position-motion state. Alternatively, such a priori data may be of such a nature as to only partially define or bound one or more of the dimensions of the position-motion state. In either case a priori data may be incorporated into my process and be an integral part thereof. Various modifications of my invention employ such data in diverse ways. In one mode of my invention the a priori data is essential to the definition of the dimension of the position-motion state that it is the purpose of that particular mode of my invention to determine. An example of this mode of my invention is that incorporating the known "starting point" discussed above. In this mode of my invention the a priori data is insufficient to provide a complete definition of the desired dimension of the position-motion state; the data does serve as a partial definition, when employed with the remainder of the process, for complete definition of the position-motion state. In other modes of my invention the a priori data is adequate in itself to provide a complete formal definition of the desired dimension of the position-motion state but such formal definition as is thus provided is not of sufficient or desired accuracy. Though such data is useful it is not adequate. In one mode of my invention such data is incorporated in the process of determination of the desired dimension of the position-motion state by first using such data to determine a first value of the desired dimension using only the a priori data. Such a first determination is also accompanied by a computation of the variances of the resultant determination derived by automatic computation comprising the geometrical properties of the method of determination as well as the variances of the measurements from which the a priori data is derived. A second part of the process is the second determination, independent of the first determination, of the same dimension of the position-motion state employing the subprocess comprising measurement or sensing dependent upon angular variation, which subprocess is described elsewhere in this document. In a similar manner as performed in the first determination of the desired dimension of the position-motion state this second determination of the same dimension is accompanied by a determination of the variance of the value of the dimension as so determined. Also in like manner with the automatic process of the first determination this determination of the variance comprises the geometrical properties and the variances of the measurement or sensing. The two independently derived values of the desired dimension of the position-motion state are then combined in accordance with weights derived from their respective variances to obtain the finally determined value of the desired dimension of the position-motion state. If desired the variance of this dimension is also determined. An alternative mode of my invention uses the a priori data formally adequate for definition of the desired dimension and the data derived from measurements or sensing dependent upon angular variations also formally adequate for determination of the desired dimension of the position-motion state in a single determining process using a desired statistical criteria such as that of least squares. Any of these modes of my invention may be arranged to provide a final determination according to the least squares criterian comprising all of the input, sensed, or measured data.

A priori data may be of any sensed or measured type or may be derived from sensing or measuring. Examples: ranges, range sums or differences, the variations of these (doppler), inertial data, etc.

Any number of independent determinations of the desired dimension of the position-motion state, each such independent determination employing a separate combination of data selected from the total data, a priori and dependent upon angular variation, may be combined in a computer for automatically computing the final value of the desired dimension. The value of such an automatic process of combining the results of independent determinations of the same dimension over that modification of my invention employing say a single weighted least squares determination lies in some simplification of the automatic computation process and improvement in the speed thereof.

My invention is essentially independent of whether required data that is not related to the variations of angles whose apexes are at the station or apex points is derived a priori or is derived in elements of the total process of my invention. The essential element of a priori in the claims is its reference to that data and those elements of the process and system that are not associated with the measuring, sensing, or determination of any angular or trigonometric quantity, or variation of such an angular or trigonometric quantity, which variation is dependent upon the variation of the direction from an apex point or station point to the point of the moving object or arm point, and which angular or trigonometric quantity is associated with any angle whose apex is at any of the station points or apex points of the system and either of whose arms include any arm point.

It is to be emphasized that this application for letters patent does not contemplate the direct measurement or the direct sensing of any nonvariational angle whose apex is at one of the apex points (station points) of the system and the arms of which angle do not both contain arm points (points along the path of the moving vehicle) nor that any data from any such direct measurement or sensing is employed as a priori data in the method and/or system of my invention. Similarly there is no measurement by nonvariational means of any trigonometric function of such an angle, nor is any such trigonometric data employed as a priori data. Only variational measurements are contemplated relative to any angle whose apex is located at one of the apex points or station points of the system. The data resultant of these direct sensings, measurements, or determination, resultant of the variation of direction of the moving object from the apex point, is of course not a priori data.

In the claims a priori data may describe that data related to motion equations, ballistic data, orbital data, and the like employed in some modifications of my invention.

Velocity Determination Using a Prior Position

A priori data defining the position of a moving object is employed in some modifications of my invention for determining the velocity dimensions of the position-motion state of a moving object.

A modification of my invention may be employed to determine the three-dimensional velocity vector of a moving object at a position defined by a priori data relative to three stations not in a straight line. Some examples of this modification of my invention are described below. In these particular examples the moving object carries a radio transmitter to whose signals tracking or measuring apparatus at each of the three stations is responsive.

In the first example, the geometry of which is shown in FIG. 23, a known axis is provided at each of the stations by the axis of an aperture pair which is a part of the measuring or sensing apparatus as shown in FIG. 1. The axis of each station (apex point) need not be of the same direction as the axis of any other station. The direction of these axes may be fixed or in motion, but in this particular example of my invention the directions of these axes are known and fixed. Sensing apparatus, shown in either FIG. 5 or FIG. 6 both of which choices of apparatus are described elsewhere in this document, is located at each station and determines the time rate of change of the cosine of the angle between the axis of the two apertures and the direction of propagation of the wave from the transmitter as it arrives at the station. The set of three measurements of the rate variations, one for each station (apex point) determines the three components or dimensions of the velocity of the moving object (arm point). Known in this modification of my invention are the positions of the three stations, (the apexes of the angles whose cosine variations are sensed or measured), the directions of the reference axes through the stations and the instantaneous position of the moving object (the arm point).

A second example of this modification of my invention, the geometry of which is illustrated in FIG. 24, differs from the first example in that the angular variation itself is measured or sensed or determined at each of the apex points rather than the variation of the cosine or other function of the angle. As in the first example, the positions of the apex points (the stations) and the arm point (the moving object) are known a priori. Any radio direction tracker mount may be employed. Such a mount is employed at each of the stations to track the direction of the moving object from the station. It is only necessary that the mount be equipped with angular rate sensing apparatus. Such sensing apparatus may be operated through the gimbals of the mount or may be inertial in character as shown in FIG. 18 and FIG. 19, and described elsewhere in this document. The particular form of the inertial device described relative to FIG. 20 is conveniently applicable to this particular example of the invention.

In these modifications of my invention the data sensed, measured or determined relative to the variations of the angles at the several apex points or to the variations of the functions of angles at the several apex points is fed to a computer where the desired translational rate dimensions (translational velocity) of the position-motion state of the moving object are determined by automatic computation means.

Other Modifications

My invention has been described in this document in terms of those modifications thereof that are more easily described and illustrated. There are numerous other modifications which are not specifically illustrated. Furthermore modifications presented here will suggest at once to those familiar with the art variations thereof which are not presented here.

My invention of course may be employed in two-space, either in the position finding mode or for determining velocity. In some modifications of my invention for operation in two-space there are but two stations each station being the apex of but a single angle relative to which variational measurements are performed according to the teachings of this application for letters patent. In three-space my invention may be employed as shown relative to the variation of a single angle at each of three stations. Such a single angle does not completely specify the direction relative to the apex point. At least two angles are required to specify direction. In practical direction finding machinery these two angles are generally chosen to be orthogonal to each other, for example: azimuth and elevation. The variation of the single angle as shown in FIG. 22 and FIG.

24 can be specified in terms of the variations of the two orthogonal angles, or even in terms of nonorthogonal angles not lying in the same plane. Thus those embodiments of my invention requiring the determination of the variation of the single angle at each apex point as shown in these figures and above described as relying on direct measurement or sensing of that angular variation can as well determine automatically such required determination through the direct sensing or measuring of the simultaneous variations of the two orthogonal or nonorthogonal angles and trigonometric conversion of the signals representing such two-angle information to signals representing the required single angle data.

Each of the two orthogonal or nonorthogonal angles required to specify a direction from an apex point is defined relative to an axis through the apex point. For example the orthogonal angles of azimuth and elevation are referenced to a selected horizontal axis and the vertical axis, both of which axes pass through the apex point. The variations of these angles are then relative to these axes. In general neither of these axes would be through an arm point. These angles may be called bearings. Such angles are shown in FIG. 21 and FIG. 23, where only one such angle is shown at each apex point. A system dependent upon the measurement or sensing of the simultaneous variation of but one such angle at each apex point is another modification of my invention. The measurement of these variations is conveniently made through angular encoders on the gimbals of the tracking mount or may be made by angular rate measuring devices thereon. Thus the variation of either of the bearing angles may be employed instead of the angular variation as shown in FIG. 22 and FIG. 24. Angle tracking mounts in addition to the most familiar Az-El mount are the X-Y mount: the sidereal mount, and the three-axis mount, which last named mount has a surplus of axes for mechanical convenience in tracking if not for convenience in automatic trigonometric processing.

In systems employing mounts with orthogonal axes, either of the two orthogonal bearing variations can be employed at each of three stations in modifications of my invention. For example each of three stations may be the apex of an elevation angle relative to which variational measurements are performed. Alternatively two of the stations may operate through the elevation angle and the third operate through the azimuth angle, etc. In still other modifications of my invention only two stations are employed, for operation in three-space, one station operating through two angles and the other operating through one angle for a nonredundant determination of at least one dimension of the position-motion state of a moving object. If variational determinations are performed relative to two angles at each of two stations the selected dimension of the position-motion state may be redundantly determined.

In some modifications of my invention the a priori data employed is not sufficient in itself to completely determine any dimension of the position-motion state. An example of such a modification of my invention for operation in three dimensions comprises two stations. At each station the range is measured to the moving target, thus the position of the target is only bounded and not completely determined by this data. The variations of two angles at each station are measured, the variation in azimuth and the variation in elevation. There are thus a total of six measurements, enough to determine six dimensions of the position-motion state, three dimensions of position and three dimensions of velocity. Either the variation of the angle or variation of a function of the angle can be sensed, measured, or determined. Also the variations may be incremental, of the type illustrated in FIG. 21 and FIG. 22 or they may be of the rate variations, or the type illustrated in FIG. 23 and FIG. 24. The two ranges partially bounding position in three-space can be replaced by a priori position dimensions. For instance instead of the two ranges being measured or available a priori two of the cartesian coordinates of a point may be known a priori or made known. The third cartesian position dimension is then determined by my process comprising the measurement, sensing, or determination of angular variations or variations of the functions of angles.

Apparatus Aboard Moving Vehicle

My invention comprises modifications thereof in which the moving object is a vehicle carrying apparatus functional in the means and methods of the invention. In some modifications of my invention such vehicle borne means are cooperative in the measuring, sensing, or determining of angles and/or functions of angles which angles are at one or more of the apex points of the system. Some modifications of my invention comprise such vehicle borne means that are distinct from the means used for measuring, sensing, or determining angles and/or functions of angles at the apex points which last mentioned means are required in all modifications of my invention. In some modifications of my invention the vehicle borne apparatus is essential in the determining of the desired dimension of the position-motion state of some selected point at which point there is apparatus functional in the invention and which determining is performed with a certain accuracy. In other modifications of my invention such vehicle borne apparatus is used in determining redundant data relative to the desired dimension of the position-motion state and such redundant data is employed to improve the accuracy achievable in my invention.

In some modifications of my invention the vehicle carries inertial navigation means, and excellent automatic means for performing the required function are available. Automatic celestial navigation means are also well known in the art and are supplied in other modifications of my invention. The well known automatic doppler navigation means similar to that carried aboard modern airliners is another example of such apparatus employed in various modifications of my invention. Means carried aboard the moving vehicle for measuring, sensing, or determining angles, functions of angles, and/or the variations of these which angles have their apexes at the position point of the vehicle are parts of other modifications of my invention. Vehicle borne apparatus for measuring the angles between ground beacons is shown in U.S. Pat. No. 3,206,605 issued to R.K.C. Johns entitled Object Location System, filed Feb. 23, 1961, issued Sept. 14, 1965. Of course vehicle borne apparatus for use in determining quantities linearly dependent upon distances and/or variations of distances are parts of other modifications of my invention. These and similar vehicle borne means and methods used singly or in combination with other such means form elements in some modifications of my invention for automatically determining, sensing, or measuring quantities or data bounding or determining, or improving the bounding or determining, of at least one dimension of the position-motion state.

An example of a combination of such vehicle borne means exists in a modification of my invention in which apparatus aboard the vehicle is functional in making angular determinations relative to at least one axis established by inertial means aboard the vehicle.

An example of a modification of my invention employing the vehicle borne apparatus to gain an independent determination of the desired dimension of the position-motion state, which independent determination is employed to improve the accuracy of other determination of the same quantity in my invention, is dependent upon the vehicle borne sensing of quantities dependent upon the variations of angles whose apexes are at the position point (arm point) of the moving vehicle. This vehicle borne apparatus is distinct from that shown in Johns, above referenced, in that only quantities dependent upon the variations of the angles are measured, sensed, or determined and not the angles themselves as shown in Johns. Beacons are employed on the ground at a plurality of points relative to which beacon points the angular variations are sensed, measured, or determined at the vehicle. This particular vehicle borne apparatus determines the rates of change of the angles at the vehicle between ground beacons. From this data and the data relative to the geometrical disposition of the ground beacons the position-motion state of the moving vehicle is determined by automatic computation along with the associated variances of the determination. The same dimensions of the position-motion state of the moving vehicle are also determined as described elsewhere in this specification by sensing the variations of angles whose apex points are at ground stations (apex points) of the system and whose variations are resultant of variations of the directions of the moving vehicle from these apex points. The data resultant from sensing these variations of angles is fed to a computer where the desired dimensions of the position-motion state of the moving vehicle are automatically computed. The two separate determinations of the dimensions of the position-motion state of the moving vehicle and their computed respective variances are then fed as data to a final computing element for combining these data to obtain an improved determination of the dimensions of the position-motion state of the moving vehicle. In this modification of my invention the sensed variations of the angles at the apex points are rate type variations. In other modifications of my invention the sensed variations of the angles at the apex points are incremental type variations. In other modifications of my invention rate type variations of bearing angles at the apex points are measured. In still other modifications of my invention incremental type variations of bearing angles at the apex points are sensed. In any of these modifications of my invention the measurements of the variations of angles whose apexes are at the vehicle position point (arm point) may be either of the rate type as described above or may be of the incremental type. Other modifications of my invention employ measurements of the variations of the functions of angles at either the vehicle or the apex point or both since the angles may be bearing angles. In one modification of my invention the variations of bearing angles at the vehicle are measured and the axis relative to which these measurements are performed are determined by inertial means aboard the vehicle.

Claim Language

In the practice of my invention geometric quantities are measured, sensed, or determined. These geometric quantities comprise angles, ranges, distances and the like, and the sums and differences and variations of these. The measurement, sensing, or determination of these quantities by the automatic processes of my invention results in geometric data, the physical representations of the values of these quantities. These representations are such that the geometric data can be fed by automatic means into a computer where the required dimension of the position-motion state is automatically determined.

The expression "position-motion state" applied to an object implies two components of the state of being of the object in space relative to other objects. The components, for the purpose of being explicit in the claims, may be said to be variational and nonvariational in character respectively. Nonvariational geometric data relative to a point then is, in the claims, data such as that of a range or of an angle, etc. while variational data relative to a point is data such as that of the increments of these quantities or of the time derivatives of these quantities.

A number of modifications of my invention have been described in this document.

My invention is general comprises methods and apparatus for determining dimensions of the position-motion state of a stationary or moving object. My invention may be employed to determine the positions of stations of a tracking, navigating, or surveilance system (examples: system self-surveying, mapping) as well as for the determination of the velocity, position or other dimension of the position-motion state such as acceleration of any object such as a radio transmitter, a radio receiver, a radio reflector, or other such object. Since my invention can be used both in its mapping and/or self-surveying function as well as for detecting and tracking moving objects in space it is convenient for the purposes of the claims to describe it relative to a plurality of points in space comprising two groups of points, or categories of points. One such group or category of points being those points at which wave equipments such as beacons, receivers, transponders, etc., which may or may not be in motion. The other group or category of points is associated with a moving object which similarly may be any such wave device. Each point of this second group or category of points lies at some position along the trajectory of a moving object. A plurality of measurements, sensings, or determinations are performed as indicated herein which determine at least one dimension of the position-motion state of one of the points of either group of points depending upon the particular modification of my invention. Each measurement, sensing, or determination of an angular variation is performed relative to one or more points in each group or category of points. Either group or category of points may or may not comprise but a single point depending on the particular modification of the invention. Equipment for use in measuring, sensing, or determining at least one angle or angle function or the variation thereof is located at at least one point of the first group or category of points, which point is the apex of such a sensed, measured, or determined angular variation.

No part of the claims should be interpreted in such a manner as to imply the direct measurement or direct sensing of any nonvariational angle relative to any axis through an apex point which axis does not also include an arm point (a point along the path of the moving object). Similarly no part of the claims should be interpreted in such a manner as to imply the direct measurement or direct sensing of any trigonometric function of any nonvariational angle relative to any axis through an apex point which axis does not also include an arm point. As an example my invention makes no use of the triangulation process wherein the position of an object is determined relative to a plurality of stations at each of which the bearing angle of the object is measured relative to an established axis through the station, the data representing the bearing angles being used to compute the position of the object relative to the stations.

Equations of Motion, Ballistic Parameters, Orbital Parameters, and the Like

It is to be emphasized that my invention is entirely operable without the knowledge or assumption of the character of any type of motion such as an orbit of a satellite or the ballistic trajectory of a shell or other missile. In some modifications of my invention however such data is incorporated into the processes of my invention however such data is incorporated into the processes of my invention either for the minimum determination of at least one desired dimension of the position-motion state or for the enhancement of the accuracy of such a determination. These a priori relationships are commonly expressed as equations of motion, orbital equations, ballistic equations and the like. Other modifications of my invention are of advantage in certain applications in not employing such data, though the dimensions of the position-motion state determined by my invention may sometimes be employed to determine the parameters or constants of such motion equations, or even the form of such motion equations. One advantage derived by some modifications of my invention from the incorporation of such a priori motion relationships is the relief from the requirement for simultaneity of the plural measuring, sensing, or determining of the various geometrical elements and the variations thereof required in other modifications of my invention.

Simultaneity

In some modifications of my invention it is required that the operation of the separate apparatuses for determining, sensing or measuring the several geometric elements or the variations thereof be essentially simultaneous. Such simultaneous operation may be required only among those apparatuses whose functions are related to the variation of the directions of the moving object point or arm point from the apex points or station points. In other modifications such simultaneity may be required only among those elements performing nonvariational measurement, sensing, or determining. In other modifications of my invention simultaneity is required among a mix of such apparatuses as those described above. Freedom from the requirement for simultaneity is achieved in some modifications of my invention through the use of doppler means. Doppler means provide the facility of relating one arm point to another arm point, that is points along the trajectory or path of the moving object can be related to one another thereby thus abrogating the requirement for simultaneity of the operation of other of the elements of the system or process. Use of inertial means aboard the moving vehicle can provide the same function. The use of a priori motion relationships similarly provides this facility in other modifications of my invention.

Similar statements apply to those modifications of my invention in which measurements related to the variations of angles at the position point of the moving object or vehicle are performed.

In one modification the separate measurements of the variation of angle, or function of angle, are performed over separate time intervals, as at the separate segments of an orbit. The variational measurements are at the ground stations in some modifications of my invention and are at the vehicle in other modifications of my invention.

Modifications Employing Measurement of Angular Variations At Moving Vehicle

My invention may be employed without the measurement of any angle or variation thereof, or the measurement of any function of an angle or variation thereof, which angle is located at any ground or station point. In one modification of my invention measurement of quantities dependent upon angular variations are performed only relative to angles whose apexes are at the position point of the moving object. These measurements are performed employing beacons at the ground stations (group one points). Receiving apparatus aboard the moving vehicle detects the variation of the angle between the direction line to a beacon and a local inertially established reference axis aboard the moving vehicle. A number of such measurements are performed simultaneously depending upon whether the invention is to be employed in two-space or three-space and depending on the number of such axes employed aboard the moving vehicle. The geometric relationships of one such system are shown in FIG. 25. It is seen that six ground beacons are employed relative to which the incremental angular variation is measured, relative to an inertially established axis carried on board the moving vehicle, as the vehicle travels from Point 1 to Point 2 along its path. Since only one axis is employed aboard the vehicle in this instance six stations are necessary and sufficient to provide the six elements of data required for the determination of all the dimensions of positions of both Point 1 and Point 2 (group two points). It is readily seen that from the six stations six independent equations are obtainable for full definition of the unknown quantities. $X_1Y_1Z_1X_2Y_2Z_2$.

A second type of this modification of my invention employs variational measurement of the angle between two beacons (group one points), the apex of the angle again being located at the vehicle. The geometrical properties of this particular modification of my invention are shown in FIG. 26. This modification of my invention is similar to that modification shown in FIG. 25 in that incremental angular measurements are performed. However, in this modification of my invention the angular variational measurement that is performed is performed relative to the angle between the directions to two beacons whereas in the method illustrated in FIG. 25 the angle is the bearing between the direction of one beacon and an axis established on board the moving vehicle. Only five beacon stations (group one points) are required in this modification of my invention since five stations provide the opportunity for the required six measurements. Actually five beacons provide an opportunity for seven geometrically independent measurements of angular variation, and if all seven simultaneous measurements are performed the determination of the six position dimensions is redundant with a consequent improvement of accuracy.

The geometrical relationships of a third type of this modification of my invention are shown in FIG. 27. This modification of my invention differs from those modifications whose geometries are illustrated in FIG. 25 and FIG. 26 in that rate type variational measurements are performed instead of incremental type variational measurements. This modification of my invention is similar to that modification illustrated in FIG. 25 in that the measurements are performed relative to an axis maintained by inertial apparatus aboard the moving vehicle. Since there is only one axis employed at the vehicle, again six beacon stations are required. Other modifications of my invention employ more axes and may then employ fewer beacons. Since this is a rate-type process the six unknown dimensions of the position-motion state of the moving vehicle are the three dimensions of position and the three dimensions of velocity.

The geometrical properties of a fourth type of this modification of my invention are shown in FIG. 28. This modification of my invention is similar to that modification of my invention illustrated in FIG. 27 in that rate type measurements are performed relative to angles whose apexes are at the position point of the moving vehicle, rather than the incremental type of variational measurement as shown in FIG. 25 and FIG. 26. This modification is similar to that illustrated in FIG. 26 in that the angle relative to which the variational type measurement is performed is the angle between the directions of two beacons from the position point of the vehicle, rather than the angle between one such direction to a beacon and an axis established aboard the moving vehicle as shown in FIG. 25 and FIG. 27. As in the modification of my invention shown in FIG. 26 only five beacons are required permitting the performance of the six simultaneous measurements required for the determination of the unknown six dimensions of position-motion state of the moving vehicle, three dimensions of position and three dimensions of velocity.

In accordance with the teachings elsewhere in this specification there exist modifications of my invention as described in this section in which the variational measurements relative to an angle whose apex is at the position point of the vehicle in which modifications the variation of the specified angle are measured. In other such modifications of my invention the variation of a trigonometric function of the angle is measured. As readily seen, in the design of any particular system of my invention many choices of the type of measurement apparatus for performing the required measurement function are available, particularly in view of the fact that various combinations of such measurements are also apparent.

In the simpler modifications of my invention whose geometries are illustrated in FIG. 25–28 only one single set of simultaneous measurements of variation are performed. In other modifications consecutive measurements may be performed as taught elsewhere in this specification with the consequent improvement of accuracy or reduction in the number of beacons required. The principles of this technique of multiple consecutive, contiguous, or overlapping measurements are explained in my copending patent applications of which this application is a continuation-in-part. There is also sufficient discussion of the use of a priori motion information in this specification and in the referenced specifications of which this application is a continuation-in-part to permit the design of any of the modifications of my invention described in this section to comprise the use of such information.

Other modifications of my invention employing known dimensions of the position-motion state such as the dimensions of a known starting point or known dimension of motion also exist.

The dimensions of the position-motion state of the moving object may be determined (group two point) or the dimensions of the position-motion state of one of the beacon stations (group one point) may be determined.

As in the other modifications of my invention those modifications of my invention described and shown in this section of this specification the variational data is determined by automatic sensing or measuring apparatus described elsewhere in this specification or obvious adaptations of other such apparatus. This variational data and the other required data are fed to a computer for automatic determination of the required dimension of the position-motion state. The mathematical bases for the processes employed in the computer have been sufficiently discussed relative to similar modifications of my invention elsewhere in this specification. The Law of Cosines provides a convenient basis for the automatic computation in some modifications here described and application of this law is straight forward. The direct use of the equation of the Law of Cosines provides the simultaneous equations employed with incremental type measurements when the angle is between the directions of two beacons as shown by the angle $\theta$ in FIG. 26. The measured quantity here is $\theta_2 - \theta_1$. Differentiation of the equation of the Cosine Law is appropriate in the type of system as illustrated in FIG. 28, the measured quantity being the time derivative of the angle $\theta$ shown in that figure.

In modification of my invention employing an axis through the vehicle position (group one point) this axis may or may not be of known direction.

In those modifications of my invention employing an axis of unknown direction it is necessary to produce more data than is required when the directions of such axes are known. This additional variational data may be obtained through a priori data or by performing additional variational measurements. Additional variational measurements are easily obtained by increasing the number of beacons, increasing the number of contiguous or overlapping sets of simultaneous measurements or by employing more axes aboard the vehicle which axes would, of course, be known relative to the first axis. The axes aboard the vehicle may be established by presetting inertial means or by celestial or star tracking means or by other such means.

In those modifications of my invention employing axes of known direction aboard the moving vehicle the effective variational measurement information may be geometrically transferred to the ground station point (group one point) by merely using, geometrically, an oppositely directed axis through the group one point.

The reversal is useable with bearing angles whether the actual measurement is that of the variation of an angle of the variation of the cosine of an angle. Alternatively if the variation of the angle is measured it is just as convenient to employ at the group one point an axis in the same direction as the axis at the vehicle (group two point) but in this case the sign of the measured data must be reversed. In the system shown in FIG. 25 the measurement is incremental in character and the measured quantity is $\theta_2 - \theta_1$. Alternatively the incremental measurement may be $\cos\theta_2 - \cos\theta_1$. In FIG. 27 the measurement is of the rate type. The measurement is the time derivative of the angle $\theta$ or, alternatively the time derivative of the cosine of the angle $\theta$.

As an example, if two mutually orthogonal axes are employed in performing incremental measurement of the variation of the cosine in a moving vehicle and if the directions of these axes are known relative to the system of points comprising the stations, then the mathematical relationships are as shown in FIG. 16 but with reversed sense of the axes.

In all modifications of my invention in this section as in all other modifications a sufficient number of independent variational measurements are performed that the sought dimension of the position-motion state is determined by the physical mechanics or circumstances present in the application of the method. From these determined data is derived a number of simultaneous equations or relationships equal to or greater than the number of unknown dimensions present. Such unknown dimensions include in some modifications such geometrical elements as an axis and/or nongeometrical parameters.

As shown elsewhere in this specification the transmitter-receiver relationship may be reversed. In this case for instance a multiaperture beacon may be employed in the vehicle with suitable single aperture receiving equipment at the ground stations (group two points). The system remains the same geometrically with measurements still made relative to the variations of angles whose axes are at the position of the moving vehicle.

In those modifications of my invention in which measurements are performed relative to axes in the vehicle, each measurement may be performed relative to a separate axis if convenient. In particular if separate angle rate trackers with inertial means are employed at the vehicle for tracking the direction of each beacon station the angular rates may be derived as discussed earlier in this document.

There has been substantial discussion of hybrid systems in this specification and it does not appear essential here to outline the various combinations that may be achieved employing the simultaneous measurement of ranges, variation of ranges, angles at the station points (group two points) and the variations of these, inertial data derived by apparatus aboard the moving vehicle, etc.

In one modification of my invention the variation of the angle at the vehicle is measured not by employing apparatus aboard the moving vehicle but by sensing variations of a signal reflected from the moving object. An example of such a method is that of determining the position of a cigar shaped object such as a rocket. In a simple case the object has a length equal to one-half the wavelength of the wave used to illuminate it. As the object proceeds in its flight through space the reflection characteristic varies in a trigonometric fashion. This sensed variation can be employed in a modification of my invention.

In this specification it has been shown how direction can be determined through the rotation of single wave aperture and multiple wave aperture means. The rotation of such wave apertures at the position point of the moving vehicle which apertures are a part of the apparatus carried aboard the vehicle are employed in modifications of my invention. Similarly the rotation of a reflecting object of suitable shape provides single or multiple apertures whose rotation provides means of sensing the required angular rotation, and certain modifications of my invention employ such means.

The use of multiple contiguous or overlapping sets of simultaneous measurements of angle type variations has been discussed and the date of such measurements are employed in the automatic computing elements of some modifications of my invention to determine the higher order dimensions of motion, such as average acceleration, average jerk, etc. Similarly the measurement, sensing or determination of higher order rate type variations of the angles and/or functions of the angles provides the data for the automatic determination of the higher order dimensions of motion at a point as well as the position of the point and its velocity.

Sums and Differences of Variations

My invention has been described largely in terms of the simpler systems in which measurement is related to the variation of single angular quantities. In other modifications of my invention quantities linearly related to sums or differences of separate angular variations are measured. It also follows that quantities linearly related to the sums or differences of the variations of functions of angles are measured in other modifications. Thus a variational measurement that is dependent upon angular variations may be dependent upon the simultaneous variations of a plurality of such angles. Similarly a variational measurement that is dependent upon angular variations may be dependent upon the simultaneous variations of a plurality of trigonometric or other functions of such angles. Such conditions arise in applications of my invention in which the varying angles are at the position point of the moving object as well as with those applications of my invention wherein the varying angles are at the station positions. It can also arise in modifications of my invention where in the varying angles are at both group one points and group two points. The simpler examples lie in two-space applications and in applications involving more than one moving object or vehicle. Measured quantities related to the variation of an angle or function of an angle may also be related to the variations of more than one simultaneous angle or function of an angle. Such modifications of my invention occur in certain two-space applications and in applications related to systems involving a plurality of simultaneous moving objects as well as others. The measurement, sensing or determination of the sums and/or differences of angular variations or angle function variations are employed in particular modifications of my invention.

What is claimed is:

1. A method of determining at least one otherwise unknown dimension of the position-motion state of at least one selected point of a plurality of points in space relative to the position of at least one other of said plurality of points;

said plurality of points being divided into two groups of points, each group of points comprising at least one point of said plurality of points;

each point of the first group of points, hereinafter called an apex point, being the apex of at least one angle;

each point of the second group of points, hereinafter called an arm point, being contained in one arm of at least one of said angles and being a point along the trajectory of a moving object;

at least one dimension of the position-motion state of at least one of said second group of points being known a priori;

said method comprising the following elements:

Element 1. Determining relative to a particular one of said apex points angular data related to said particular apex point and at least one said arm point, said angular data being dependent upon the variation of direction of said moving object relative to said apex point which variation is resultant of the motion of said moving object at said last mentioned arm point, Element 2. Performing a plurality of determinations as described in Element 1 such that at least one dimension of the position-motion state of at least one selected point of said plurality of points becomes physically defined relative to the position-motion state of other of said plurality of points by the values of said plurality of determinations, by the known parameters related to said determinations, and by at least one said dimension which one said dimension is at least bounded by a priori data, Element 3. Computing at least one dimension of the position-motion state of at least one selected point of said plurality of points using the information obtained in Element 1 and Element 2 and at least one said dimension known a priori.

2. A method as described in claim 1 further characterized in that the position of at least one of said apex points is known.

3. A method as described in claim 1 further characterized in that said selected point is an arm point.

4. A method as recited in claim 1, further defined in that said selected point is an apex point.

5. A method as described in claim 1, further defined in that Element 2 comprises performing a redundancy of said determinations, and computing in Element 3 the most probable values for the coordinates of the position of said selected point.

6. A method as described in claim 1, comprising Element 1A. Determining the differences between selected ranges from at least one of said apex points to said arm points, said ranges each being between one of said arm points and one of said apex points; and further comprising using the information derived in Element 1A in Element 2 and in Element 3.

7. A method as recited in claim 1, further defined in accomplishing Element 2 in such a manner that there exists a finite number of points, hereinafter called false points, whose positions are defined, as well as the position of said selected point, by the determined data and a priori data described in Element 2; and further defined in performing Element 2 in such a manner that a redundancy of said data is made available; and employing said redundant data in Element 3 to determine the true selected point.

8. A method as recited in claim 1, further defined in accomplishing Element 2 in such a manner that there exists a finite number of points, hereinafter called false points, whose positions are defined, as well as the position of said selected point, by the determined data and a priori data described in Element 2; and further defined in that said selected point is at the position of an object and that none of said false points is necessarily located at the position of any such object; and determining from physical and mechanical considerations the impossibility or improbability of the existence of the said object at said each false point.

9. A method as described in claim 1, further comprising in Element 3, computing at least one of the coordinates of the position of said selected point in any desired coordinate system.

10. A method as described in claim 1, further defined in that Element 1 comprises determining the range from a single apex point to each arm point.

11. A method as described in claim 1, further defined in that said selected point is an arm point and the position of said last mentioned arm point being determined relative to other of said arm points.

12. A method as described in claim 1, further defined in said selected point being an apex point and at least one dimension of the position-motion state of said last mentioned apex point being determined relative to other of said apex points.

13. A method as recited in claim 1, further comprising;

Element 1A, using the laws of motion and determining thereby relationships between said arm points; and further defined in using the information derived in Element 1A in performing Element 2 and Element 3.

14. A method as recited in claim 1, further defined in comprising:

Element 1A, determining the variations of selected ranges, said ranges each being between one of said arm points and one of said apex points; and further defined in using the information derived in Element 1A in performing Element 2 and Element 3.

15. A method as recited in claim 1, further defined in that said unknown dimension is a dimension of position of said selected point.

16. A method as recited in claim 1, further defined in that said unknown dimension is a dimension of motion.

17. A method as recited in claim 1, further defined in employing inertial means at said apex points in performing Element 1.

18. A method as recited in claim 1, further defined in that said dimension known a priori is a dimension of position.

19. A method as recited in claim 1, further defined in that said dimension known a priori is a dimension of motion.

20. A method as recited in claim 1, further defined in Element 1 by determining the variation of at least one trigonometric function of an angle whose apex is at each said apex point, using for the purpose of this determining single aperture wave means.

21. A method as recited in claim 1, further defined in that a plurality of position dimensions define the position of a starting arm point on the path of said moving object; and further defined in that said last mentioned position dimensions are known a priori.

22. A method as recited in claim 1, further defined in performing Element 1 and Element 2 in such a manner that said unknown dimension of the position-motion state of said selected point in space is redundantly determined and further defined in performing Element 3 in such a manner that the value of said unknown dimension is separately computed using a plurality of separate combinations of the data determined in Element 1 and of the dimensions known a priori; and further defined in Element 3 in determining weights to be applied to each such last mentioned computation indicating the relative merit of said last mentioned computation; and further defined in Element 3 in computing a best estimate of the true value of said unknown dimension employing the weighted values separately determined.

23. A method as recited in claim 1 further defined in there being but a single apex point, further defined in employing apparatus at said single apex point which apparatus establishes at least one axis through said single apex point, further defined in employing said apparatus in the peformance of Element 1 and Element 2, and further defined in said angular data being dependent upon said axis.

24. A method as recited in claim 1 further defined in there being but a single apex point, further defined in Element 1 employing apparatus responsive to the variations of the cosine of the angle between an axis through said apex point and the direction of an arm point from said apex point, and further defined in performing Element 2 employing apparatuses responsive to the variations of angles relative to at least two separate axes through said apex point.

25. A method as recited in claim 1 further defined in there being a plurality of apex points, further defined in performing Element 1 employing apparatus responsive to the variations of the cosine of the angle between an axis through said particular one of said apex points and the direction of an arm point from said particular one of said apex points, and further defined in performing Element 2 employing at least one of such apparatuses at each of said apex points.

26. A method as recited in claim 1 further defined in there being a plurality of said apex points, further defined in there being a plurality of axes through each apex point, each axis of said plurality of axes being established by apparatus responsive to the variations of the cosine of the angle beween said each axis and the direction from said each apex point to said arm point, further defined in all of said axes being fixed relative to one another, and further defined in all of said apex points being fixed in position relative to one another.

27. A method as recited in claim 1 further defined in each apex point being traversed by at least one fixed axis;
 there being at each apex point at least two angles hereinafter called "bearings" associated with each axis through said each apex point;
 one arm of each bearing being coincident with said last mentioned axis and the other arm including one of said arm points;
 performing Element 1 by determining relative to a first apex point and a first axis through said first apex point the value of function of a first and a second bearing associated respectively with a first and a second arm point, such a function hereinafter called a "bearing function"; and
 in Element 2, comprising determining the values of a plurality of bearing functions, all of said plurality of points being included in the arms and apexes of the bearings associated with said plurality of bearing functions.

28. A method as recited in claim 27 further defined in there being but a single apex point; further defined in there being established by plural wave aperture means a plurality of axes through said single apex point; further defined in that said bearing function is the difference between the cosines of two bearings relative to the same axis.

29. A method as recited in claim 27 further defined in there being a plurality of apex points; further defined in there being established by plural wave aperture means a plurality of axes through each said apex point; further defined in that each said bearing function is the difference between the cosines of two bearings relative to the same axis.

30. A method as recited in claim 1 further defined in said unknown dimension of the position-motion state is a dimension of position; further defined in that said selected point is an arm point; further defined in there being established by plural wave aperture means a plurality of axes through each said apex point; further defined in each said axis being established by two wave apertures spaced from each other; further defined in there being at each apex point at least two angles hereinafter called "bearings" associated with each axis through said each apex point, one arm of each said bearing being coincident with said last-mentioned axis and the other arm including one of said arm points further defined in Element 1 in said angular data being the difference between the cosines of two bearings relative to the same axis; further defined in Element 2 comprising determining a multiplicity of such data, all the points of said plurality of points being included in the arms and apexes of the bearings associated with said multiplicity of such data.

31. A method as recited in claim 30, further defined in there being but a single apex point and further defined in at least one dimension of position of at least one arm point being known a priori.

32. A method as recited in claim 30 further defined in there being a plurality of apex points and further defined in at least one dimension of position of at least one of said arm points being known a priori.

33. A method of determining at least one dimension of the position-motion state of a moving object relative to a reference frame established by the positions of a plurality of wave apertures; there being at least one dimension of said position-motion state known a priori; said moving object constituting a wave aperture defining the position of said moving object and cooperative with said plurality of wave apertures; said method comprising the following elements;

Element 1. Performing a plurality of simultaneous measurements of only the variations of trigonometric functions of angles whose apexes are at a plurality of separate points on said reference frame and which points on said reference frame are determined by the locations of said wave apertures, each said angle being defined relative to an axis through said point by the locations of the wave apertures which define the position of the apex of said angle, said variations of trigonometric functions being dependent upon the motion of said moving object relative to said reference frame;

Element 2. Computing at least one dimension of the position-motion state of said moving object using simultaneously the dimensions of its position-motion state known a priori and the data resultant of said plurality of simultaneous measurements.

34. A method recited in claim 33 further defined in that said dimension of the position-motion state known a priori is a dimension of position and the dimension of the positive-motion state of the moving object determined by the claimed process is also a dimension of position.

35. A method as recited in claim 33 further defined in that said dimension of the position-motion state of said moving object known a priori is a dimension of position and the dimension of the position-motion state of the moving object determined by the claimed process is a dimension of motion.

36. A method as recited in claim 33 further defined in that said dimension of the position-motion state of said moving object known a priori is a dimension of motion and the dimension of the position-motion state of the moving object determined by the claimed process is a dimension of position.

37. A method as recited in claim 33 further defined in that said dimension of the position-motion state of said moving object known a priori is a dimension of motion and the dimension of the position-motion state of the moving object determined by the claimed process is also a dimension of motion.

38. A method of determining at least one dimension of the position-motion state of a moving object relative to a reference frame upon which is already known at least one dimension of the position-motion state of said moving object; the position on said reference frame of said moving object being defined by a wave aperture which is a part of said moving object; said method comprising the following elements;

Element 1. Performing a plurality of simultaneous measurements of only the variations of angles whose apexes are established at a plurality of separate points on said reference frame by a plurality of wave apertures cooperative with the wave aperture of said moving object; the measured angular variations being variations dependent upon the variations of the directions of said moving object from said separate points owing to the motion of said moving object on said reference frame.

Element 2. Computing at least one dimension of the position-motion state of said moving object using simultaneously at least one known dimension of the position-motion state of said moving object and the data resultant of said plurality of simultaneous measurements.

39. a method as recited in claim 38 further defined in that said one dimension of the position-motion state which is already known is a dimension of position and the dimension of the position-motion state of the moving object determined by the claimed process also is a dimension of position.

40. A method as recited in claim 38 further defined in that said one dimension of the position-motion state which is already known is a dimension of position and the dimension of position-motion state of the moving object determined by the claimed process is a dimension of motion.

41. A method as recited in claim 38 further defined in that said one dimension of the position-motion state which is already known is a dimension of motion and the dimension of position-motion state of the moving object determined by the claimed process is a dimension of position.

42. A method as recited in claim 38 further defined in that said one dimension of the position-motion state which is already known is a dimension of motion and the dimension of the position-motion state of the moving object determined by the claimed process also is a dimension of motion.

43. A system of apparatus for the determination of the position of a moving object in space, comprising a plurality of means measuring the angular variation of a line between said moving object and the point of location of each of said means; all of said means being located on a common frame relative to which said variation is measured; said variation being measured from a known direction of said line; and computing means determining the position of said moving object from said measurements.

44. A system of apparatus for the determination of the variation of position of a moving object in space, comprising a plurality of means measuring the angular variation of a line between said moving object and the point of location of each of said means; all of said means being located on a common frame relative to which said variation is measured; said variation being measured from a known direction of said line; and computing means determining the variation of position of said moving object from said measurements.

45. A multistatic method of determining at least one unknown dimension of the position-motion state of at least one selected point of a plurality of points in space relative to the position of at least one other of said plurality of points;

said plurality of points comprising a first group of points and a second group of points;

said first group of points comprising at least two points;

said second group of points comprising at least one point;

at least one point of said first group of points, hereinafter called an apex point, being the apex of at least one angle;

each point of the second group of points, hereinafter called an arm point, being contained in one arm of at least one of said angles and being a point along the trajectory of a moving object;

said method comprising the following elements:

Element 1. Automatically determining relative to a particular one of said apex points angular data related to an angle at said particular apex point and at least one said arm point, said angular data being dependent upon the variation of the direction of said moving object relative to said apex point which variation is resultant of the motion of said moving object at said last mentioned arm point;

Element 2. Automatically determining independently of any function as described in Element 1 and independently of any angle determining apparatus at any apex point, relative to a plurality of points in said first group of points and relative to at least one of said arm points, nonvariational geometric data which geometric data is dependent upon at least one dimension of the otherwise unknown position of said moving object;

Element 3. Automatically performing a plurality of determinations as described in Element 1 and in Element 2 such that there exists at least one unknown dimension of the position-motion state of at least one selected point of said plurality of points defined relative to the dimensions of the position-motion state of other of said plurality of points by the values of said plurality of determinations and by the known parameters related to said determinations;

Element 4. Automatically computing at least one dimension of the position-motion state of at least one selected point of said plurality of points using the data obtained in Element 1, Element 2, and Element 3.

46. A method as recited in claim 45 further defined in that said geometric data determined in Element 2 comprises at least one element of data that is linearly dependent upon at least one range to at least one of said arm points from one of said first group of points.

47. A method as recited in claim 45 further defined in that said geometric data determined in Element 2 comprises at least one dimension of the position-motion state of said moving object.

48. A method as recited in claim 45 further defined in that said geometric data determined in Element 2 comprises at least one element of angular data.

49. A method as recited in claim 45 further defined in performing Element 1, Element 2, and Element 3 in such a manner that said unknown dimension of the position-motion state of said selected point in space is redundantly determined, and further defined in performing Element 4 in such a manner that the value of said unknown dimension is separately computed using a plurality of separate combinations of the data determined in Element 1 and in Element 2; and further defined in Element 3 in determining weights to be applied to each such last mentioned computation indicating the relative merit of said last mentioned computation; and further defined in Element 4 in computing a best estimate of the true value of said unknown dimension employing the weighted values separately determined.

50. A method as recited in claim 45 further defined in said second group of points comprising but a single arm point, said single arm point being the location of said moving object and further defined in Element 1 in said angular variations being rate variations.

51. A method as recited in claim 45 further defined in that the angular variations recited in Element 1 are incremental variations.

52. A method as recited in claim 45 further defined in that said selected point is a point of said first group of points.

53. A method as recited in claim 45 further defined in that said selected point is a point of said second group of points.

54. A method as recited in claim 45 further defined in that said moving object is a vehicle and further defined in comprising in Element 2 using apparatus aboard said moving vehicle determining relative to a plurality of points in said first group of points nonvariational geometric data which geometric data is dependent upon at least one dimension of the position of said moving object.

55. A method as recited in claim 54 further defined in that said nonvariational geometric data is data relative to at least one angle whose apex is at the point of the position of said moving object.

56. A method as recited in claim 45 further defined in performing Element 2 in such a manner that separate measurement means used in the performance of separate parts thereof operate simultaneously.

57. A method as recited in claim 45 further defined in performing Element 1 in such a manner that separate measurement means used in the performance of separate parts thereof operate simultaneously.

58. A method as recited in claim 45 further defined in performing Element 1 and Element 2 in such a manner that separate means functional in the performance of each of these elements operates simultaneously with separate means used in the performance of the other element.

59. A method of determining at least one dimension of the otherwise unknown and unbounded position-motion state of at least one selected point of a plurality of points in space relative to the position of at least one other of said plurality of points;

said plurality of points being divided into two groups of points, a first group of points and a second group of points, said first group of points comprising at least two points, said second group of points comprising at least one point;

at least one point of said first group of points, hereinafter called an apex point, being the apex of at least one angle;

each point of the second group of points, hereinafter called an arm point, being contained in one arm of at least one of said angles and being a point along the trajectory of a moving vehicle;

comprising the following elements:

Element 1. Automatically determining relative to a particular one of said apex points angular data related to an angle at said particular apex point and at least one said arm point, said angular data being dependent upon the variation of the direction at said particular apex point of said moving vehicle relative to said particular apex point which variation is resultant of the motion of said moving vehicle at said last mentioned arm point;

Element 2. Using means aboard said moving vehicle independently of any function as described in Element 1 or apparatus used therefor determining at least one dimension of the otherwise unknown and unbounded position-motion state of said vehicle independently of any measurement of direction of said moving vehicle relative to any axis through any apex point which axis does not include an arm point;

Element 3. Automatically performing a plurality of determinations as described in Element 1 and in Element 2 such that at least one unknown dimension of the position-motion state of at least one selected point of said plurality of points is physically defined, geometrically and dynamically, relative to the position-motion state of other of said plurality of points by the values of said plurality of determinations and by the known parameters related to said determinatioins;

Element 4. Automatically computing at least one dimension of the position-motion state of at least one selected point of said plurality of points using the data obtained in Element 1, Element 2, and Element 3.

60. A method as recited in claim 59 further defined in said means aboard said moving vehicle comprises inertial elements.

61. A method as recited in claim 59 further defined in said means aboard said moving vehicle comprising angle determining apparatus.

62. A method as recited in claim 59 further defined in said means aboard said moving vehicle comprising apparatus for determining angles whose apexes are at the position point of said moving vehicle.

63. A method as recited in claim 59 further defined in said means aboard said moving vehicle comprising apparatus for determining variational angular data relative to at least one angle whose apex is at the position point of said moving vehicle.

64. A method as recited in claim 59 further defined in said means aboard said moving vehicle comprising apparatus for determining nonvariational angular data relative to at least one angle whose apex is at the position point of said moving vehicle.

65. A method as recited in claim 59 further defined in said means aboard said moving vehicle comprising inertial apparatus for determining at least one axis through the position point of said vehicle and further comprising means for determining angular data relative to said axis.

66. A method as recited in claim 59 further defined in said means aboard said moving vehicle comprising means cooperative with apparatus at at least one point of said first group of points.

67. A method as recited in claim 59 further defined in said means aboard said mving vehicle comprising means cooperative with means at at least one point of said first group of points for determining nonvariational data linearly dependent upon the range between said last mentioned point and said moving vehicle.

68. A method as recited in claim 59 further defined in said means aboard said moving vehicle comprising means cooperative with means at at least one point of said first group of points for determining variational data linearly dependent upon the range between said last mentioned point and said moving vehicle.

69. A method as recited in claim 59 further defined in said dimension of the position-motion state recited in Element 2 being nominally the same as that dimension of the position-motion state recited in Element 3 and Element 4, and further defined in that the derived value of said dimension computed in Element 4 is the weighted combination of redundant independent determinations of said dimension and is of improved accuracy.

70. A method as recited in claim 59 further defined in employing doppler means in Element 2.

71. A method as recited in claim 59 further defined in performing Element 2 in such a manner that the position of one of said arm points is determined, and further defined in that the dimension of the position-motion state computed in Element 4 is not one of the dimensions of the position determined in Element 2.

72. A method of determining at least one dimension of the otherwise unknown and unbounded position-motion state of at least one selected point of a plurality of points in space relative to the position of at least one other of said plurality of points;

said plurality of points comprising a first group of points and a second group of points;

each of said first group of points comprising at least one point;

each of said second group of points comprising at least one point;

each point of said first group of points hereinafter being called a group one point;

each point of said second group of points hereinafter being called a group two point;

each group two point being a point along the path of a moving object;

said method comprising the following elements:

Element 1. Determining variational angular data relative to at least one angle whose apex is at at least one group two point and at least one of whose arms includes a particular one of said group one points said data being such that the direction of said particular one of said group one points is not determined independently by said data alone relative to any known axis;

Element 2. Performing a plurality of determinations as described in Element 1 such that resultant thereof there becomes physically defined at least one dimension of the position-motion state of at least one selected point of said plurality of points relative to the position-motion state of other of said plurality of points by the values of said plurality of determinations and by the known parameters related to said determinations; and Element 3. Computing at least one dimension of the position-motion state of at least one selected point of said plurality of points using the information obtained in Element 1 and in Element 2.

73. A method as recited in claim 72 further defined in that the position of at least one of the group one points is known.

74. A method as recited in claim 72 further defined in that the position of at least one of the group two points is known.

75. A method as recited in claim 72 further defined in that said selected point is a group one point.

76. A method as recited in claim 72 further defined in that said selected point is a group two point.

77. A method as recited in claim 72 further defined in that Element 2 comprises performing a redundancy of said determinations, and computing in Element 3 the most probable value for at least one dimension of the position-motion state of said selected point.

78. A method as described in claim 72 further characterized in that said selected point is a group one point and the position of said last mentioned group one point being determined relative to other of said group one points.

79. A method as recited in claim 72 further characterized in that said selected point being a group two point and at least one dimension of the position-motion state of said last mentioned group two point being determined relative to the other of said group two points.

80. A method as recited in claim 72 further comprising Element 1A, determining characteristics of motion of said moving object; and further characterized in that the information derived in Element 1A is utilized in Element 2 and Element 3.

81. A method as recited in claim 72 further comprising Element 1A, using laws of motion relative to the moving object and determining thereby relationships between said group two points; and further characterized in using the information derived in Element 1A in performing Element 2 and Element 3.

82. A method as recited in claim 72 further defined in that said moving object is a moving vehicle, and further defined in performing Element 1 using apparatus aboard said moving vehicle.

83. A method as recited in claim 72 further defined in that said moving object is a moving vehicle and further defined in performing Element 1 using inertial mechanisms aboard said moving vehicle.

84. A method as recited in claim 82 further defined in performing Element 1 using star tracking mechanisms aboard said moving vehicle.

85. A method as recited in claim 72 further defined in said angular data being data of the variations of angles between directions of said group one points from said moving object.

86. A method as recited in claim 72 further defined in said angular data being data of variations of angles between at least one axis through said moving object and the directions of said group one points from said moving object.

87. A method as recited in claim 72 further defined in said angular data being data of variations of angles between at least one known axis through said moving object and the directions of said group one points from said moving object.

88. A method as recited in claim 72 further defined in said angular data being data of the variation of trigonometric functions of angles whose apexes are at said moving objects and at least one of whose arms include a group one point.

89. A method as recited in claim 72 further defined in said angular data being data of incremental measurements relative to variations of angles whose apexes are at said moving object and at least one of whose arms includes a group one point.

90. A method as recited in claim 72 further defined in said angular data being data of rate type measurements relative to variations of angles whose apexes are at said moving object and at least one of whose arms include a group one point.

91. A method as defined in claim 72 further comprising Element 1A, by process independent of any process employed in Element 1 determining at least one dimension of the position-motion state of said moving object; and further defined in employing the data derived in Element 1A, in Element 2 and in Element 3.

92. A method as recited in claim 91 further characterized by the use of inertial means in the performance of Element 1A.

93. A method as recited in claim 91 further characterized by use of doppler means in the performance of Element 1A.

94. A method as recited in claim 91 further characterized by use of automatic navigation means in the performance of Element 1A.

95. A method as recited in claim 91 further characterized by use of ranging means in the performance of Element 1A.

96. A method as recited in claim 91 further characterized by use of star tracking means in the performance of Element 1A.

97. A method as recited in claim 91 further characterized by use of angle measuring means in the performance of Element 1A.

98. A method as recited in claim 72 further comprising Element 1A: by processes independent of processes employed in Element 1 determining geometric data by doppler means,
and further defined in employing data from Element 1A in Element 2 and Element 3.

99. A method as recited in claim 72 further comprising Element 1A:
by processes independent of processes employed in Element 1 determining geometric data by ranging means,
and further defined in employing data from Element 1A in Element 2 and Element 3.

100. A method as recited in claim 72 further comprising Element 1A:
by processes independent of processes employed in Element 1 determining geometric data by star tracking means,
and further defined in employing data from Element 1A in Element 2 and in Element 3.

101. A method as recited in claim 72 further comprising Element 1A:
by processes independent of processes employed in Element 1 determining geometric data by automatic navigation means,
and further defined in employing data from Element 1A in Element 2 and Element 3.

102. A method as recited in claim 72 further comprising Element 1A:
by processes independent of processes employed in Element 1 determining geometric data by angle measuringn means,
and further defined in employing data from Element 1A in Element 2 and in Element 3.

103. A method as recited in claim 72 further comprising Element 1A:
by processes independent of processes employed in Element 1 determining geometric data by inertial means,
and further defined in employing data from Element 1A in Element 2 and Element 3.

104. A method as recited in claim 91 further defined in said dimension of the position-motion state recited in Element 1A being nominally the same as that dimension of the position-motion state recited in Element 2 and Element 3, and further defined in that the derived value of said dimension computed in Element 3 is the weighted combination of redundant independent determinations of said dimension and is of improved accuracy.

* * * * *